(12) United States Patent
Risen, Jr. et al.

(10) Patent No.: US 7,608,356 B2
(45) Date of Patent: Oct. 27, 2009

(54) ION CONDUCTING POLYMER MEMBRANES

(75) Inventors: William M. Risen, Jr., 87 Miller Ave., Rumford, RI (US) 02916; Pu Zhang, Urbana, IL (US)

(73) Assignee: William M. Risen, Jr., Rumford, RI (US)

( * ) Notice: Subject to any disclaimer, the term of this patent is extended or adjusted under 35 U.S.C. 154(b) by 577 days.

(21) Appl. No.: 10/485,771

(22) PCT Filed: Jul. 15, 2002

(86) PCT No.: PCT/US02/22535

§ 371 (c)(1),
(2), (4) Date: Apr. 8, 2005

(87) PCT Pub. No.: WO03/007412

PCT Pub. Date: Jan. 23, 2003

(65) Prior Publication Data

US 2005/0181252 A1    Aug. 18, 2005

Related U.S. Application Data

(60) Provisional application No. 60/305,514, filed on Jul. 13, 2001.

(51) Int. Cl.
  *H01M 4/00* (2006.01)
  *H01M 8/10* (2006.01)

(52) U.S. Cl. .............. 429/40; 429/30; 429/33

(58) Field of Classification Search ............ 429/30, 429/33, 40
See application file for complete search history.

(56) References Cited

U.S. PATENT DOCUMENTS

| | | | |
|---|---|---|---|
| 4,264,676 A | 4/1981 | Uzumaki et al. | |
| 4,468,301 A * | 8/1984 | Oda et al. | 205/522 |
| 4,708,981 A | 11/1987 | Zupancic et al. | |
| 5,041,197 A | 8/1991 | Gelb | |
| 5,514,378 A | 5/1996 | Mikos et al. | |
| 6,150,047 A | 11/2000 | Yen | |
| 6,936,370 B1 * | 8/2005 | Knights et al. | 429/40 |

FOREIGN PATENT DOCUMENTS

| | | |
|---|---|---|
| EP | 0 045 603 A | 2/1982 |
| EP | 0 203 577 A | 12/1986 |

OTHER PUBLICATIONS

European Search Report issued Dec. 12, 2008.

* cited by examiner

*Primary Examiner*—Dah-Wei D Yuan
*Assistant Examiner*—Zachary Best
(74) *Attorney, Agent, or Firm*—Fay Sharpe LLP

(57) ABSTRACT

Modified ion-conducting membranes (10), and a method for making the same, which increases the membrane (10) surface area, and, optionally, incorporates mono- and multi-metal ion-containing catalysts for both fuel consumption catalysis in fuel cells as well as catalysis of reactions to ameliorate the effects of CO and other impurities in fuel cells. The membranes (10) modified by these methods can fin application in catalysis and transport applications.

9 Claims, 59 Drawing Sheets

Anode Side Membrane Surface

Membrane $A = \pi R^2$ (Area of subtended circle)
$M = \pi R L$ (Lateral area)

For $\alpha = 30°$,
$M/A = (\pi R L) / (\pi R^2) = 2$

A 100% increase in area!

(a)

(b)

*R. Duplessix, et. al., in *Water in Polymers*, Ed. S. Rowland, ACS, Washington, DC, 1980, Chapter 28.

1.5 H₂O bind to ionic group

Local Cluster (< 5 H₂O)

Bridging Structure (5 ~ 9 H₂O)

200 V

400 V

800V (a)

(b)

(c)

(a) x 10k  (b) x 10k
(c) x 5k  (d) x 5k (a)

(b)

Precipitation of ruthenium oxides near the surface region of membrane $Ru(III) + OH^- \rightarrow Ru_2O_3 \cdot H_2O$

ION CONDUCTING POLYMER MEMBRANES

FIELD OF INVENTION

The present invention relates to polymer electrolyte membranes. More particularly, the present invention relates to polymer electrolyte membranes having a modified or increased surface area, devices made using such membranes, and methods of making and using the same.

BACKGROUND OF THE INVENTION

A polymer electrolyte membrane is a membrane that can conduct electricity through the transport of ions while not conducting electrons to a significant degree. There are a number of types of membranes in use. Some are primarily proton conductors. They can be used in devices ranging from fuel cells to such other types of electrochemical cells. W. M. Risen Jr., in "Ionomers, Characteristic Theory and Application", edited by Schuamith Schliek, CRC Press, Buca Raton, Fla., 1996, Chapter 12, and all of the references cited therein. Some are primarily metal-containing ion conductors and can be used in applications such as chlor-alkali cells and batteries. Additionally, some are primarily anion conducting membranes and can be used in batteries, separations and other applications.

The membranes range widely in chemical structure. One type of particular interest is the class of proton conductors available for use in fuel cells based on proton conduction in connection with chemical reactions in which hydrogen, alcohols, hydrocarbons and the like are oxidized by an oxygen containing species such as oxygen, air, or a peroxide. Typically, the membrane is in a structure, sometimes called a Proton Membrane Electrode Assembly (sometimes with acronyms such as PEM, MEA, PEMA, PMEA) which contains the membrane and other constituents such as catalysts for the gas reaction, catalysts for dealing with impurities or undesired side reactions, conductors, electrodes, and arrangements for delivering the reactants to the surfaces and removing the products from the surfaces. These are complicated multiphase assemblies and often are prepared by special complex, secret "recipes". They often are difficult to reproduce and can be unstable in operation. They also have limited surface areas and functionality.

It would be valuable to have a membrane that incorporates a high surface area with the catalytic functionality required for the membrane assembly's operation. For example, in the case of a fuel cell with hydrogen and oxygen, wherein the hydrogen is obtained by reformation or another reaction which leaves some CO in the gas, the catalysts must provide for the catalysis of the hydrogen and oxygen reactions, and preferably also the catalysis of the oxidation of CO.

SUMMARY OF THE INVENTION

It is an object of the present invention to produce a surface modified electrolyte conducting membrane having an increased surface area. Such a surface modified electrolyte conducting membrane has many uses such as for use in fuel cells.

It is another object of the invention to use a surface modified electrolyte conducting membrane to directly improve gas flow near the membrane surface.

It is still another object of the invention to chemically, electrically, or physically treat such a modified membrane to produce catalyst regions.

It is yet another object of the invention to use such a modified membrane to improve adherence to another material or to a like membrane and to achieve seals that exhibit improved resistance to the flow of gases or liquids.

It is another object of the invention to produce such a membrane whose gas transport and/or liquid transport properties have been modified from those of the original membrane material in a controlled manner.

It is still another object of the invention to utilize a high voltage electrochemical process to modify the surface structure of a polymer electrolyte membrane. Among other things, an increase in surface area can be achieved. The degree of modified surface structure depends upon, among other things, the applied voltage and the water content in the membrane.

It is still another object of the invention to produce modified proton-conducting membranes (and a method for conducting the modification) which increases the surface area of the membrane and optionally incorporates mono- and multi-metal-containing catalysts.

More particularly, a method for making a large increase in the surface area of a proton conducting polymer membrane has been discovered. This discovery was made while attempting to find a way to cause the electrochemical reduction of metal ions that had been exchanged into a PFSA membrane. The metal ion-containing membrane was coated with deposited metal electrodes and it was dehydrated significantly. Then it was placed in a glass cell through which wires were run to connect to the electrodes. Then the air was pumped from the cell. Then hydrogen gas was added to the cell. Then a DC voltage was placed across the electrode-membrane-electrode assembly. After the voltage was applied for some time, the assembly was removed and investigated. This was repeated at various voltages and times. At high voltages and relatively long times, the membrane came to be distorted significantly. The main distortion was the delaminating and "rumpling" of the metal coating electrode on one side of the membrane. It appeared first that the process may have been successful and that a metal-containing species had been formed at that membrane-electrode interface and pushed off the coating. On closer examination, this appeared unlikely since it happened at the anode and the species expected would have been reduced. Then other hypotheses were examined to find out what had happened. In that examination, the various variables were changed. Finally, it was discovered that a similar result could be obtained without the metal ion in the membrane, without the coated electrodes, without the hydrogen gas, and with only a partially dehydrated PFSA itself between two metal electrodes simply put in contact with the membrane.

The result was that a configuration such as that described, wherein the electrodes are simply stainless steel and the membrane is a piece of partially dehydrated PFSA in the form of Nafion®, could produce a surface of greatly increased area through the application of about 800 V for about 1 hour. Other levels of surface treatment were achieved by varying the voltage from 20 to 800 V for periods from a few minutes to several hours.

When one side of the membrane has been modified in this way, the other side can be modified by reversing the process, by which is meant that the other side of the membrane can be placed in contact with the anode. In that case it may be useful to coat the already modified surface with a metal deposition rather than press an electrode into it in order to prevent distortion.

Further review of this membrane surface distortion indicated that hydrogen ($H_2$) gas formed at the cathode side of the membrane diffused away relatively quickly. As a result, no physical change occurred at the cathode-side surface. However, oxygen ($O_2$) gas formed at the anode side builds up pressure because it is generated faster than it can diffuse away from the membrane. The oxygen then explodes from the film producing a rough surface.

In this regard, SEM images show that the surface next to the cathode remains essentially unchanged during the treatment while the surface next to the anode is modified significantly. Thus, the distortions are on the scale of about 0.1 to 0.8 micrometers in height and breadth.

The idealization of this set of distortions as "cone like" protrusions leads to a calculation that the surface area of the membrane is increased at each cone by about 100%. Clearly this is an idealization, and the surface could be modeled by a set of valleys or other depressions. Nevertheless, by such considerations, it has been concluded that the surface area is increased by at least 20% relative to a subtended area of the unmodified membrane. In some areas, the increase can be at least 70% or even 100%. The subtended area of the membrane is that area of the membrane underlying the modified surface.

The surface that has been modified in this way can be ion exchanged with one metal-containing ion, such as $Pt(NH_3)_4^{2+}$, or two ions, such as ones containing Pt and Ru. Then it can be reacted with a reductant, such as $H_2$, $CO/H_2O$, an alcohol, or $NaBH_4$, and one or both of the metal ions can be reduced in the membrane. These reduced species can be shown to appear by the reaction of the thus treated membrane with CO(g). The infrared spectra of the metal ion exchanged membranes (prepared simply by the ion exchange of unmodified membranes) show that metal ion reductions take place and lead to metal carbonyls on reduced metal species.

The surface modified in this way also can have small particles, such as catalyzing metals, added to it. If the particles are less than or about the size of the surface features, they can become part of the near surface region through subsequent treatment. For example, if the cone-like protrusions have "valleys" of about 0.3 µm and then 0.1 µm diameter particles are dropped into them, a process that causes some or all of the cone-like protrusions to flow around the particles can produce a membrane containing these particles in the near surface regions. By varying the sizes and process conditions, the fraction of the particles that are completely surrounded by membrane material, the fraction of the particles that are simply adhered to the surface, and the fraction of particles that are partially surrounded by membrane material can be varied.

Additionally, it has also been discovered that the pore sizes left by the oxygen exploding from the membrane surface at the anode is directly dependent upon the water content, as well as the magnitude and length of time of the applied voltage. As a result, various different types of surface modifications and catalyst depositions can be designed for use in different applications.

Overall, several methods have been discovered for greatly increasing the surface area of a partially dehydrated proton conducting membrane and for producing reduced metal containing species in or on a modified membrane.

While the present invention has been primarily described for fuel cell development, other membrane applications are of potentially equal importance. Examples of such applications include, but are not limited to batteries and printing surface applications.

These and other objects and features of the invention will become more apparent upon a reading of the detailed description, drawings and claims.

BRIEF DESCRIPTION OF THE DRAWINGS

The following is a brief description of the drawings, which are presented for purposes of illustrating the invention and not for purposes of limiting the same, and wherein.

These membranes were exposed to water vapor in various relative humidity: (a) 22.4%, (b) 28.5%, (c) 34.2%, and (d) 63.5%.

Figure 23:
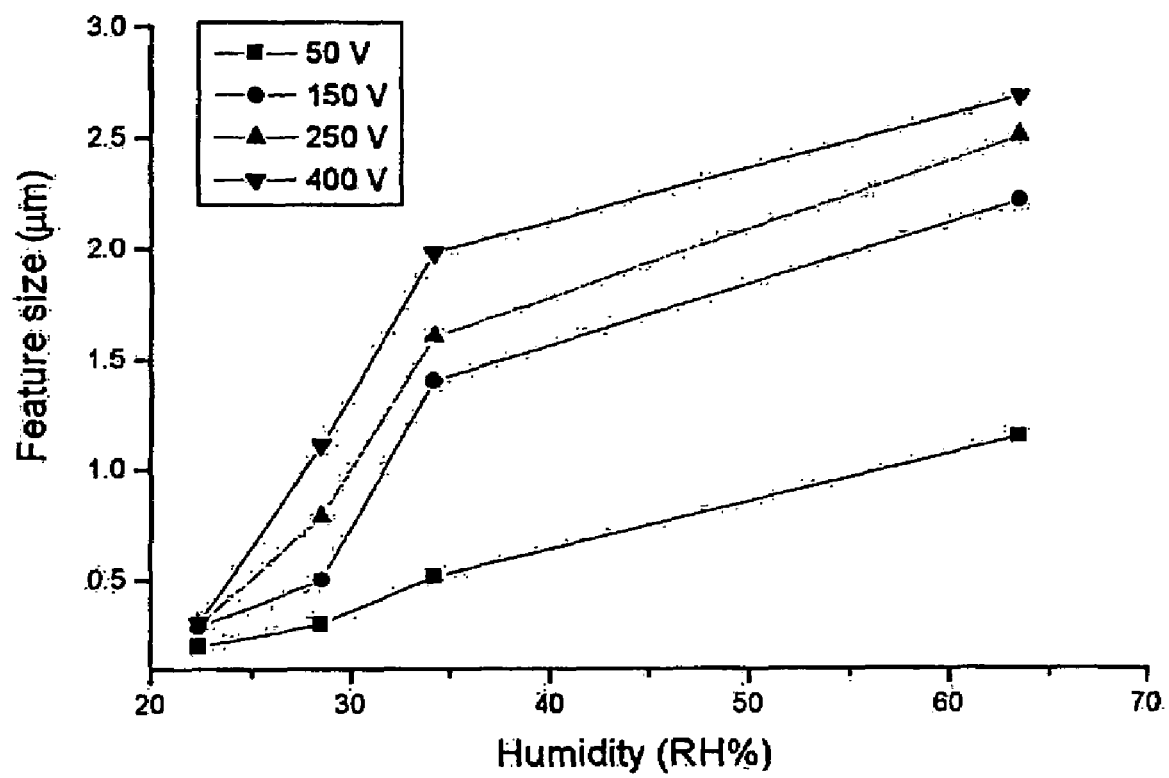

FIG. 23 is a graph of feature size of modified surface vs. membrane humidity, Nafion® membranes were applied different voltages after the absorption of water.

Figure 24:
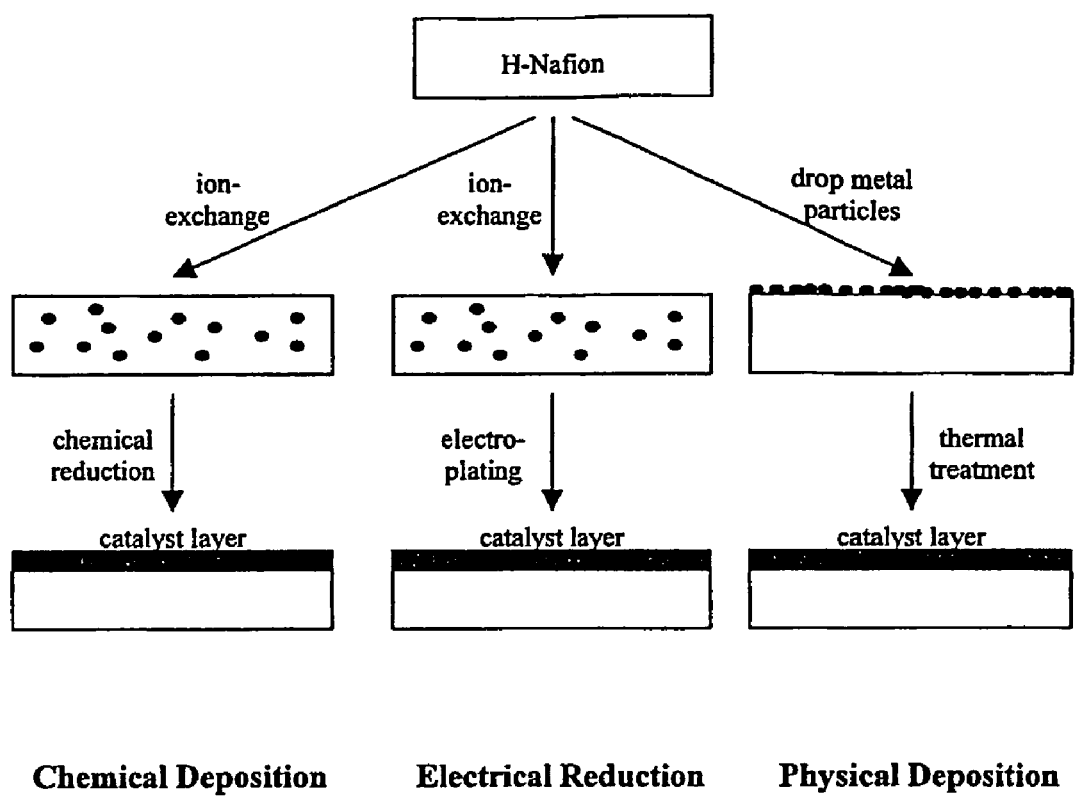

FIG. 24 is an illustration of three methods to build catalyst layer near the surface region of a polymer membrane.

Figure 25:
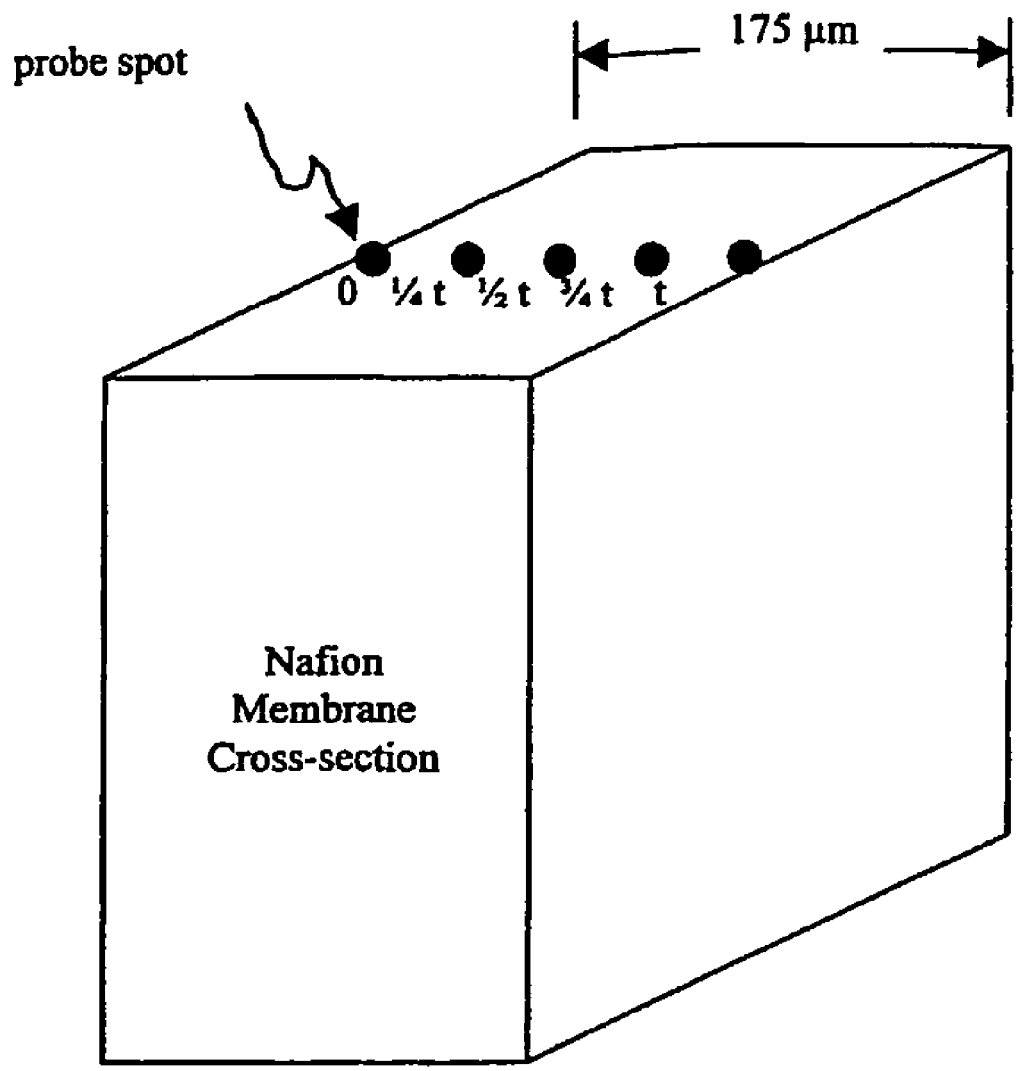

FIG. 25 is an illustration showing locations at which the composition of membrane were analyzed by Electron Microprobe.

Figure 26:
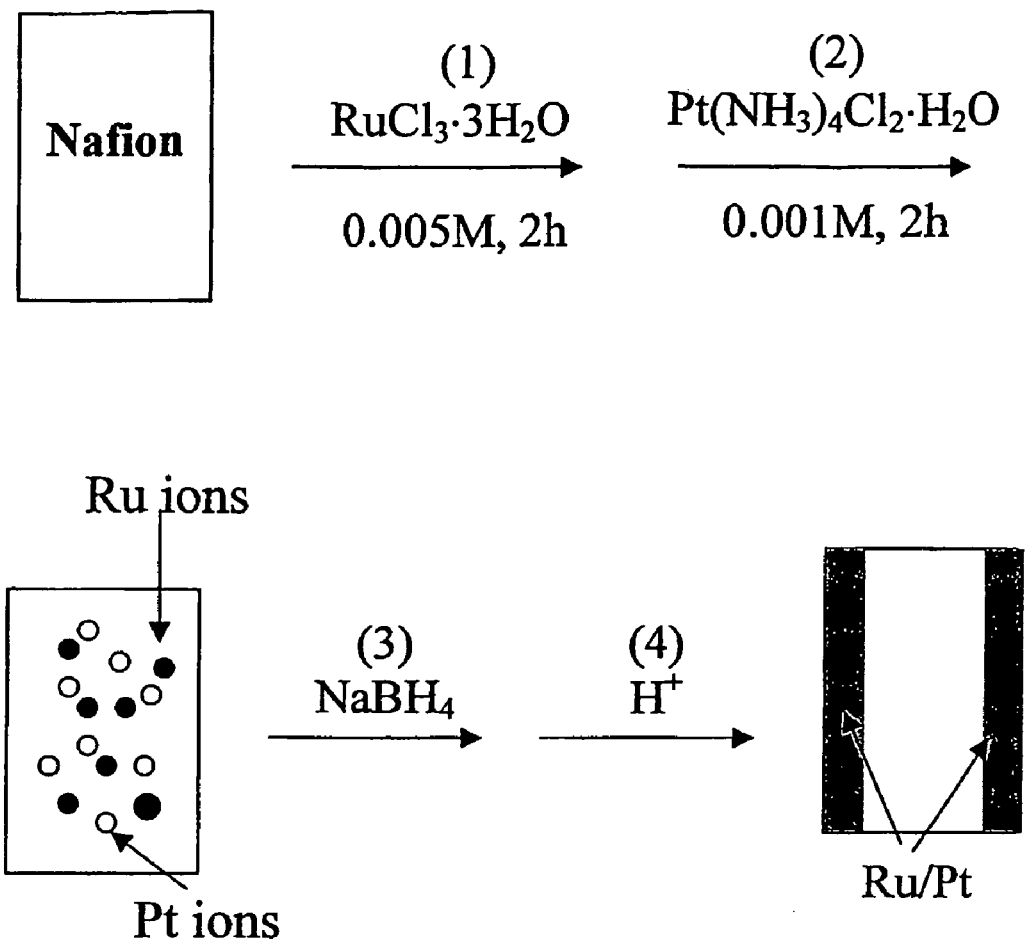

FIG. 26 is a depiction of the process of chemical deposition and the reactions near the surface of the membrane.

Figure 27:
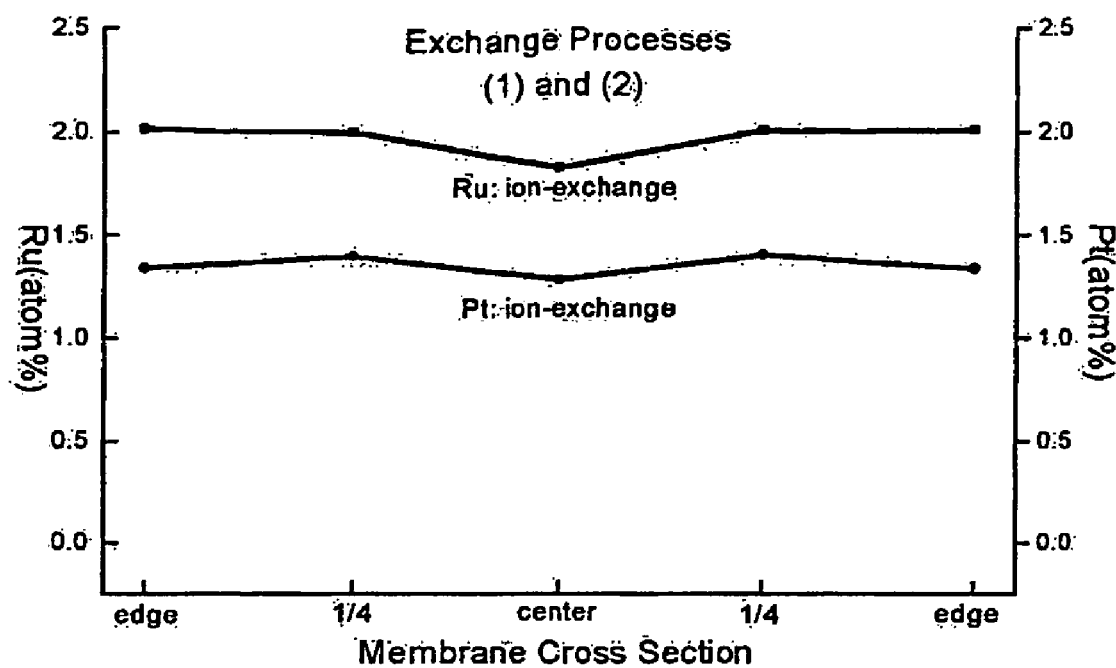
Figure 27:
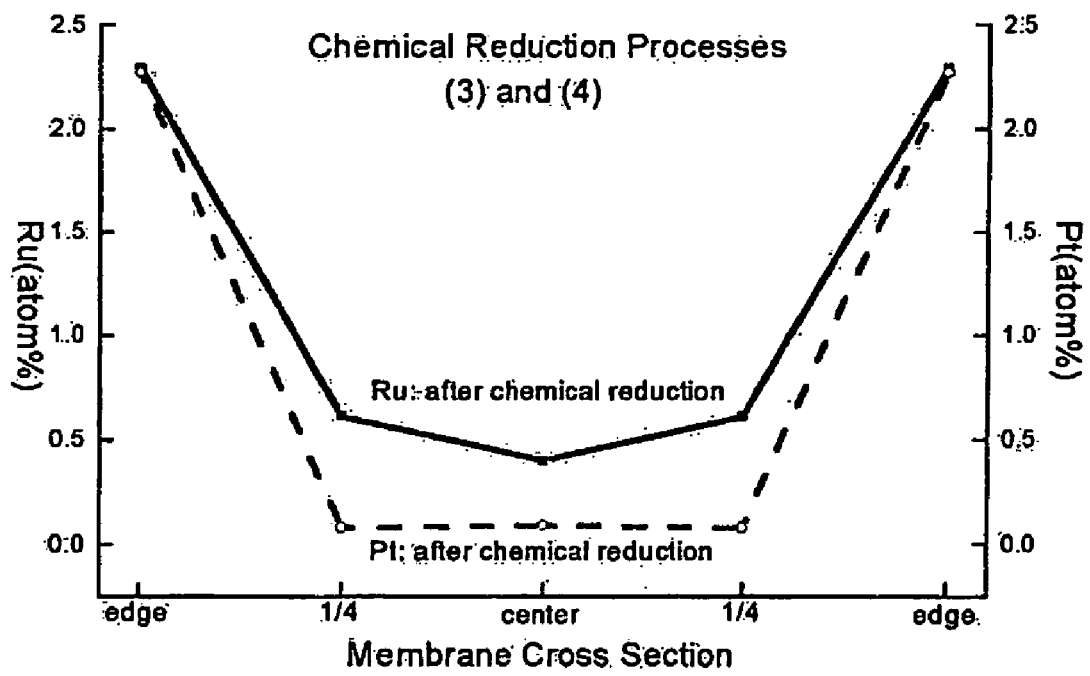

FIG. 27 is a graph showing the distribution of Pt and Ru across a membrane during the chemical deposition process.

FIGS. 28a, 28b, 28c and 28d are SEM photographs of H-form Nafion® 117 after high voltage treatment at the (a) cathode side surface, and (b) anode side surface; and SEM photographs of Ru/Pt/Nafion® (c) catalyst layer near cathode-side surface, and (d) catalyst layer near anode side surface.

Figure 29:
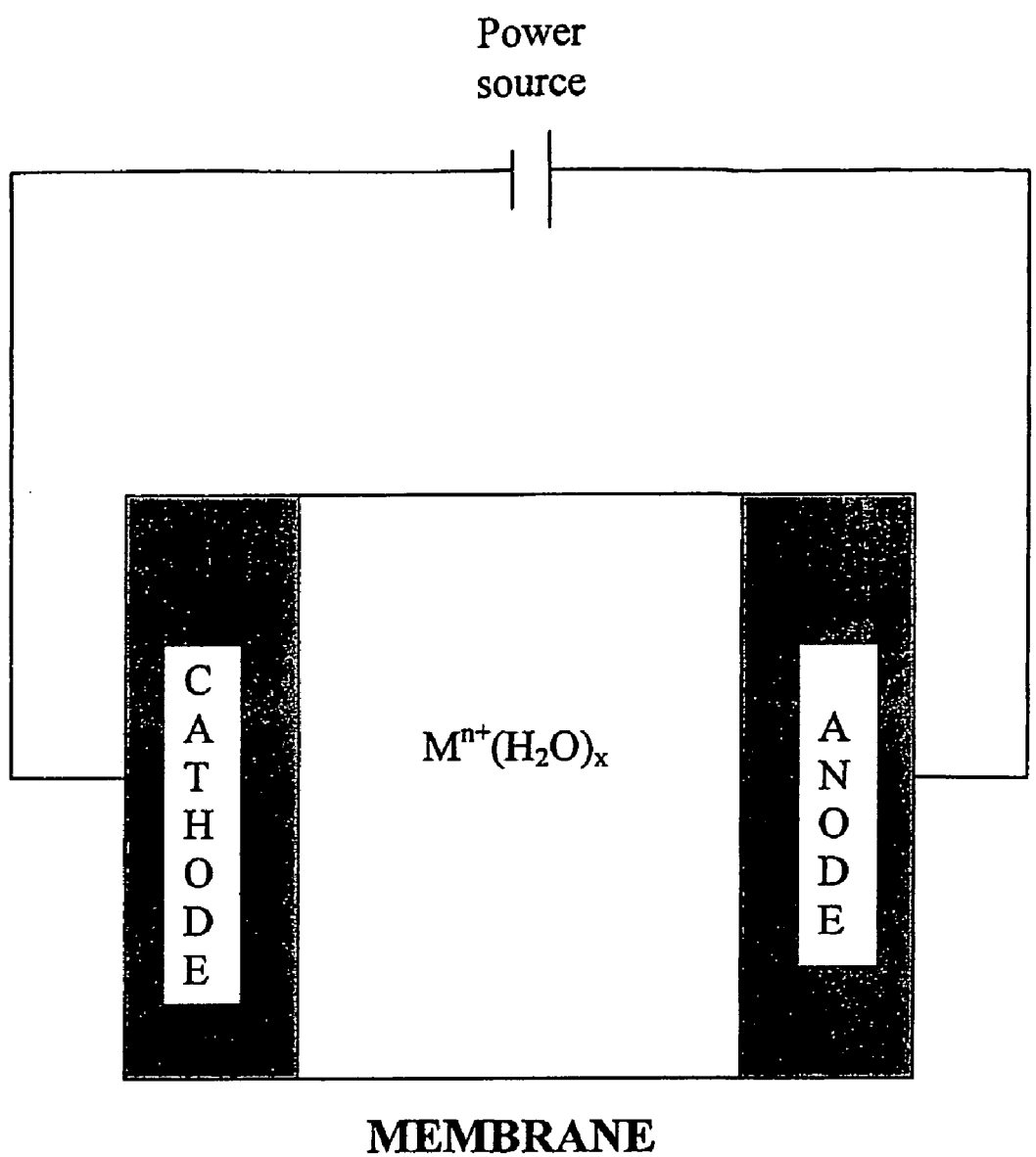

FIG. 29 is a schematic of a device for in-situ electroplating in polymer membrane.

Figure 30:
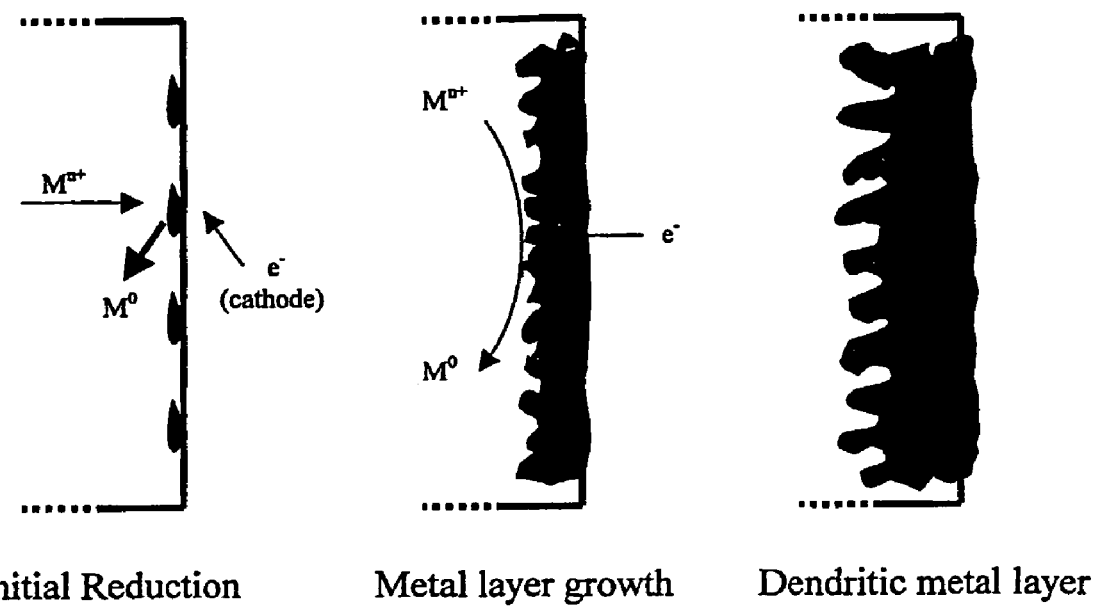

FIG. 30 is an illustration of metal layer formation on a membrane using in-situ electrolysis method.

Figure 31:
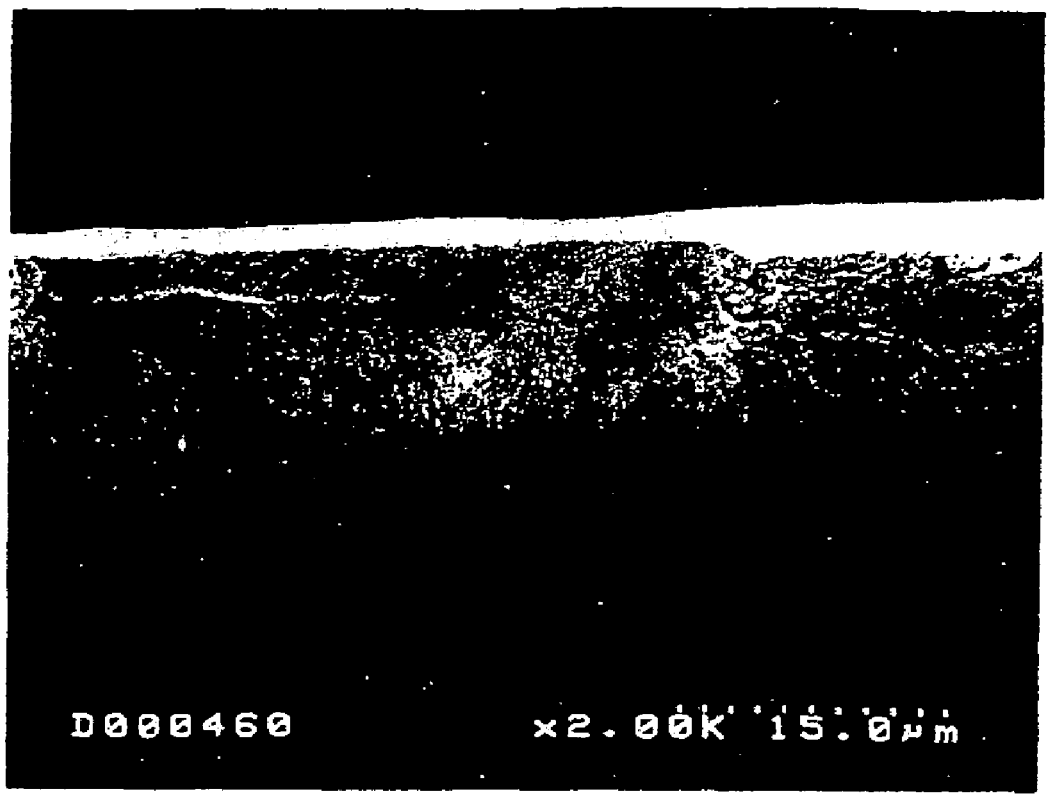

FIG. 31 is an SEM image of cross-section of Ag layer near the surface region showing an Ag layer outside the surface of ~1 μm and an Ag layer inside the surface of 10~15 μm.

Figure 32:
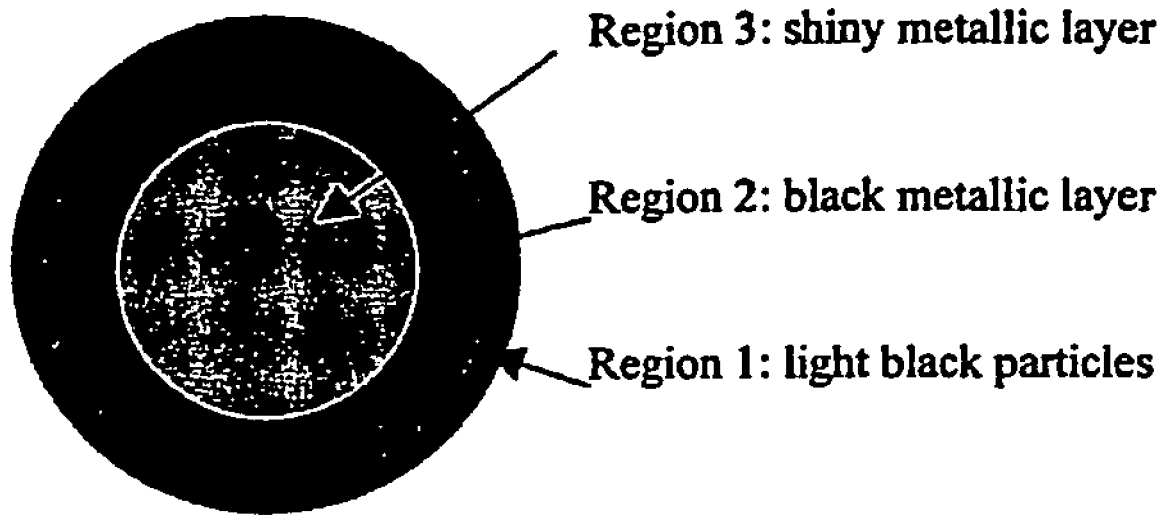

FIG. 32 is a drawing of a copper layer having three different regions formed on membrane surface next to cathode.

Figure 33:
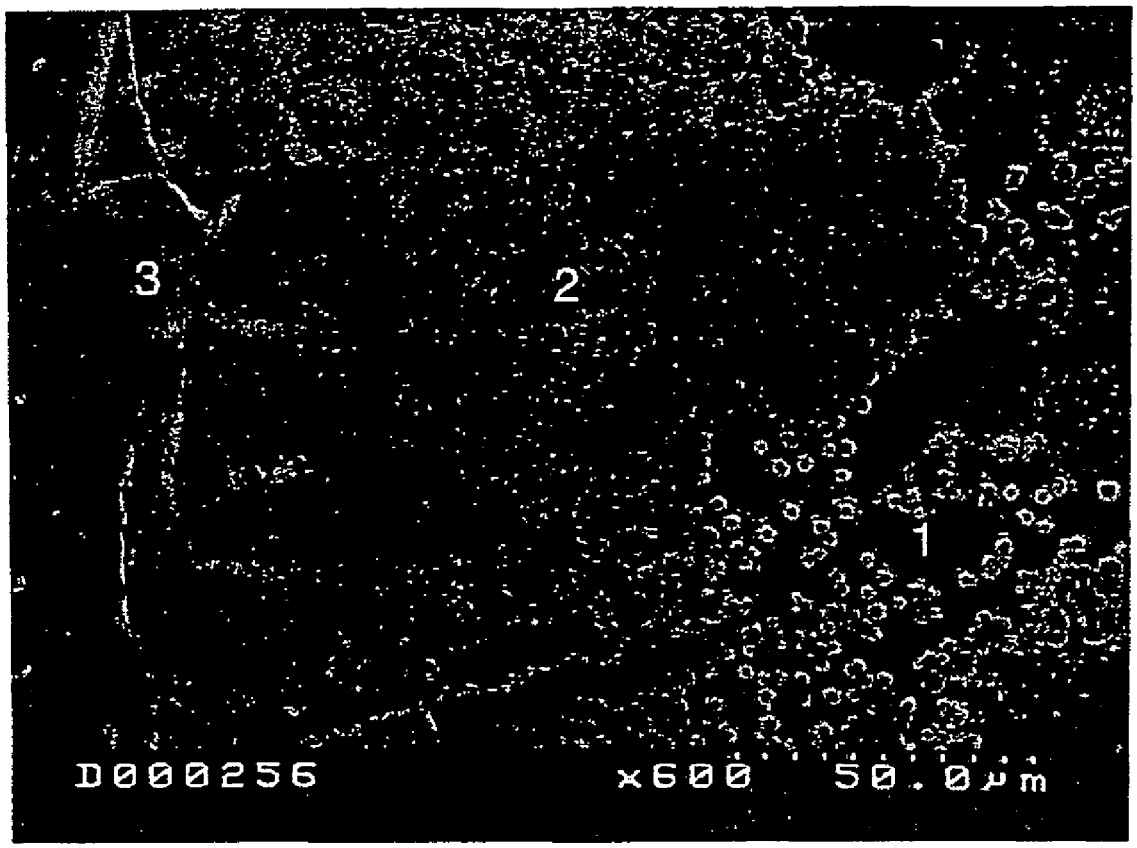

FIG. 33 is an SEM image of Cu layer near the surface region (top view) showing three regions including Region 1: isolated particles; Region 2: loose metal layer; and Region 3: condensed metal layer.

Figure 34:
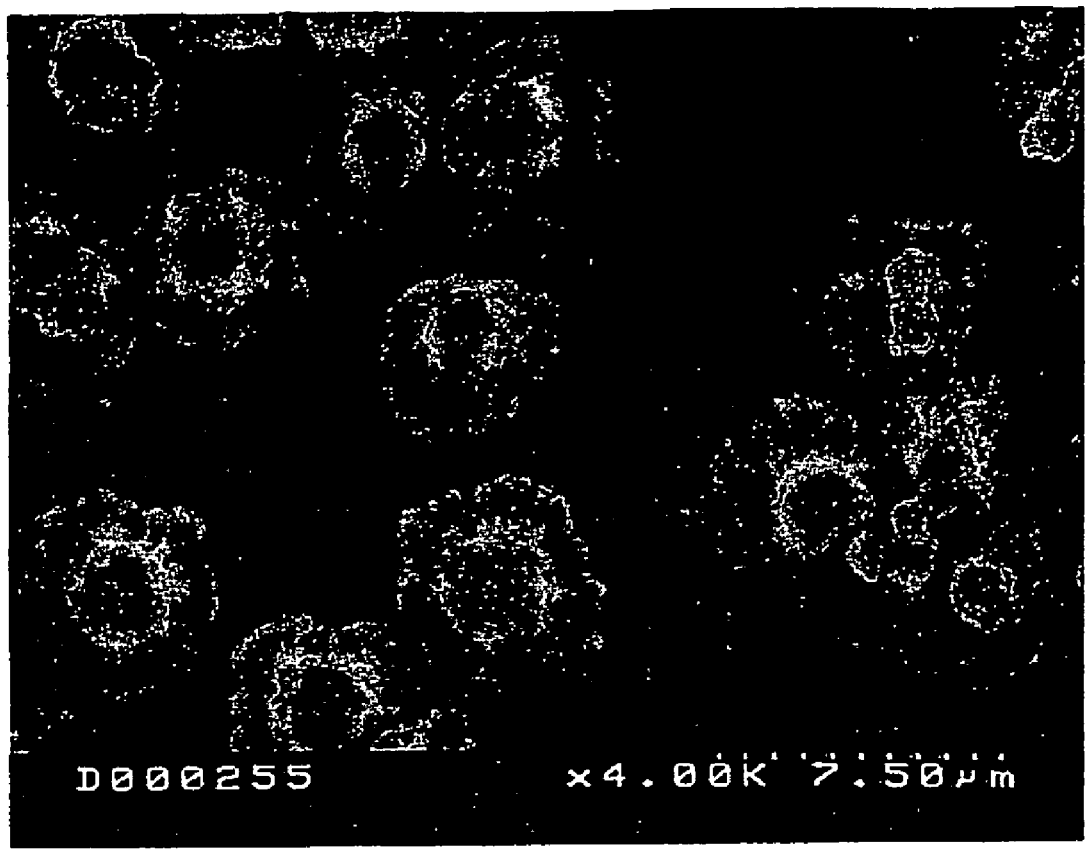

FIG. 34 is an SEM showing an enlarged view of region 1 from FIG. 33 of the top view of Cu layer near the surface region (SEM).

Figure 35:
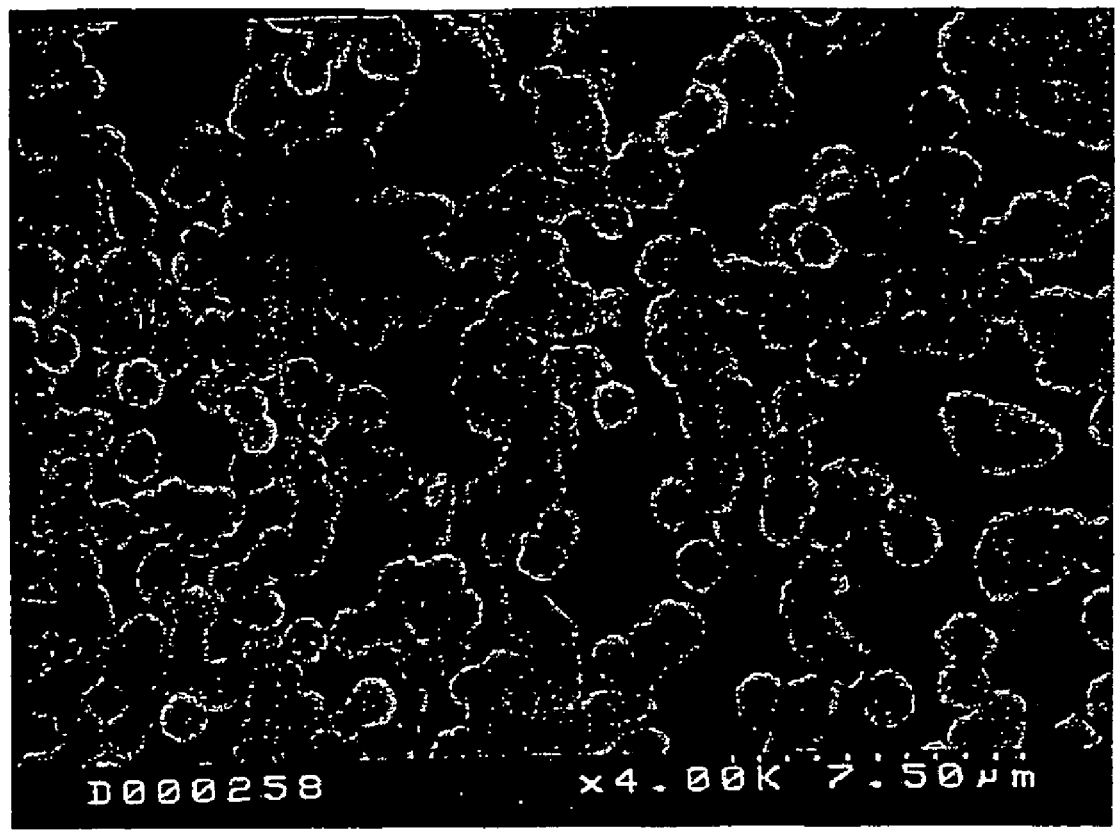

FIG. 35 is an SEM showing an enlarged view of region 2 from FIG. 33 of the top view of Cu layer near the surface region (SEM).

Figure 36:
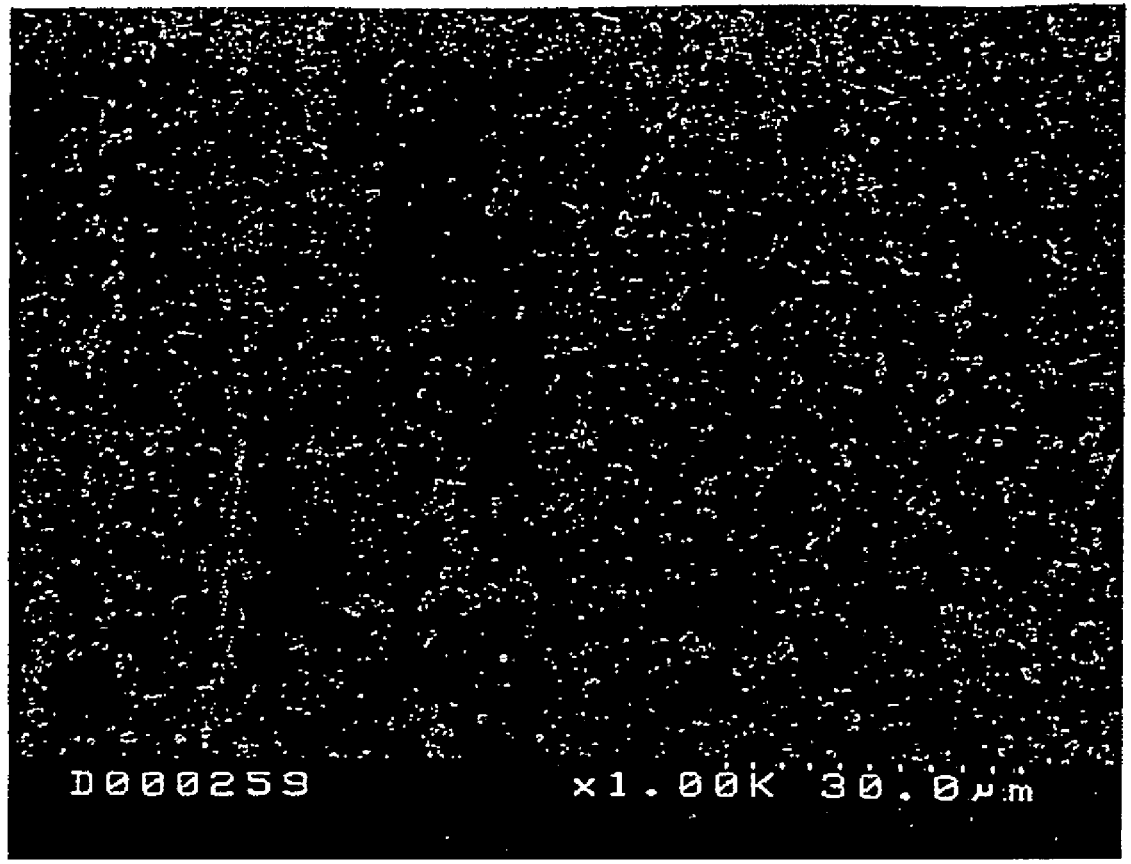

FIG. 36 is an SEM showing an enlarged view of region 3 from FIG. 33 of the top view of Cu layer near the surface region (SEM).

Figure 37:
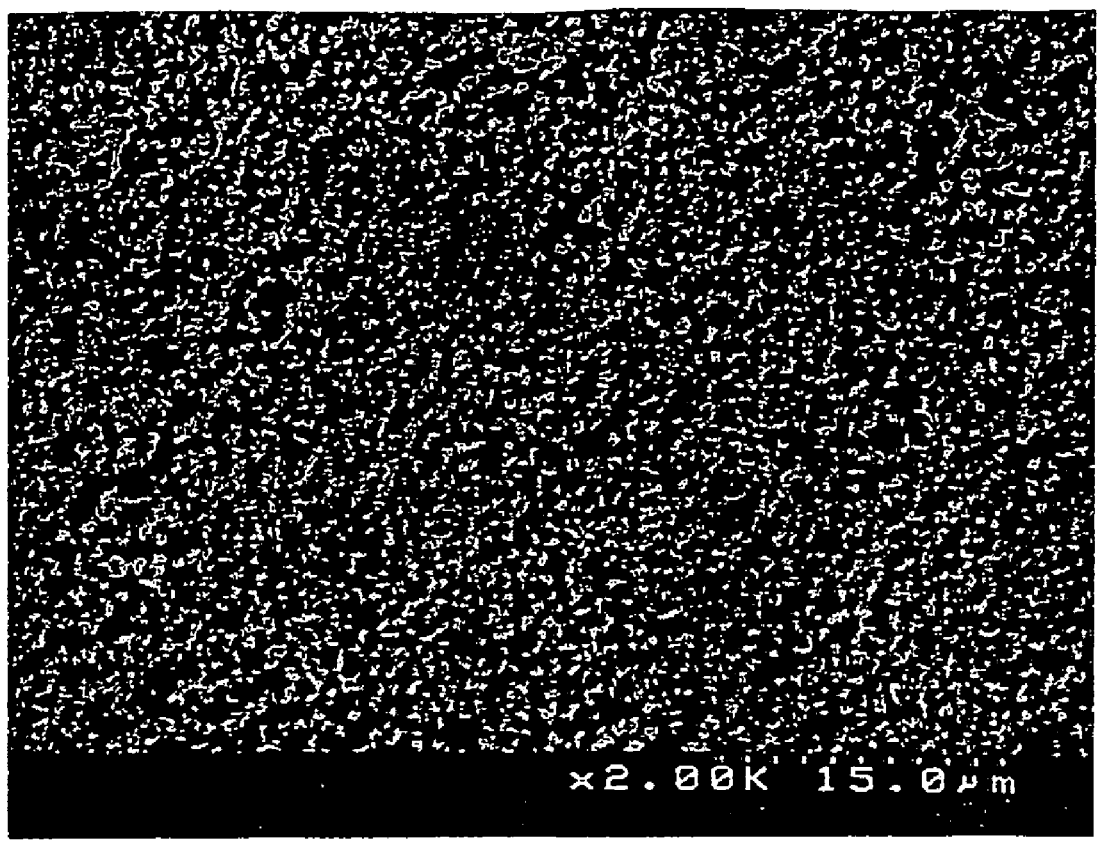

FIG. 37 is an SEM image of Co layer near the surface region (top view).

Figure 38:
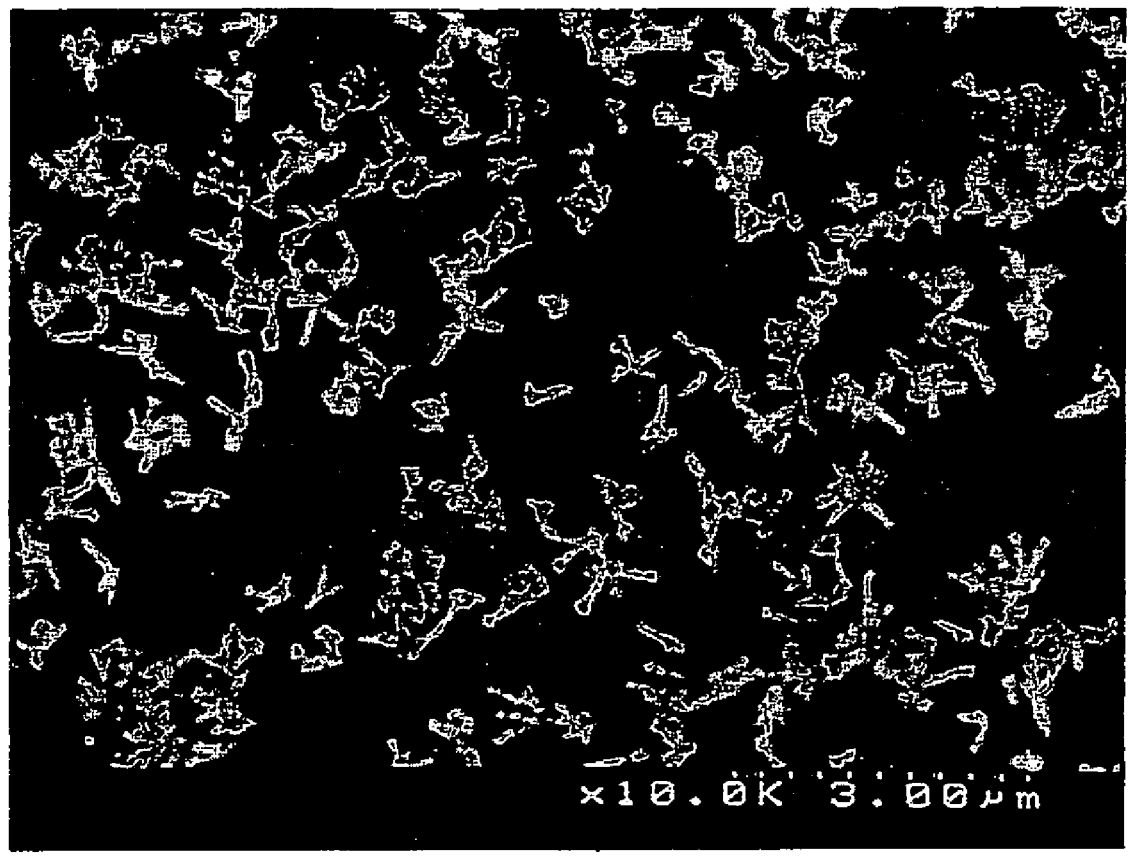

FIG. 38 is an SEM image of Co layer near the surface region showing an enlarged image of that in FIG. 37 in which cubic crystals may be seen.

Figure 39:
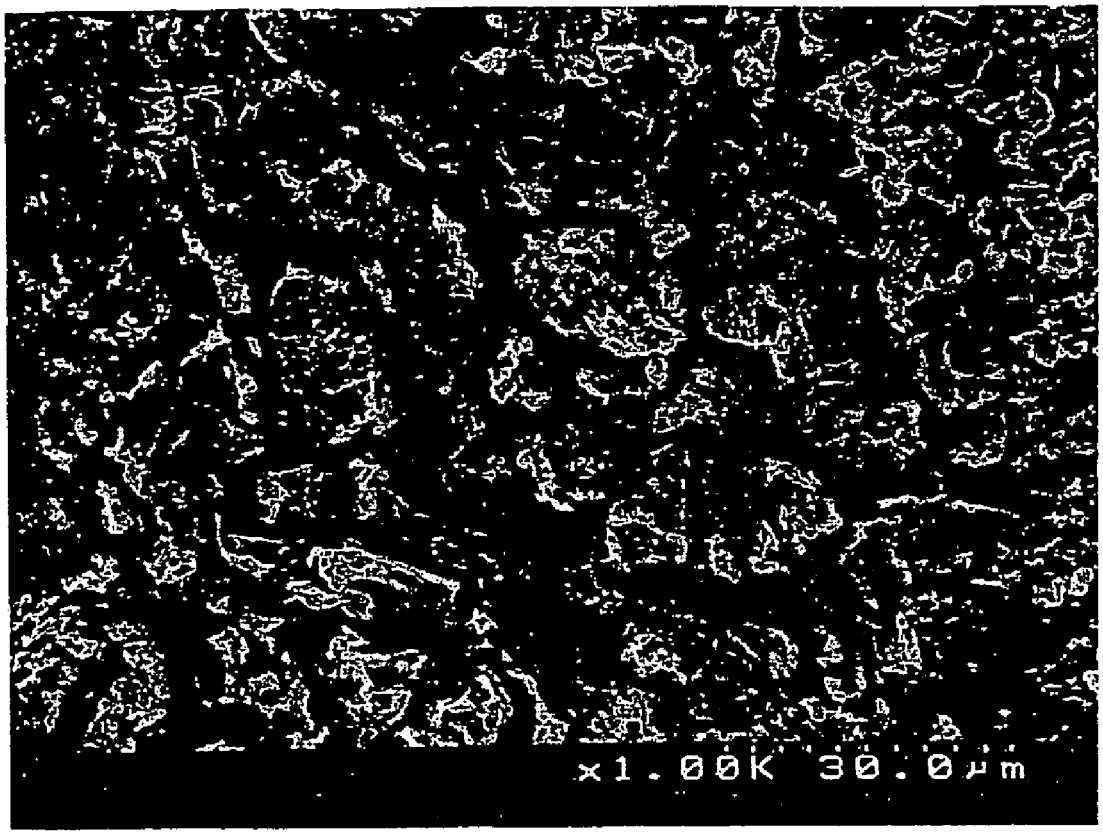

FIG. 39 is an SEM image of Ni layer near the surface region (top view).

Figure 40:
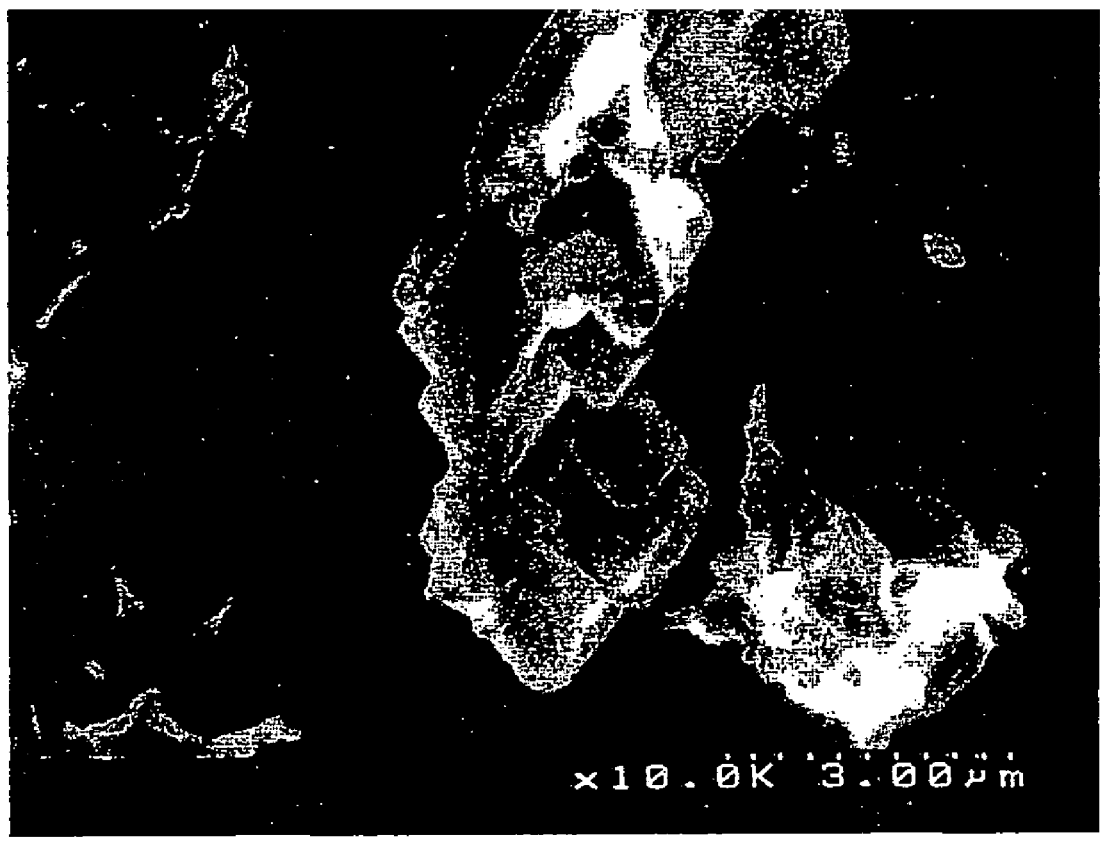

FIG. 40 is an SEM image of Ni layer near the surface region showing an enlarged image of that in FIG. 39 in which cubic crystals may be seen.

FIGS. 41A and 41B is an SEM image Cross-section of Rh layer having a thickness of 5~10 μm near the surface region (SEM). (b) is enlarged view of (a).

Figure 42:
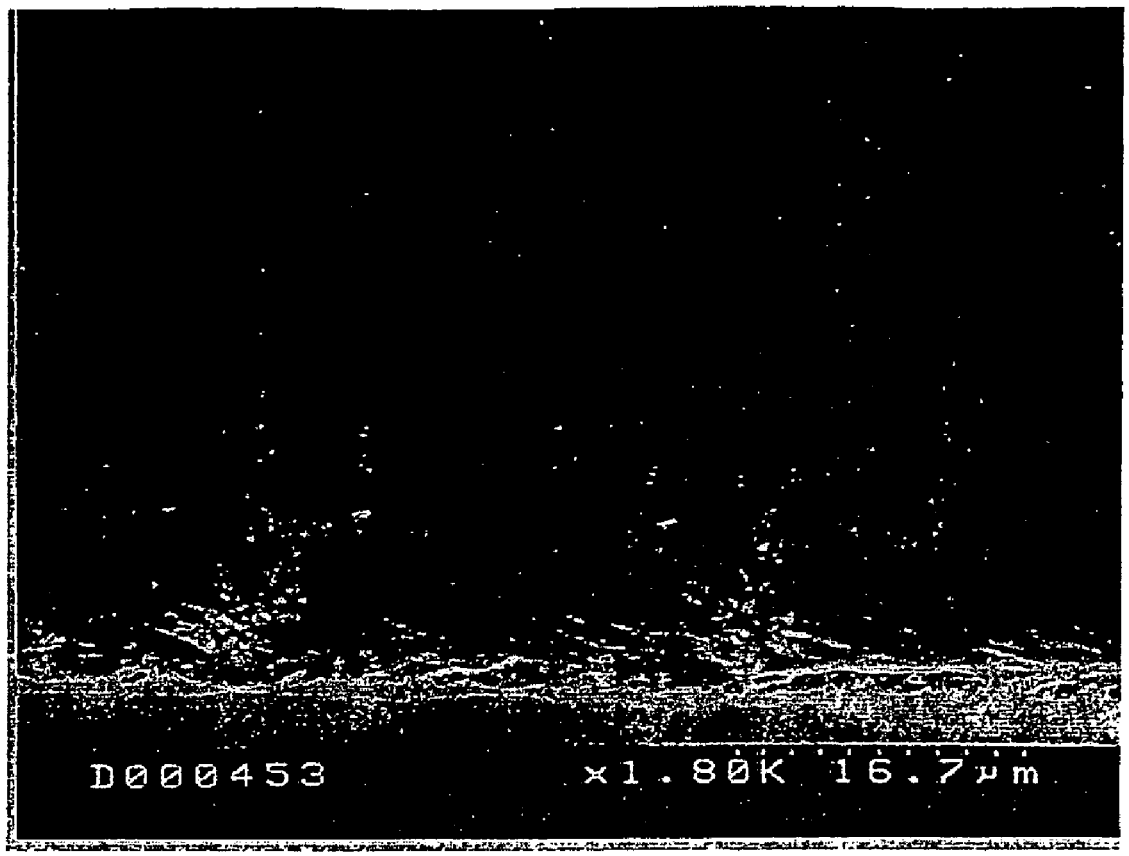

FIG. 42 is an SEM image of a Cross-section of Rh layer near the surface region (SEM) showing dendritic structures formed on some regions (reaching up to 20 μm).

Figure 43:
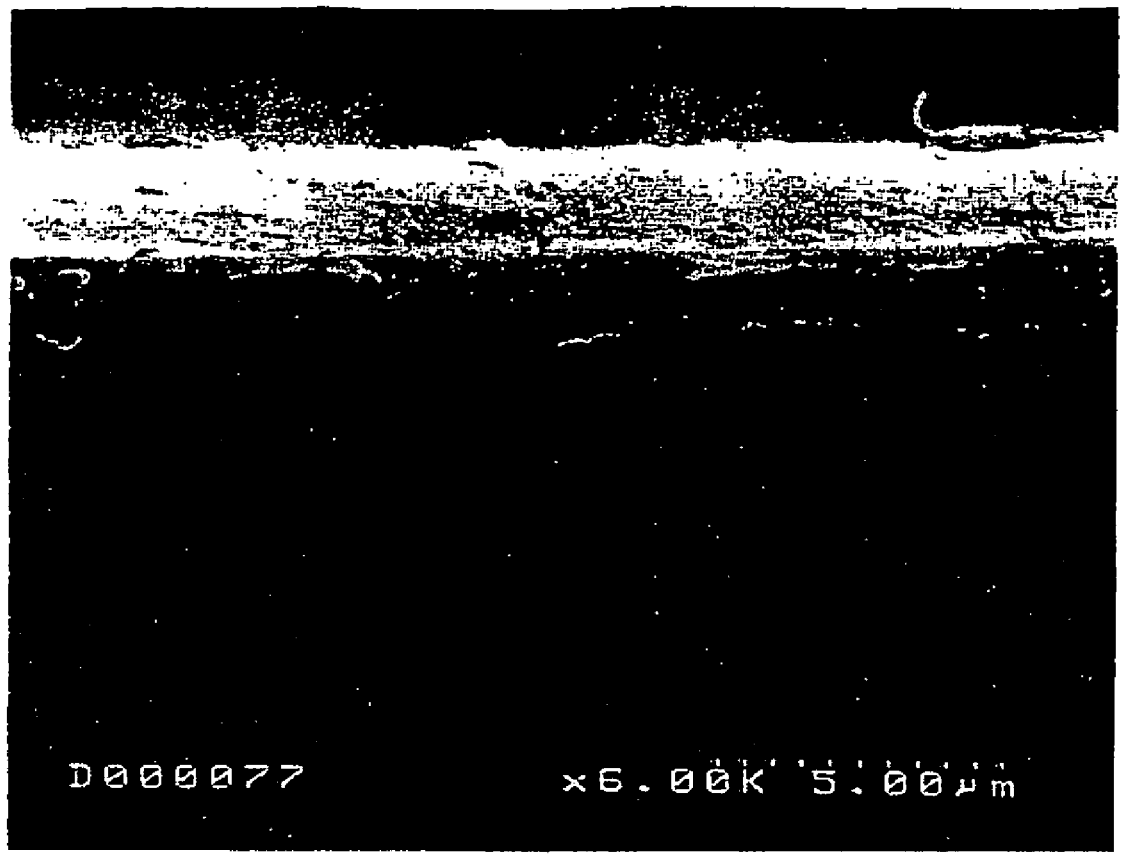

FIG. 43 is an SEM image Cross-section of Pt layer having a thickness of 3~5 μm near the surface region (SEM).

Figure 44:
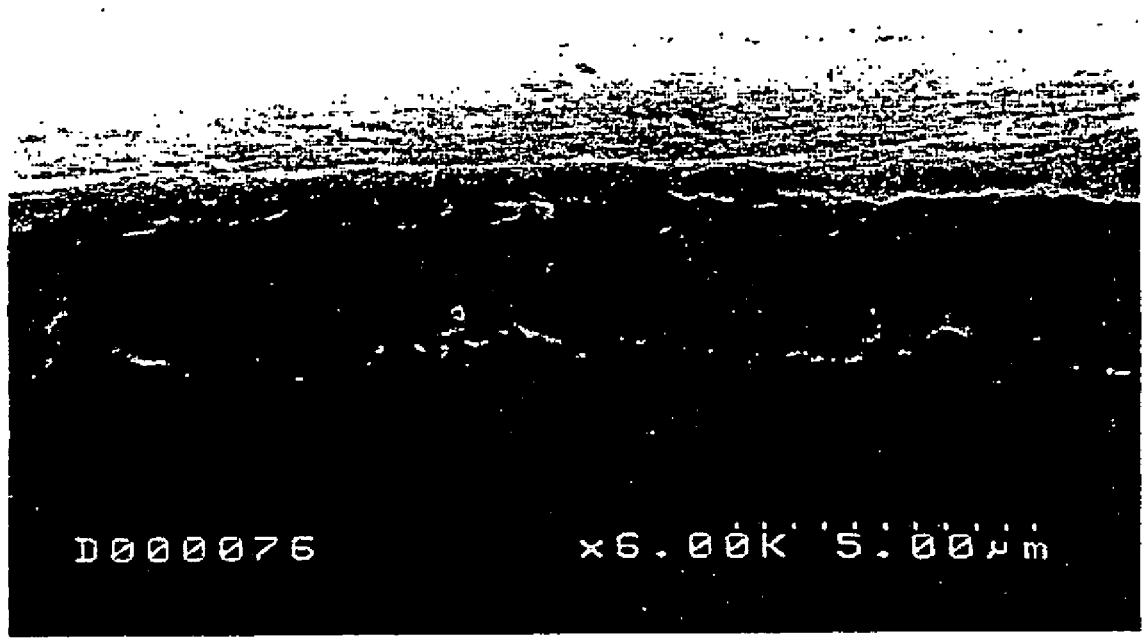

FIG. 44 is an SEM image Cross-section of Ru layer having a thickness of ~5 μm near the surface region (SEM).

Figure 45:
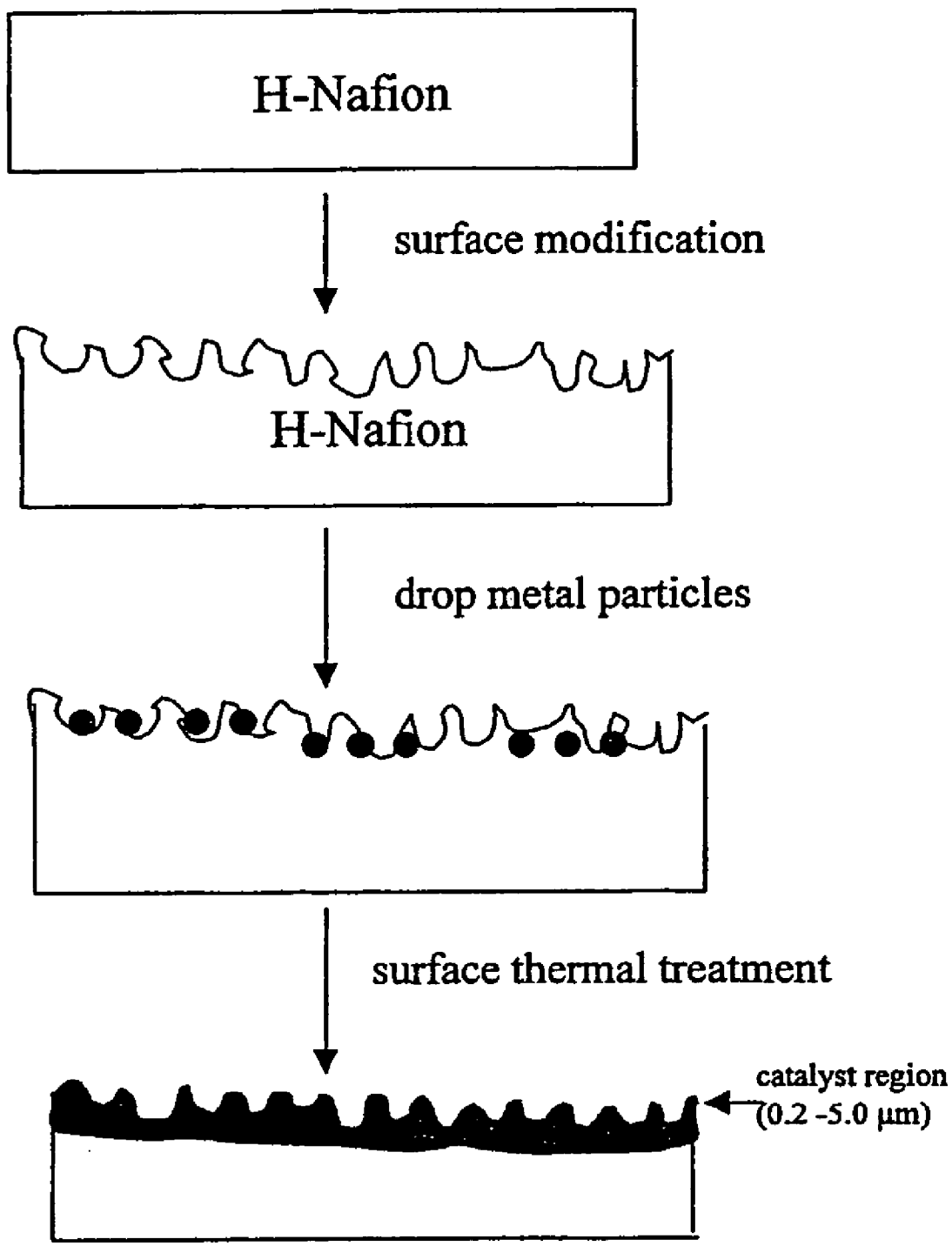

FIG. 45 is an illustration showing the stepwise process of a physical deposition method for depositing a catalyst layer on a membrane surface.

Figure 46:
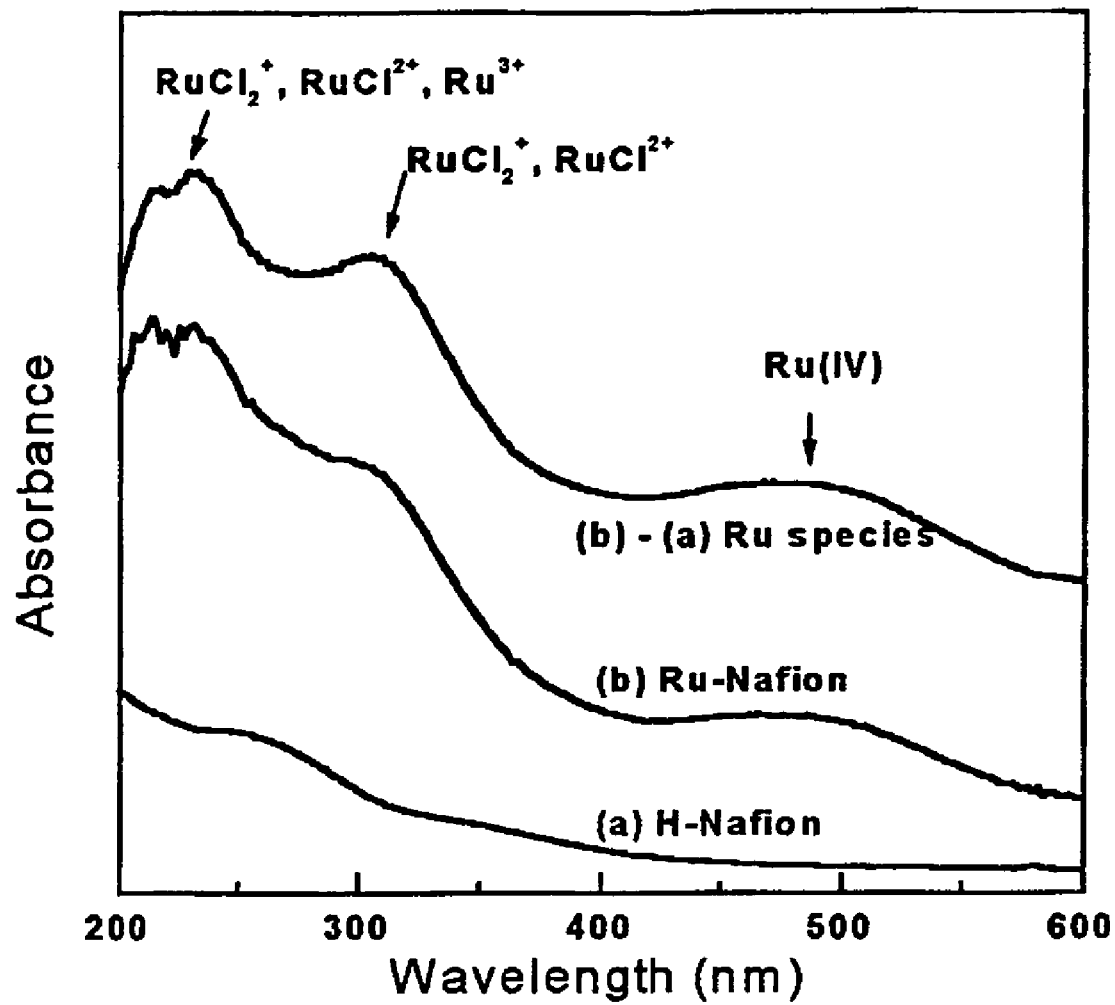

FIG. 46 is a UV-Vis spectra of Nafion® 161 membrane before and after ion-exchange with $RuCl_3 \cdot 3H_2O$ aqueous solution showing: (a) hydrogen form Nafion®, (b) ruthenium containing Nafion®, and (b)-(a) subtraction of absorption of two membranes, giving the information of ruthenium species alone.

Figure 47:
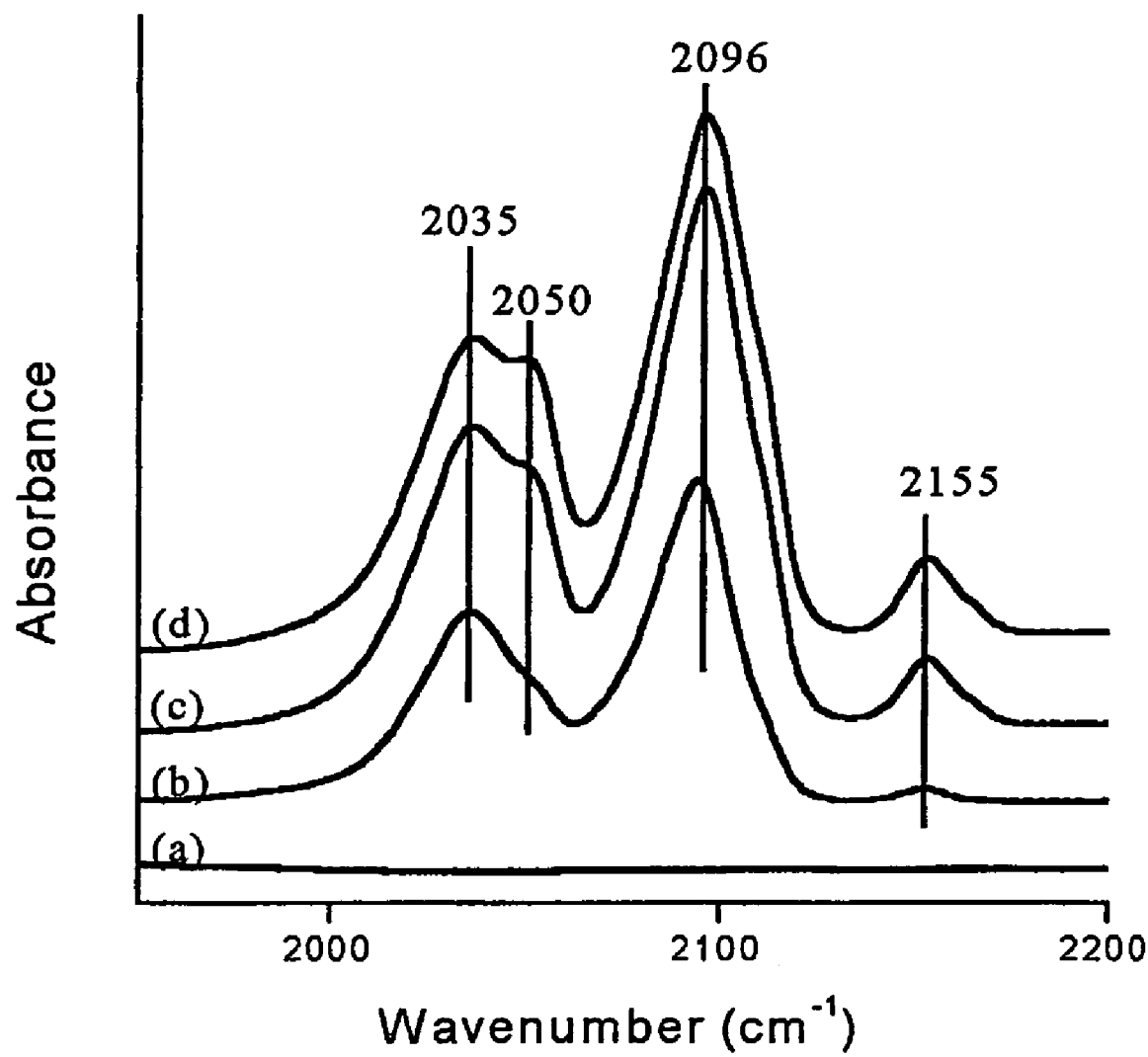

FIG. 47 is an FTIR spectra of Ru(III)-Nafion® 161 membranes showing: (a) after evacuated in vacuum at 20° C. for 1 hour and (b), (c) and (d) show spectra after the membrane is reacted with 400 torr CO at 95° C. for 6 hours, 25 hours and 50 hours, respectively.

Figure 48:
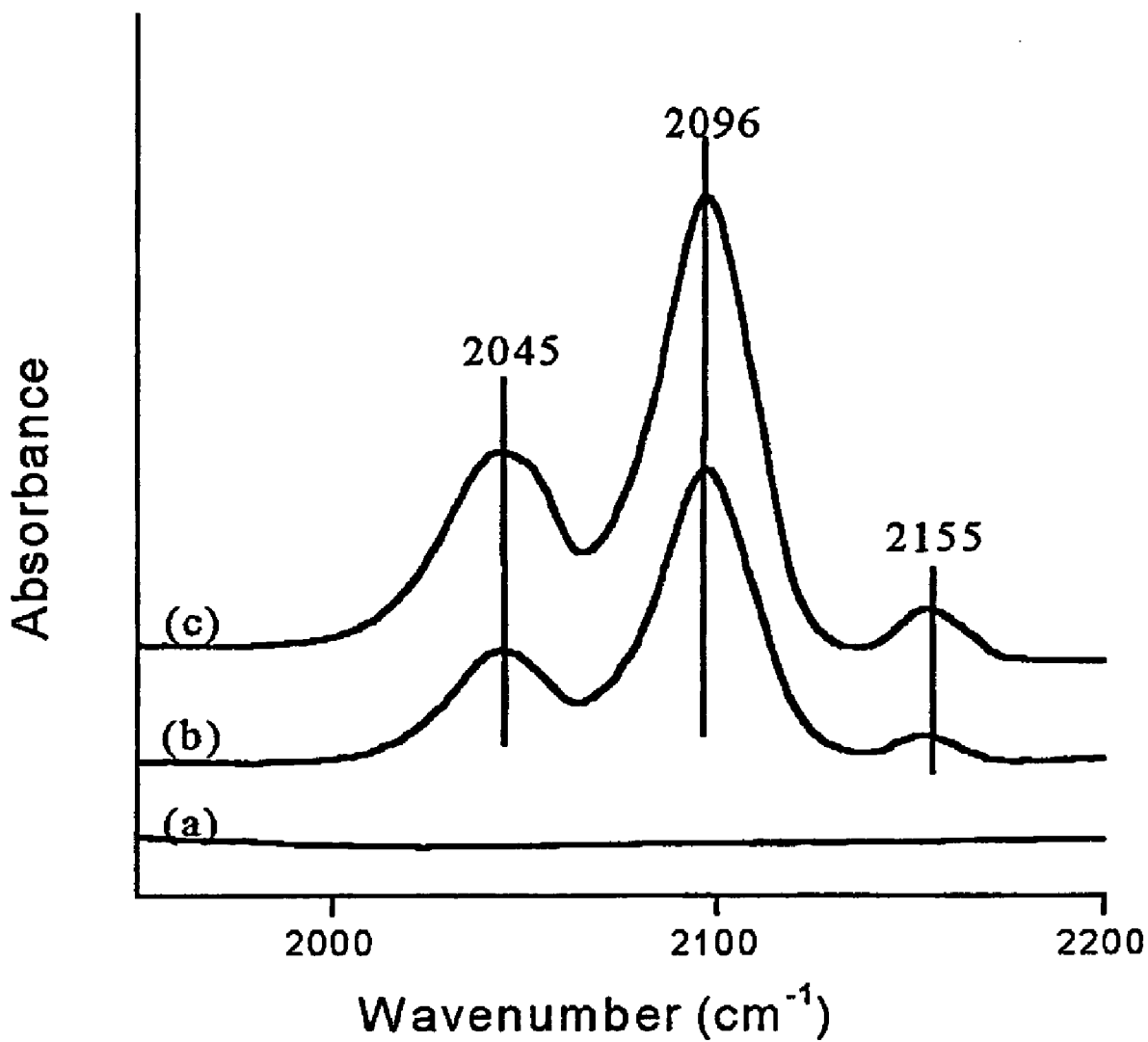

FIG. 48 are FTIR spectra of Ru(III)-Nafion® 161 membranes (a) after evacuated in vacuum at 180° C. for 16 hour and, in (b) and (c), after being reacted with 400 torr CO at 95° C. for 8 hours and 28 hours, repectively.

Figure 49:
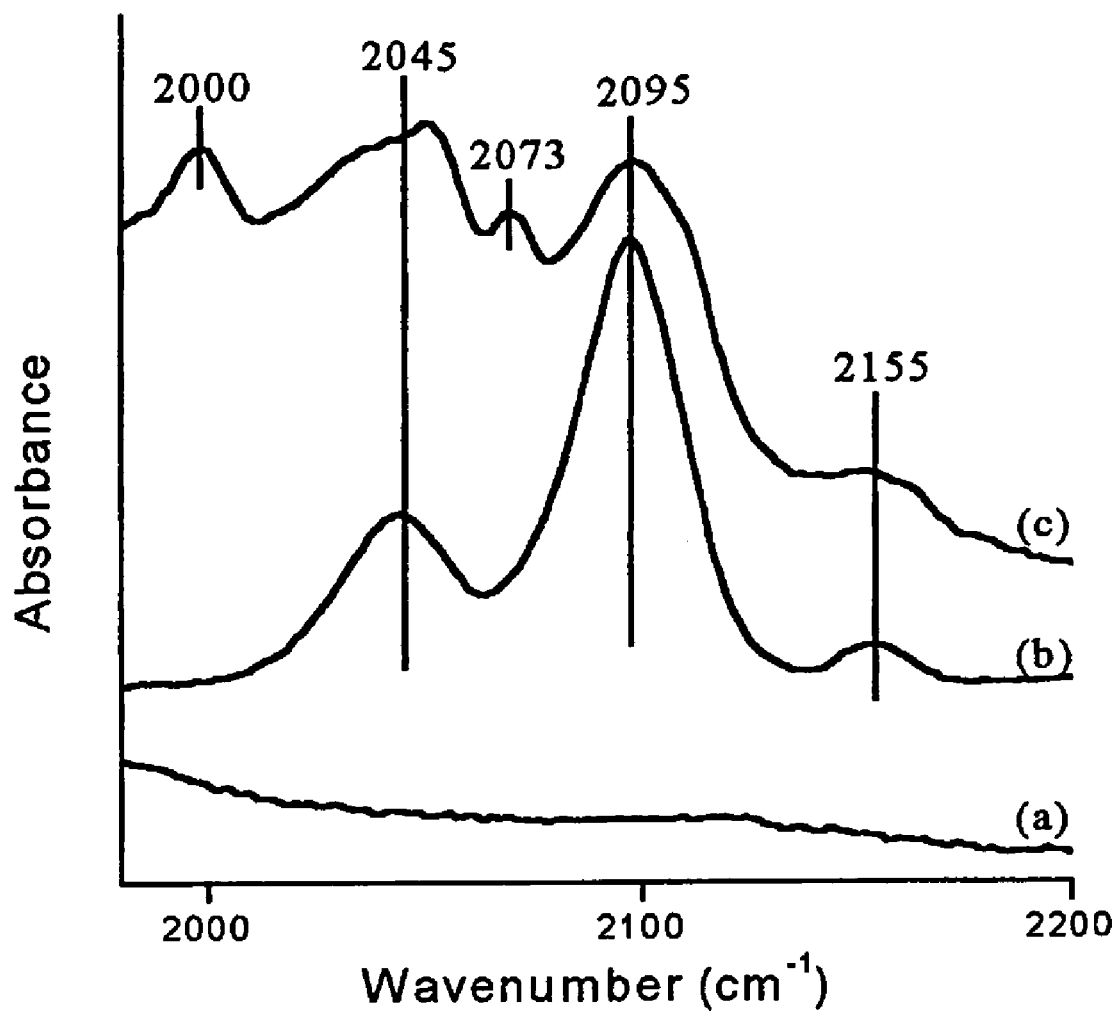

FIG. 49 are FTIR spectra of Ru(III)-Nafion® 161 membranes (a) after evacuated in vacuum at 180° C. for 16 hour and (b) reacted with 400 torr CO at 95° C. for 8 hours and (c) then reacted with 1 atm $H_2$ at 180° C. for 22 hours.

Figure 50:
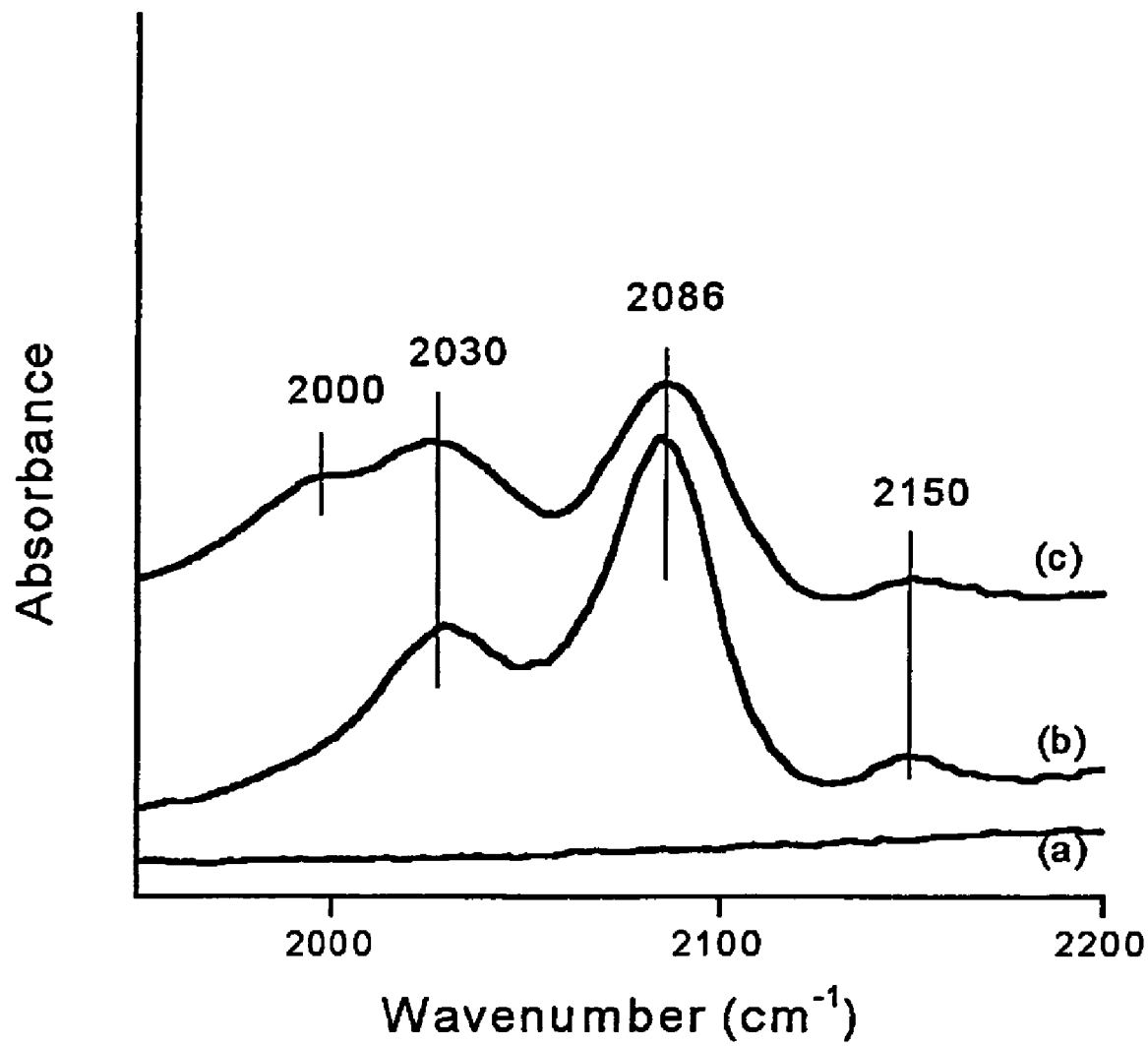

FIG. 50 are FTIR spectra of Ru-Nafion® 161 membranes (a) Nafion® membranes soaked in $RuCl_3$ solution for 20 hrs, then stirred in refluxing EtOH (~90° C.) for 4 hrs and (b) reacted with 400 torr CO at 95° C. for 22 hours and (c) then reacted with 1 atm $H_2$ at 170° C. for 19 hours.

Figure 51:
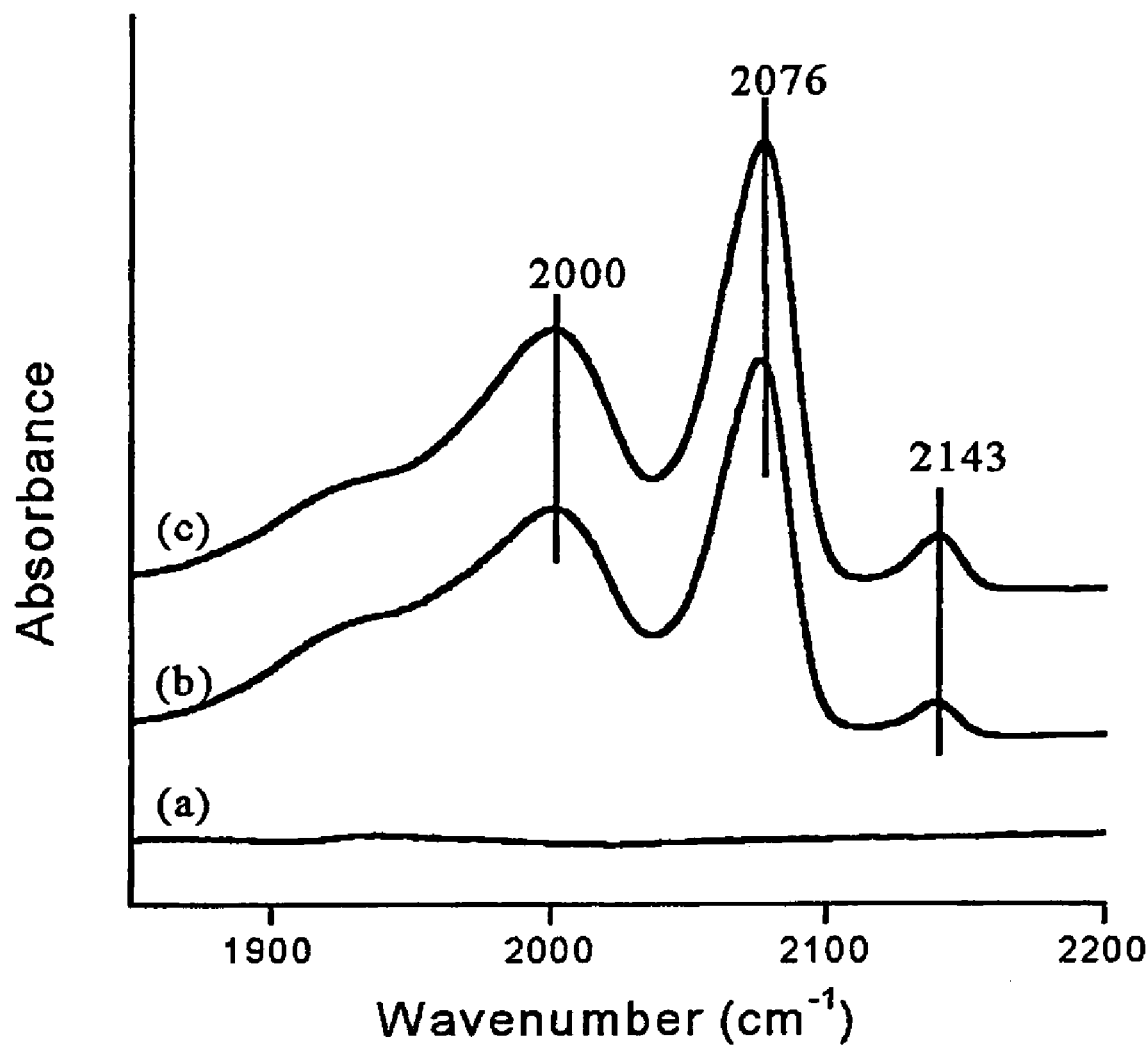

FIG. 51 are FTIR spectra of Ru(0)-Nafion® 161 membranes (a) Nafion® membranes soaked in $RuCl_3$ solution for 20 hrs, then stirred in $NaBH_4$ solution ($H_2O$/EtOH, 1/1, v/v) for 1 hr (b) and (c) reacted with 400 torr CO at 95° C. for 8 hours and 34 hours, respectively.

Figure 52:
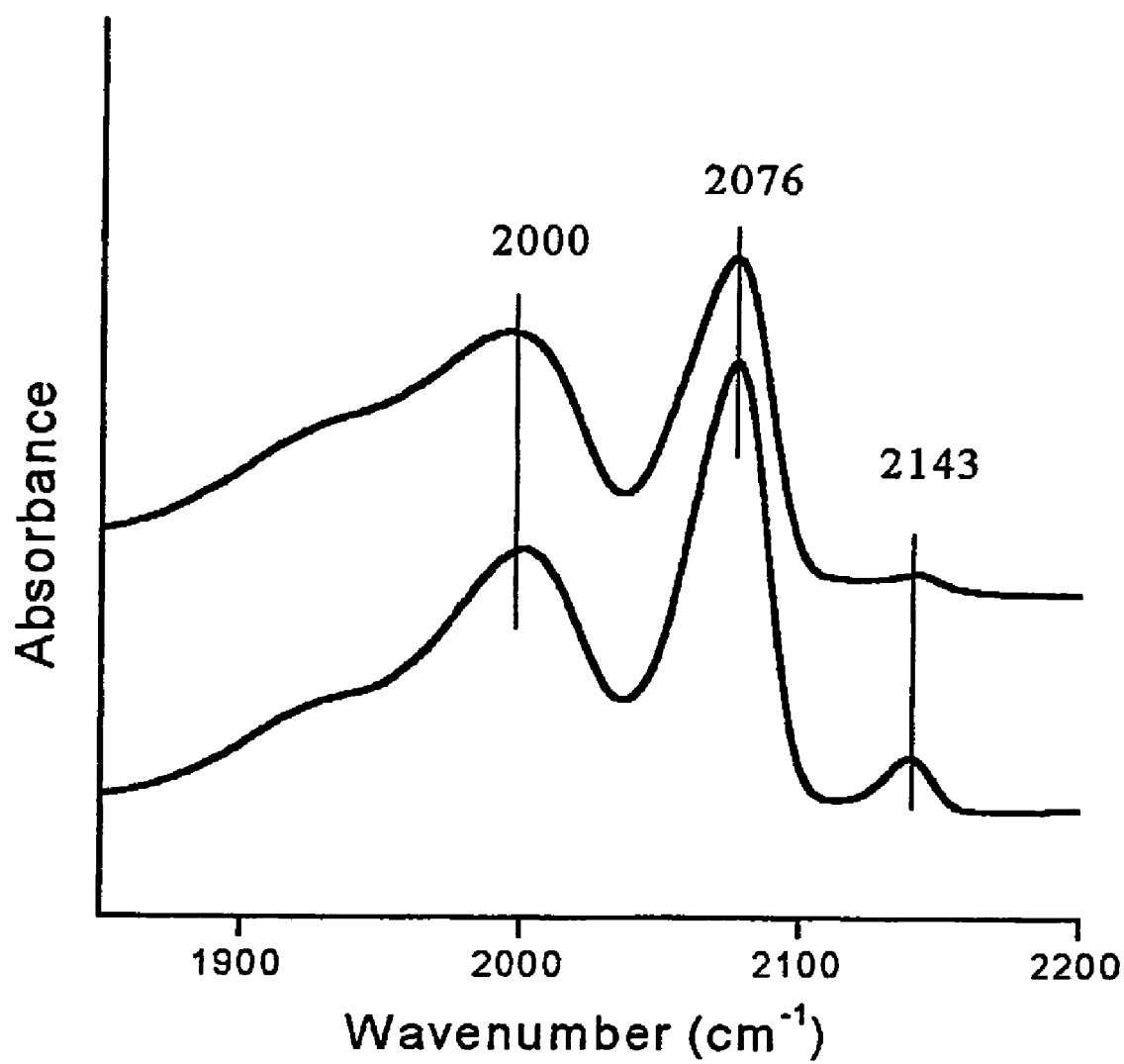

FIG. 52 are FTIR spectra of Ru(0)-Nafion® 161 membranes (a) Nafion® membranes soaked in $RuCl_3$ solution for 20 hrs, then stirred in $NaBH_4$ solution ($H_2O$/EtOH, 1/1, v/v) for 1 hr then reacted with 400 torr CO at 95° C. for 34 hours (b) re-exposed to 400 torr $H_2$ at 180° C. for 11 hours.

Figure 53:
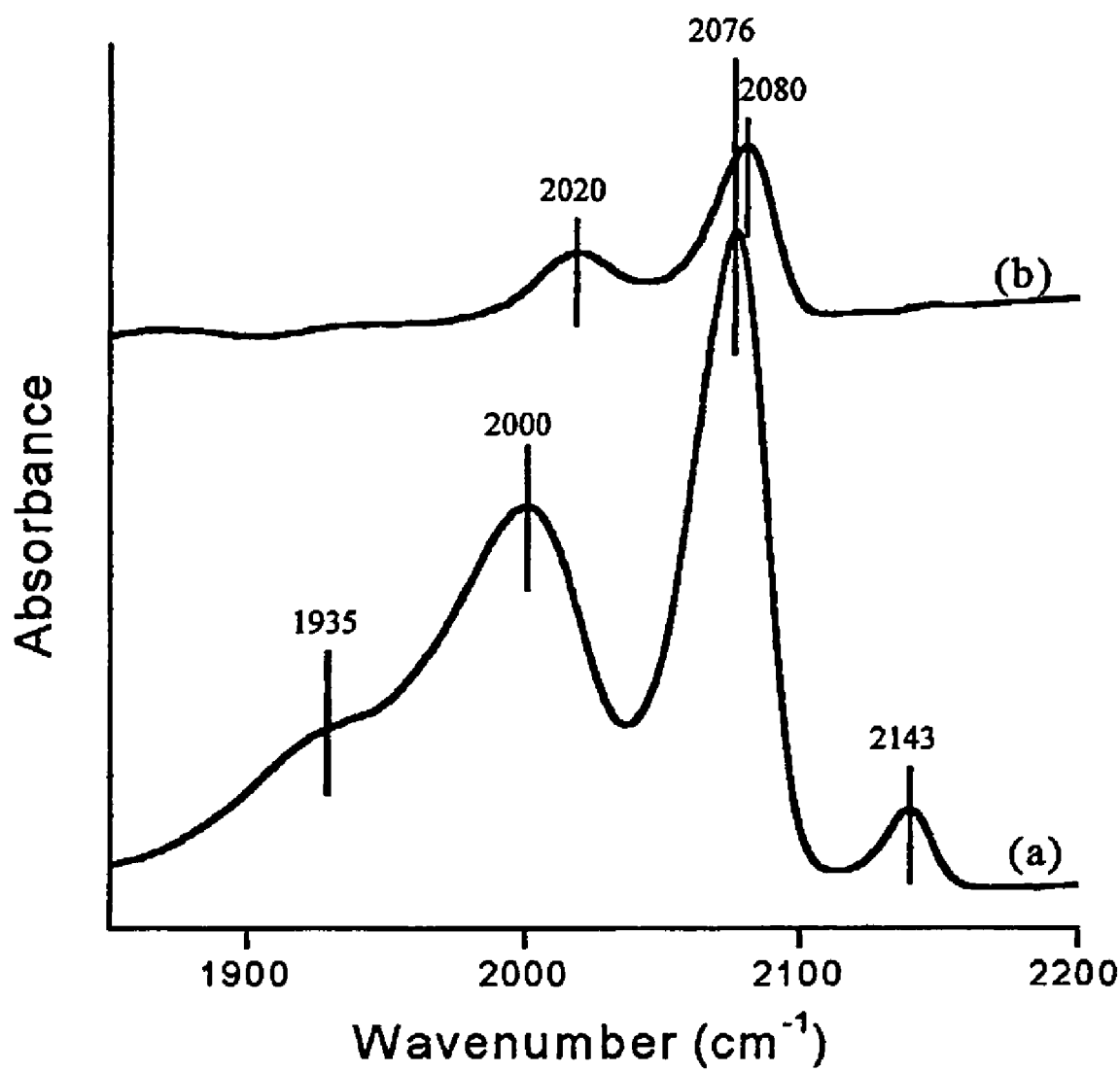

FIG. 53 are FTIR spectra of Ru(0)-Nafion® 161 membranes (a) Nafion® membranes soaked in $RuCl_3$ solution for 20 hrs, then stirred in $NaBH_4$ solution ($H_2O$/EtOH, 1/1, v/v) for 1 hr then reacted with 400 torr CO at 95° C. 34 hours (b) re-exposed to 400 torr $O_2$ at 180° C. for 11 hours.

Figure 54:
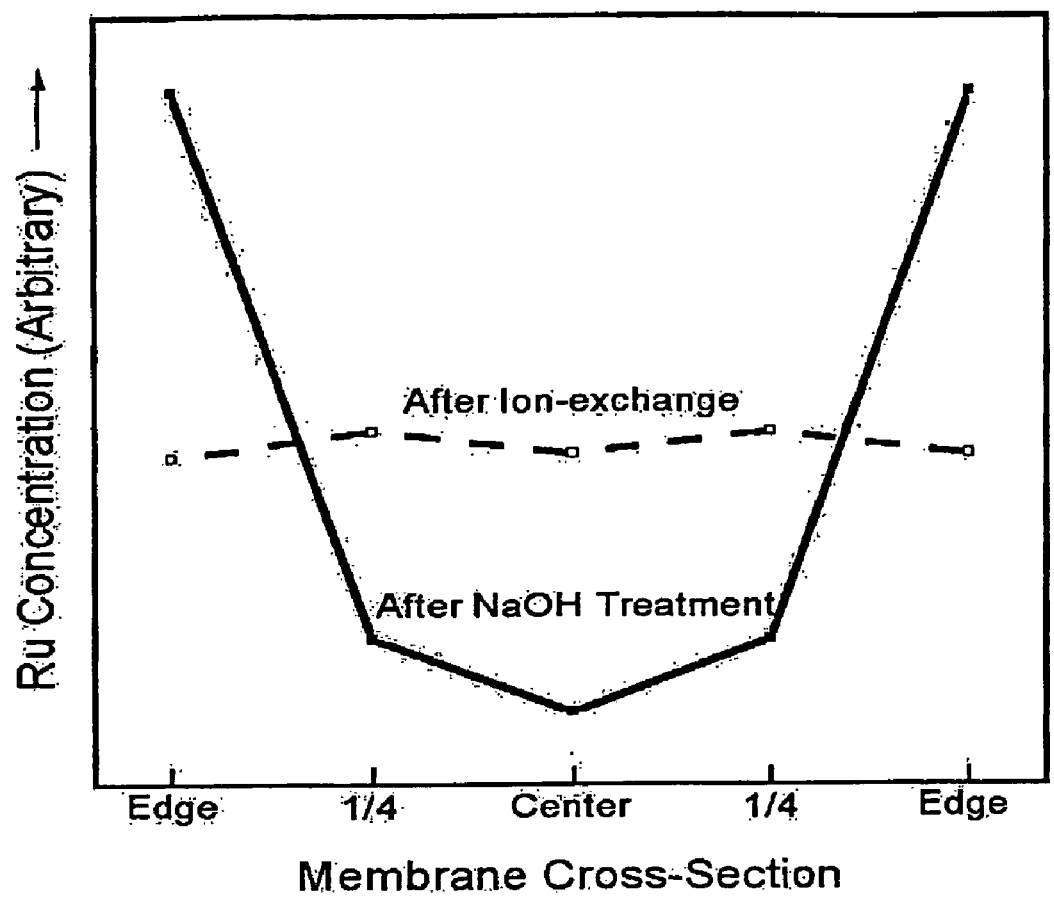

FIG. 54 is a chart showing ruthenium distribution in Ru(III)-Nafion® membrane (ion-exchange with $RuCl_3$ solution) before and after soaking in NaOH solution.

Figure 55:
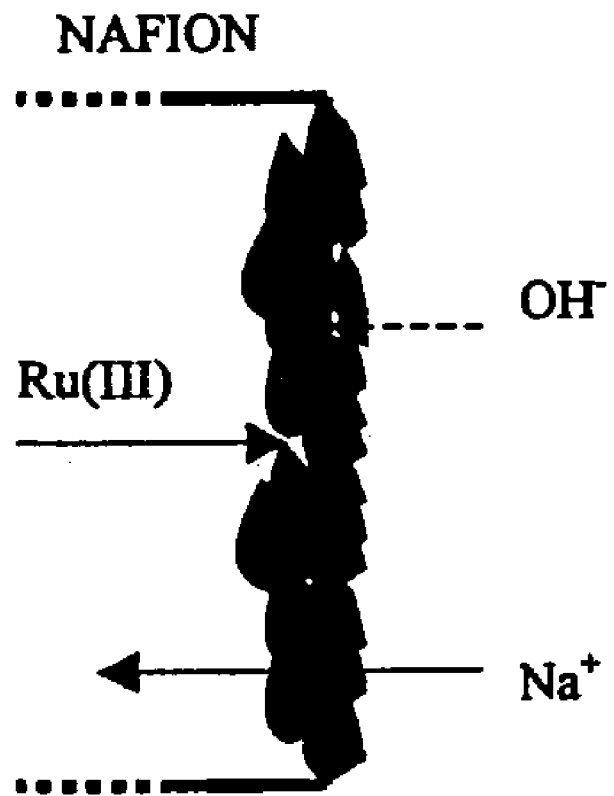

FIG. 55 is an illustration showing the precipitation process of ruthenium oxides in the near surface region of Nafion® membrane.

Figure 56:
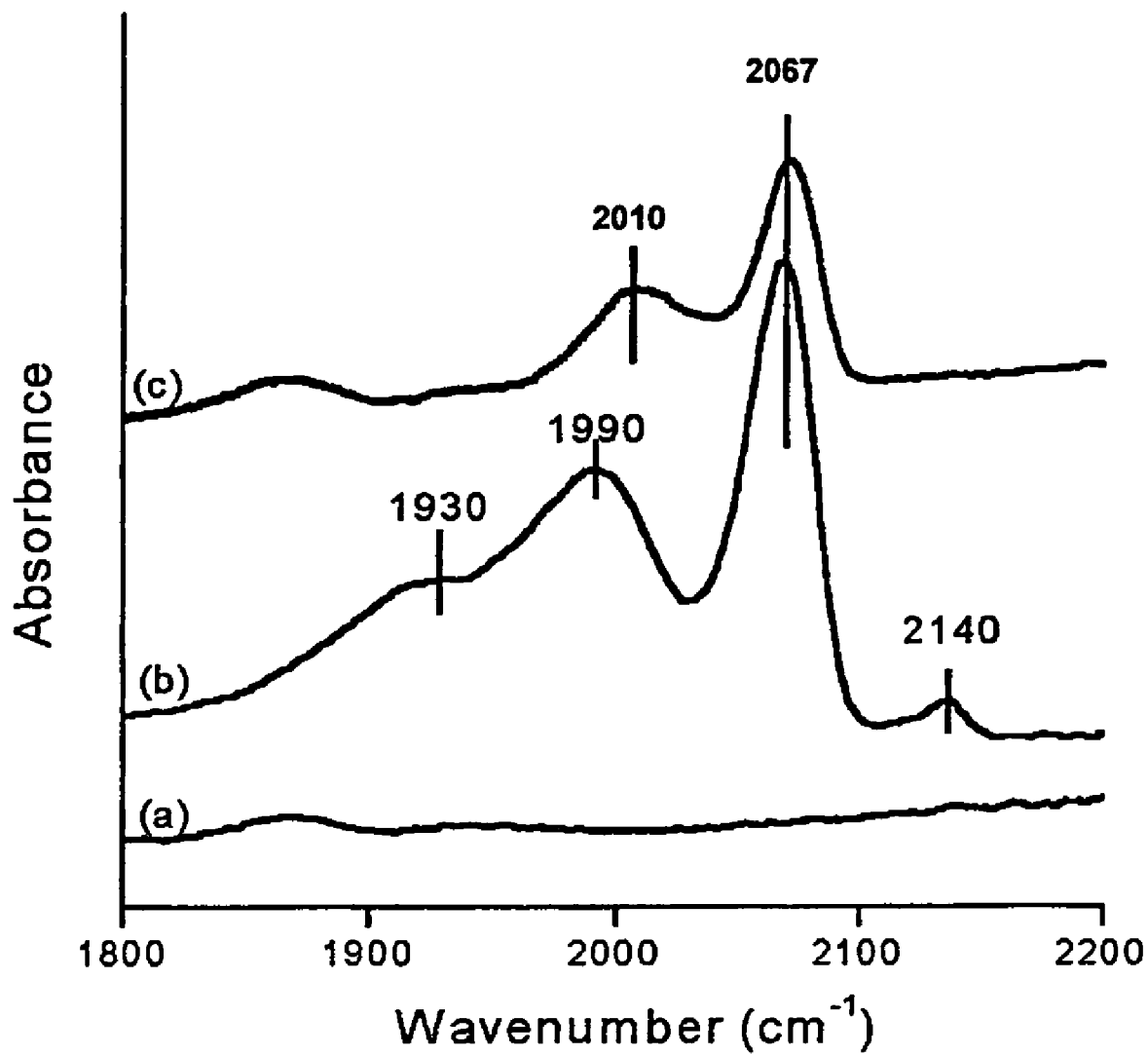

FIG. 56 are FTIR spectra of $RuO_x$-Nafion® 161 membrane showing (a) Nafion® membrane soaked in $RuCl_3$ solution for 20 hrs, then stirred in NaOH aqueous solution for 1 hr; (b) The membrane in (a) after being reacted with 400 torr CO at 110° C. for 11 hours; and (c) The spectrum of the membrane in (b) after it had been exposed to 400 torr $O_2$ at 110° C. for 4 hours.

Figure 57:
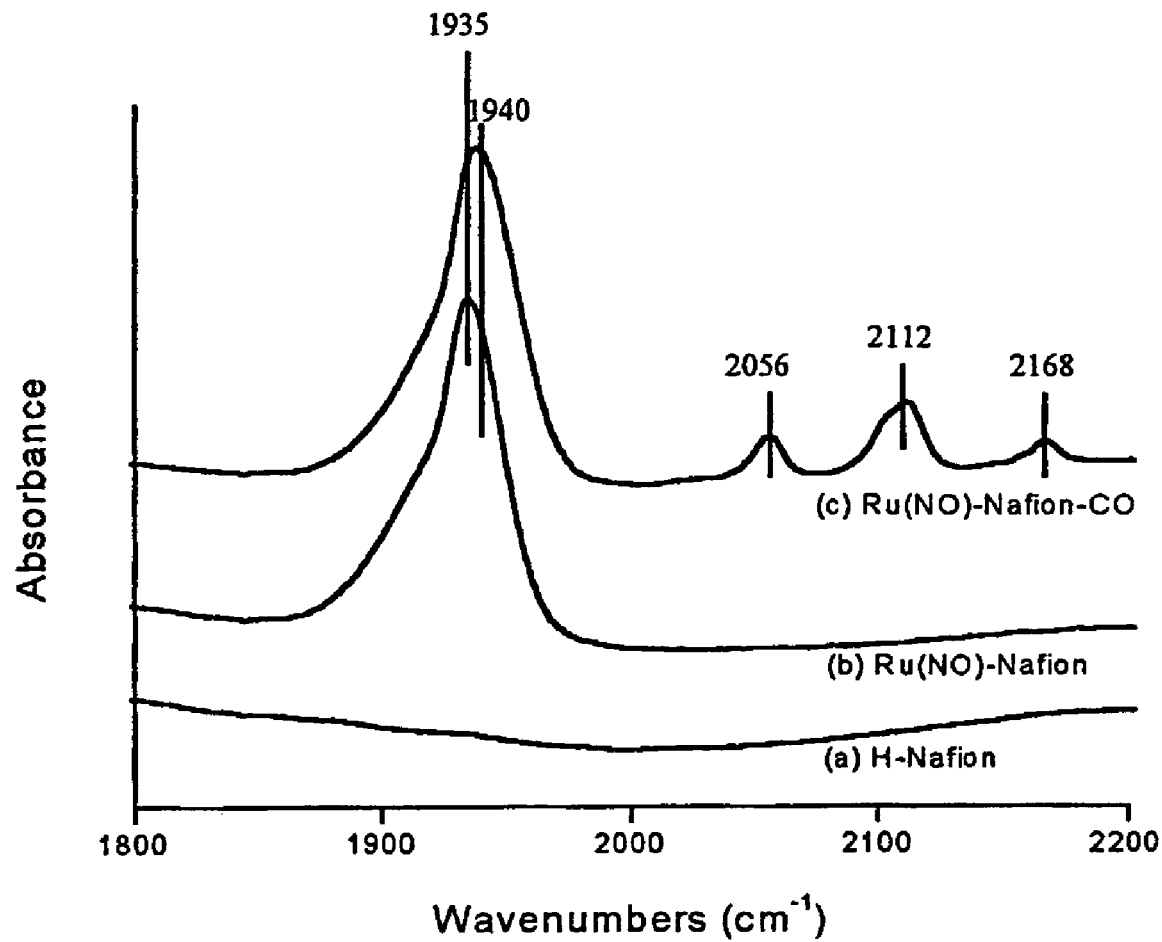

FIG. 57 are FTIR spectra of Nafion® 161 membranes showing (a) hydrogen form Nafion® membrane; (b) Nafion® membrane soaked in $Ru(NO)Cl_3$ aqueous solution for 20 hrs; and (c) reacted with 400 torr CO at 100° C. for 23 hours.

Figure 58:
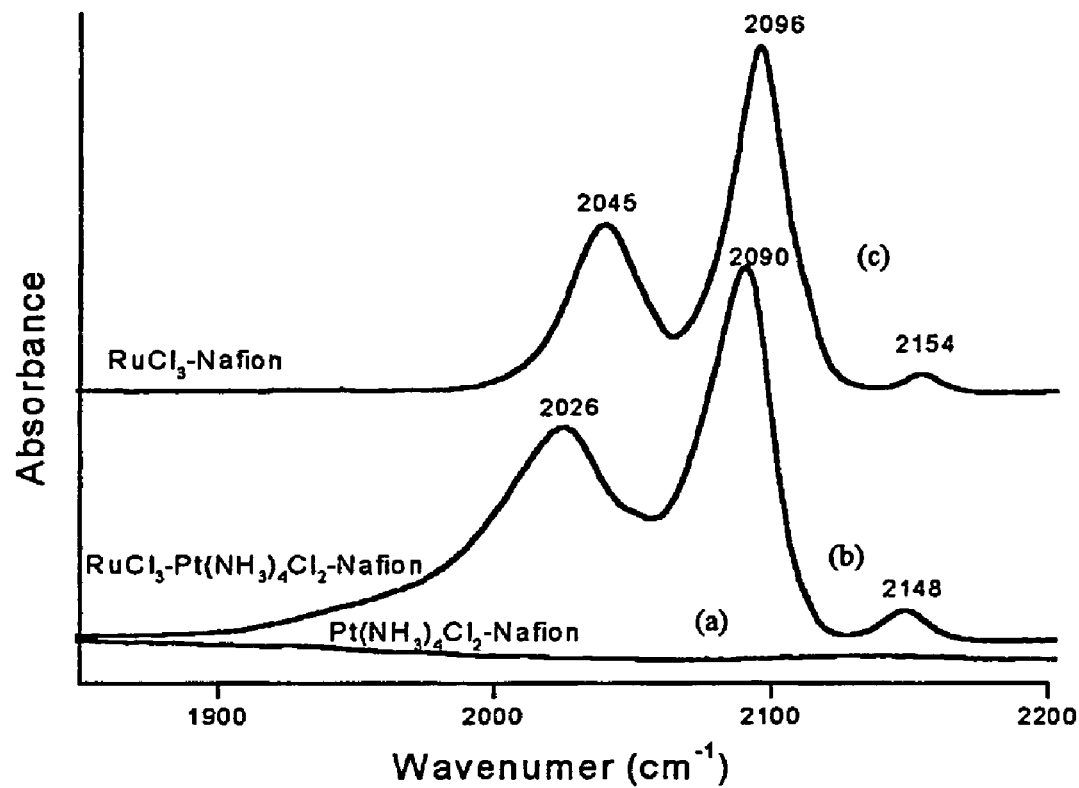

FIG. 58 are FTIR spectra of Nafion® 161 membranes showing (a) Nafion® membrane exchanged with $Pt(NH_3)_4Cl_2$ solution for 20 hours; (b) Nafion® membrane exchanged with $RuCl_3$ solution for 10 hrs, then with $Pt(NH_3)_4Cl_2$ solution for 10 hours; and (c) Nafion® membrane exchanged with $RuCl_3$ solution for 20 hrs. All the membranes reacted with 400 torr CO at 100° C. for 5 hours.

Figure 59:
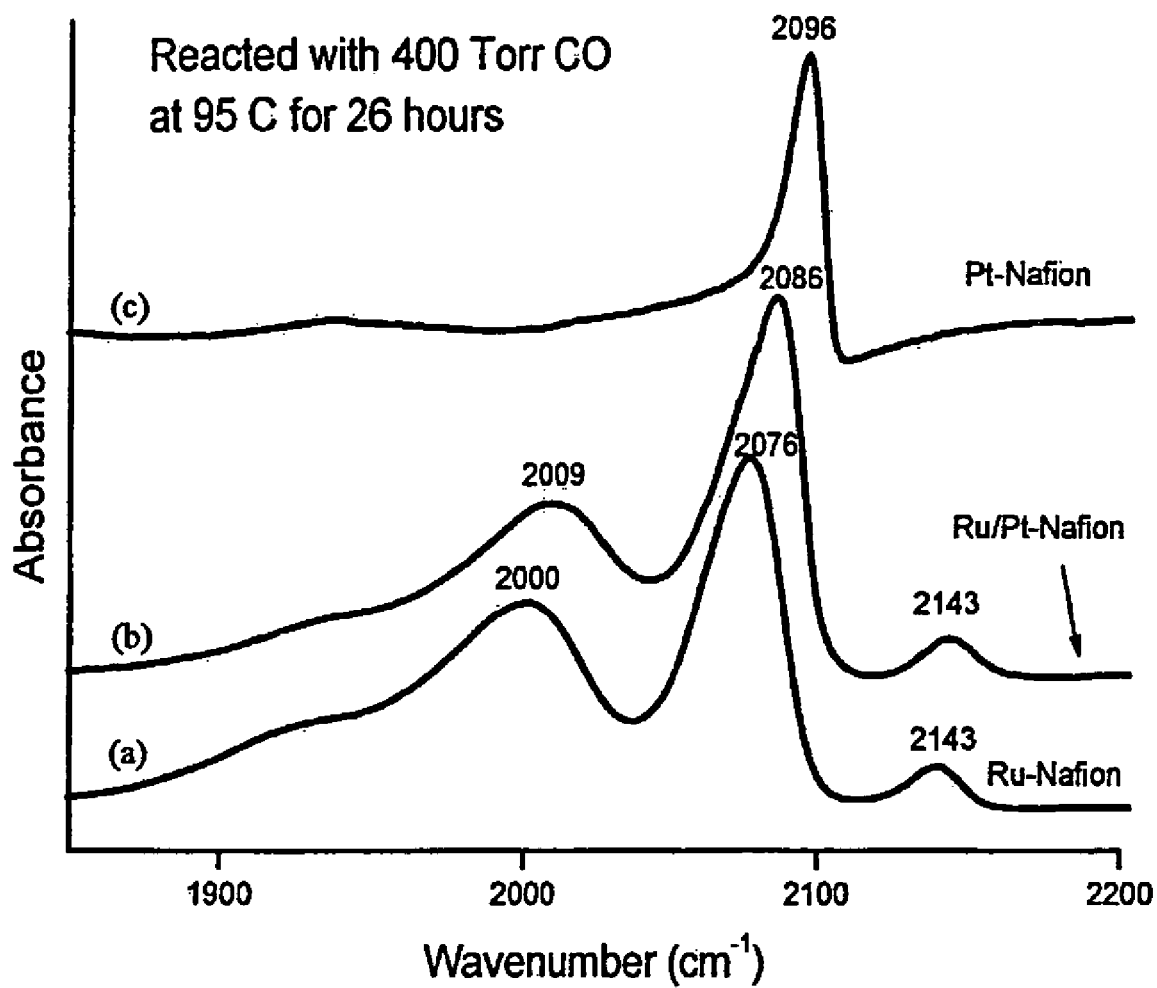

FIG. 59 are FTIR spectra of Nafion® 161 membranes showing (a) Nafion® membrane exchanged with $RuCl_3$ solution for 20 hrs, then reduced by $NaBH_4$ solution to form Ru(0)-Nafion®; (b) Nafion® membrane exchanged with $RuCl_3$ solution for 10 hrs, then with $Pt(NH_3)_4Cl_2$ solution for 10 hours, and then reduced by $NaBH_4$ solution to form Ru(0)/Pt(0)-Nafion®; and (c) Nafion® membrane exchanged with $Pt(NH_3)_4Cl_2$ solution for 20 hours, then reduced by $NaBH_4$ solution to form Pt(0)-Nafion®. All the membranes reacted with 400 torr CO at 95° C. for 26 hours.

DETAILED DESCRIPTION OF THE INVENTION

Fuel Cells are devices that convert the energy of a chemical reaction into electrical energy. There are many types of fuel cells including solid oxide (SOFC), molten carbonate (MCFC), phosphoric acid (PAFC), alkaline (AFC), and polymer electrolyte (PEFC) fuel cells. Although the methods of the present invention and much of the following discussion is related to polymer electrolyte membranes and low temperature PEFC fuel cells based on chemical reactions in which hydrogen, $H_2$, is oxidized by oxygen, $O_2$, to yield water, $H_2O$, the invention is not so limited and is also relevant to other types of fuel cells such as analogous low temperature fuel cells, including those in which methanol, $CH_3OH$, or other small molecules serve as fuel. Thus, although the main focus of this work is on physical and chemical modification of a proton-transporting membrane that is the key to the operation of such fuel cells, it is also applicable to other polymer electrolyte membranes that conduct other ionic species besides protons. As used herein, the term "polymer electrolyte membrane" is used to refer to an ion conducting polymeric membrane.

Figure 1:
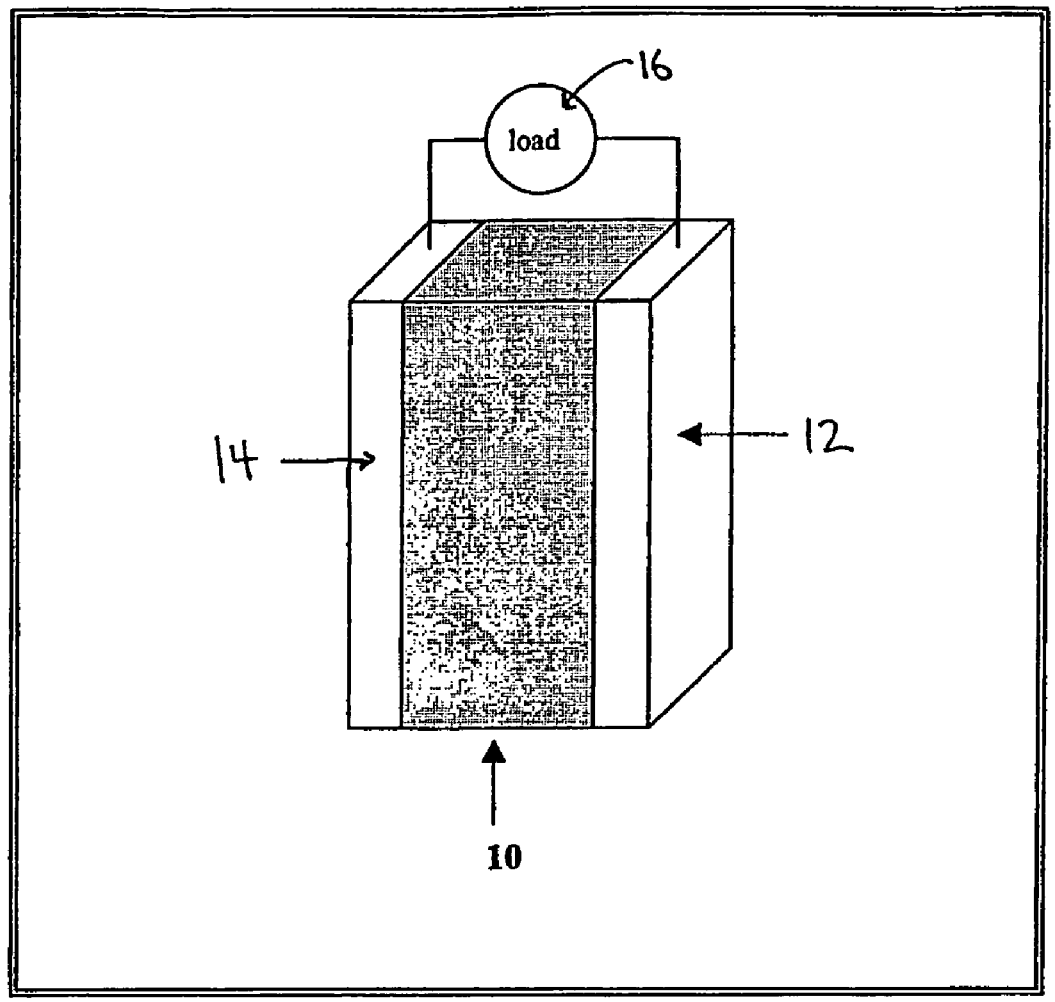
FIG. 1 is a schematic of a polymer electrolyte fuel cell (PEFC).

A low temperature $H_2/O_2$ fuel cell with a polymeric membrane electrolyte commonly is abbreviated PEFC, and a schematic of it is shown in FIG. 1. The fuel cell comprises a polymer electrolyte membrane 10, sandwiched between an anode 12 and a cathode 14 connected across an external load 16, such as a motor or the like. To produce a greater voltage, a number of such fuel cells are typically stacked side by side to form a fuel cell array (not shown).

Figure 2:
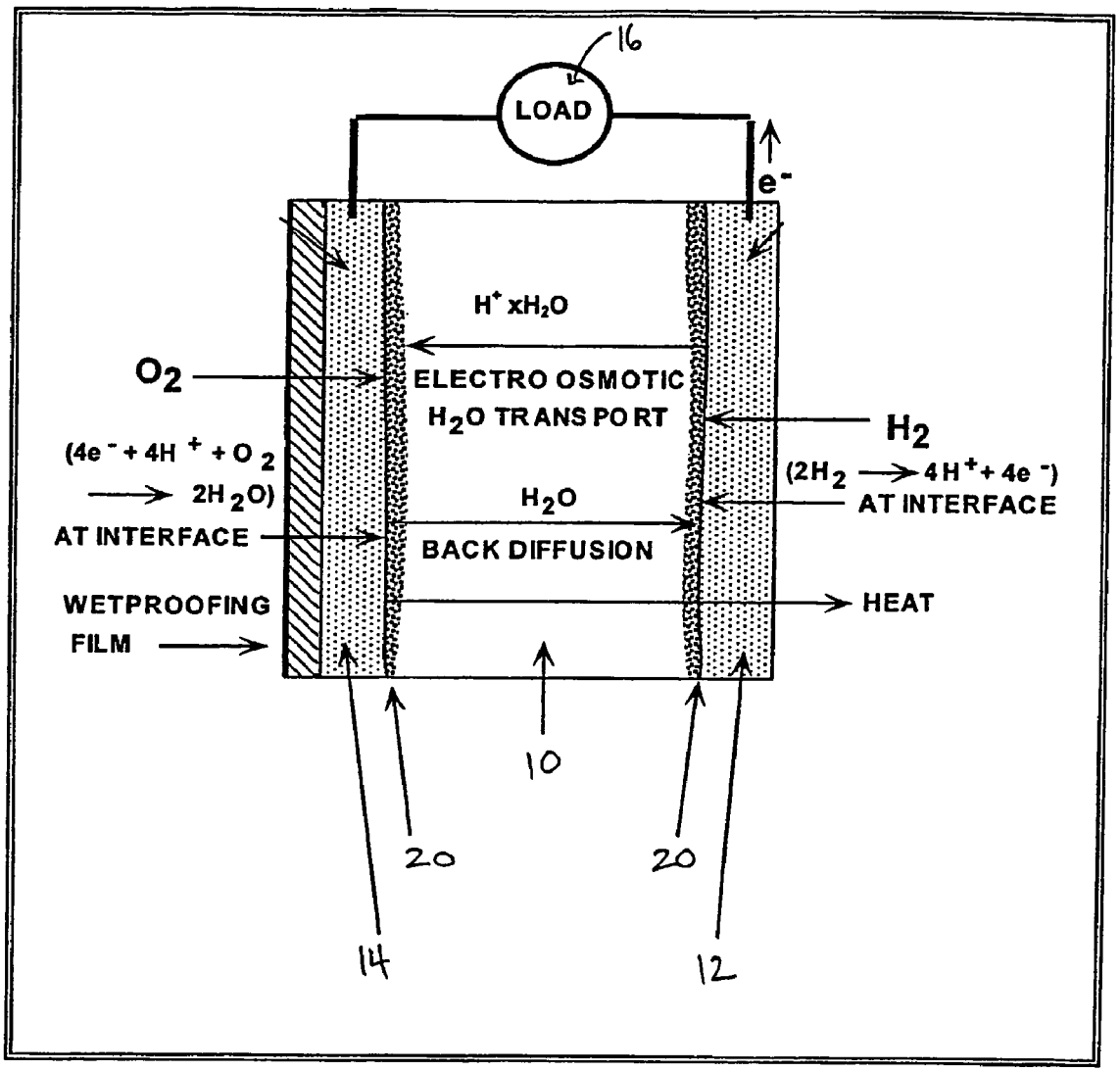
FIG. 2 is a detailed schematic diagram of a polymer electrolyte fuel cell employing $H_2/O_2$ reactions.

A more detailed representation of a $H_2/O_2$ fuel cell after H. Vkihashi; M. Yamabe; and H. Miyake Prog. Polym. Sci., 1986, Vol. 12, page 1229, is shown in FIG. 2. The $H_2$ and $O_2$ are supplied as fuel and oxidant gases for the fuel cell operations. The electrochemical reactions occurring at anode and cathode are as follows:

Cathode: $\frac{1}{2}O_2 + 2H^+ + 2e^- \rightarrow H_2O$ (1.1)

Anode: $H_2 \rightarrow 2H^+ + 2e^-$ (1.2)

Overall: $H_2 + \frac{1}{2}O_2 \rightarrow H_2O + Electricity + Heat$ (1.3)

FIG. 2 illustrates a number of key features. First, the role of the polymer electrolyte membrane (PEM) 10 is to transport protons, $H^+$, produced from hydrogen gas at the anode from the anode to the cathode. The PEM is hydrated to improve its transport properties, and these are therefore represented as $H^+ \cdot xH_2O$. Because this causes $H_2O$ transport, there needs to be a mechanism for transport of $H_2O$ back to the anode region, and this is represented in FIG. 2 as $H_2O$ Back Diffusion.

Second, for the reactions to proceed fast enough for there to be a suitable amount of energy generated per unit time, or power, the dissociation of $H_2$ and of $O_2$ needs to be catalyzed. In FIG. 2, a catalyst layer 20 for this reaction is often provided on the surface of the membrane. This near surface region, as it is often referred, is the focus of attention in this research.

The region near the membrane surface serves as a complex set of functions. That is where the reaction of hydrogen gas to protons occurs, so the catalyst must be present here. That also is where the electrons must be collected for the external circuit. In addition, that is where $H^+$ ions must be collected by the ion-transporting medium, the PEM. Further, that is where the reactants, $H_2$ and $O_2$, and products, $H_2O$, must be added and removed. Finally, that is where mechanical and thermal considerations are most critical, since the particles must be well attached to the membranes and yet have high surface areas, while dissipating heat from the reactions.

In a practical fuel cell system for transportation applications, the $H_2$ presumably would be generated by a reforming reaction sequence so that storage of $H_2$ is not required. Such reactions often have CO as a byproduct. That means that $H_2$ with some CO, perhaps 100 ppm is the typical fuel used in most PEFC fuel cells. Unfortunately, CO can poison some of the most effective $H_2$ dissociation catalysts, such as Pt. Therefore, the catalyst at the anode, where $H_2$ is oxidized to $H^+$, often is a mixture of Pt and Ru-containing species, since CO will react preferentially at Ru sites and spare the Pt catalyst.

Figure 3:
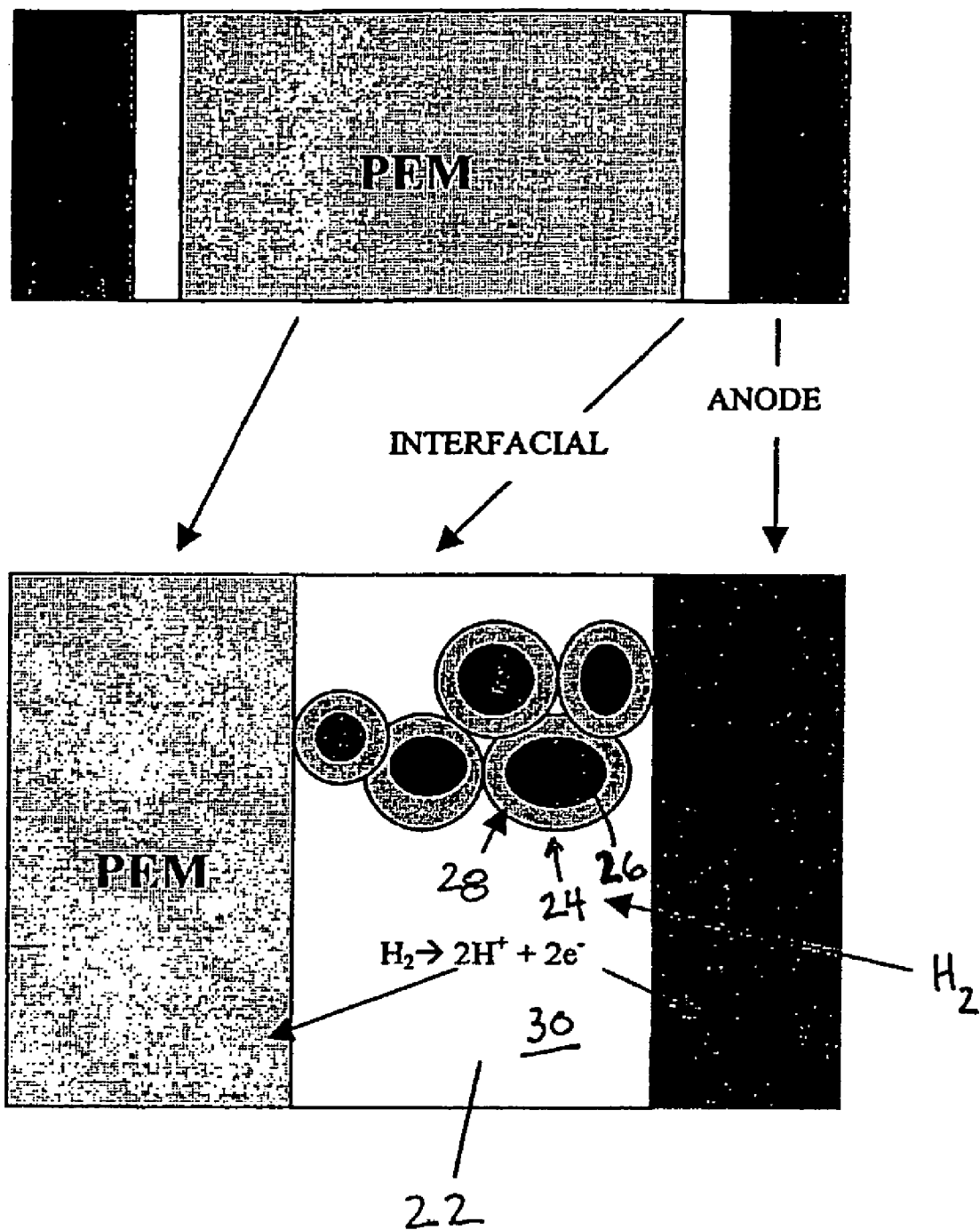
FIG. 3 is a schematic drawing of an interfacial catalyst region in a polymer electrolyte fuel cell.

From this brief review, it is clear that the near surface region is a very important but also complicated part of a fuel cell. The interfacial catalyst region between the membrane and the electrode described above can be pictured in the schematic drawing in FIG. 3. The catalyst-containing near surface region 22 participates in all of the above-described functions and often is made of a paste 30 that is applied to the membrane surface and then attached to it by heat and pressure. The paste typically includes particles 24 having a carbon (e.g. graphite) support 26 with an outer coating 28 of Pt and/or Ru. The paste vehicle is a dispersion of micelles of molecules from which the membrane is made. In the heating and pressing process, reconstruction of a membrane-like skin can occur. However, the molecular morphology is not necessarily the same as the membrane. The exact process determines the properties, and they vary with the process conditions.

It is possible to imagine that this region could be formed in a different way that is more stable physically, more efficient chemically, and easier to prepare and reproduce. An example of this is shown schematically in FIG. 4. The basic idea is to build the catalyst into the near surface region inside of the membrane itself.

One basic chemical approach for doing this was suggested by the nature of the membrane and the studies by Risen and coworkers (see, e.g., V. D. Mattera, D. M. Barnes, S. N. Chaudhuri, R. D. Gonzalez, and W. M. Risen, Jr., J. Phys. Chem., 1986, 90, 4819). They carried out ion-exchange of transition metal ions for the protons in Nafion® and other ionomers, and then they showed that these metal ions could be reduced and subsequently reacted with $H_2$, $O_2$, and CO. Nafion® is an important membrane material for PEFC systems. The properties and use of Nafion® in PEFCs will be discussed briefly, and then the ideas for modifying it chemically and physically will be discussed.

Nafion® is an ionomer, and in film form it is an ion-exchange membrane. The use of organic ion-exchange membrane polymers in fuel cells was described as early as the 1950's. The first Polymer Electrolyte Fuel Cell (PEFC) used in an operational system was the GE-1 kW cell in the Gemini space capsule power plant. Membranes made of cross-linked polystyrene sulfonic acid (PSSA) were used in that system. The Gemini cell operated at 37 $mA/cm^2$ at 0.78 V generated by the reaction of pure $H_2$ and $O_2$ at 138~207 kPa and about 35° C. The performances and lifetimes of the Gemini PEFCs were limited by the oxidative degradation of the PSSA membrane employed at the time. Chemical modification of this membrane to the analogous polytrifluorostyrene sulfonic acid membrane lead to increased lifetime in operation, which was extended by 4 to 5 times, but also to unacceptably poor mechanical properties.

The performance and lifetime of PEFCs have improved significantly since the fluorocarbon based ionomer Nafion® was introduced by Du Pont in 1968, and it subsequently has become standard in the field. It was very important for several reasons. One was that the cells improved. Another is that the operational efficiency ensured that the development of PEFC cells continued. As a fully fluorinated polymer, Nafion® exhibits high chemical and thermal stability in addition to its protonic conductivity. Nafion® membranes also are much stronger than other polymer electrolyte membranes.

Nafion® is the trademark for a class of closely related ionomers that consist of a poly(tetrafluoroethylene) backbone chain and regularly spaced short perfluorinated polyether side chains, each terminated by a strongly hydrophilic acid group. A generic structure of a membrane having a PTFE backbone and polyether side chains in shown below:

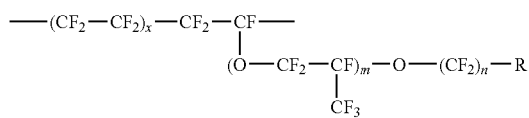

In the most widely studied cases, R is a sulfonic acid group. Chemical structures of Nafion® and some other reported perfluorinated electrolyte membranes are shown below

| | |
|---|---|
| Nafion ® 117 | m ≧ 1, n = 2, x = 5 – 13.5 |
| Flemion | m = 0, 1, n = 1 – 5 |
| Aciplex | m = 0, 3, n = 2 – 5, x = 1.5 – 14 |
| Dow | m = 0, n = 2, x = 3.6 – 10 |

Here x typically is 5 to 13. The ionomer called Nafion® 117 has y=1, equivalent weight 1100, and a dry thickness about 7 mil (175 μm). Dow has also reported an ionomer membrane that has y=0, equivalent weight 800, and a wet state thickness of 125 μm. In addition, Asahi Chemicals developed Flemion® and Aciplex® fluorocarbon-based ionomer membranes.

Nafion® and other commercial perfluorinated ionomer membranes currently are expensive for use in fuel cell systems, so there have been efforts to produce other less expensive materials for this purpose. One example is the partially fluorinated membrane materials, such as Raymion® and Permion 4010® membranes, whose structures are illustrated below, that are prepared by radiation grafting.

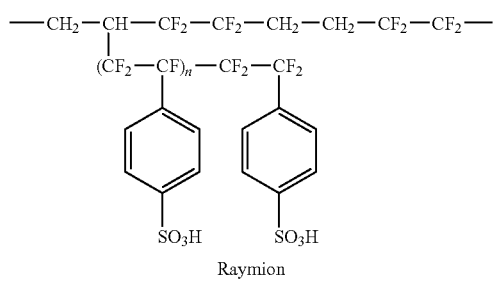
Raymion

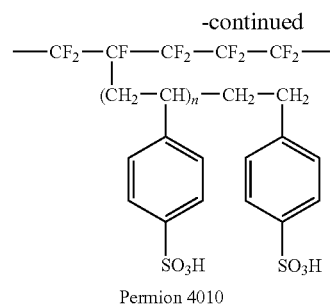
Permion 4010

In addition, a range of ionomeric membranes based on hydrocarbon polymers, instead of fluorocarbon polymer backbones, have been prepared and studied. The chemical structures of a few polymer electrolyte membranes based on hydrocarbon polymers are illustrated below.

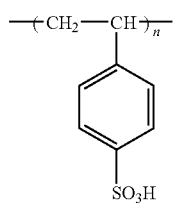
Poly(styrene sulfonic acid)

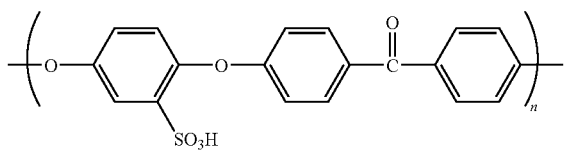
Sulfonated PEEK

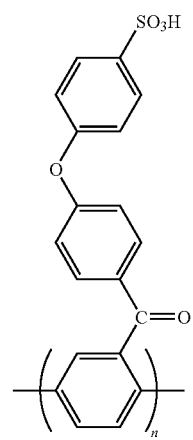
Sulfonated PPBP

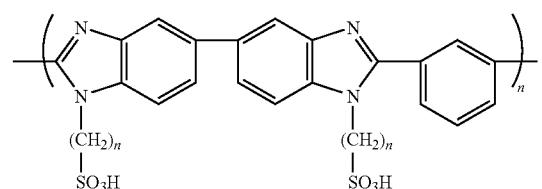
PBI-AS

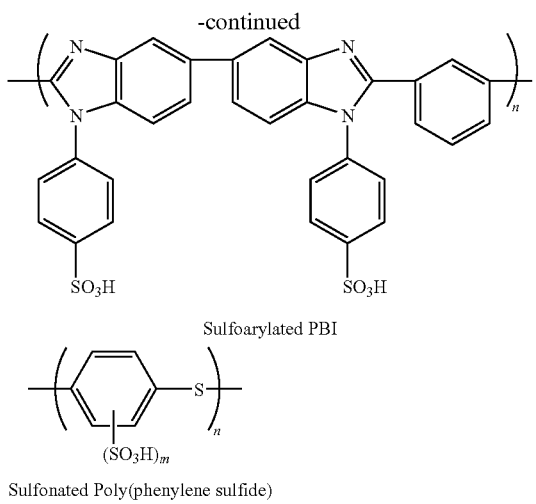

Sulfoarylated PBI

Sulfonated Poly(phenylene sulfide)

Some of these new materials (either partially fluorinated or hydrocarbon membranes) have good performance in model PEFCs, but improvement of catalyst and fuel cell assembly techniques will be required for these economical membranes to achieve valuable long-term function. Thus, perfluorinated ionomer membranes (especially, Nafion® membranes) are still the most widely used materials in PEFC development.

The physical properties of perfluorinated ionomer membranes have been studied extensively. Early stress relaxation studies and stress modulus versus temperature curves showed that the modulus in the hydrated acid form was lower than expected. This was interpreted initially as indicating the presence of voids in these materials. Dynamic mechanical studies also provided evidence for a two-phase material for both the acid (proton) and alkali ion forms of Nafion®. One of the dispersion peaks occurs at the same temperature as that of pure PTFE. The other peak depends on the exchanged cation and is affected strongly the presence of water. This phenomenon was thought to be associated with the special structure of ionic regions.

Small angle x-ray scattering (SAXS) studies have been performed in perfluorinated systems. Two small angle features have been found: one at small $s(=2(\sin\theta)/\lambda)$ comes from an interlamellar spacing, and the other at large s has been designated as the "ionic scattering" maximum and originated from the existence of ionic clusters. The size of the ionic clusters was determined to be a function of the kinds of cations and anions, the equivalent weight and the amount of water in the membrane.

A SAXS peak has also been found in water swollen Nafion® ionomers. The Bragg spacing corresponds to a real space distance of 40-50 Å. It is attributed to distances between scattering regions. It has been suggested that the variation of this clustering is dependent on equivalent weight, solvent, cation forms, and temperature.

The morphologies of perfluoronated ionomers have also been studied by NMR method. The molecular motions of fluorocarbon backbone in Nafion® membranes were studied through $^{13}F$ NMR. The $^{23}Na$ NMR were used to study cation binding in ion-exchanged Nafion®. $^{1}H$, $^{2}H$, and $^{17}O$ NMR were used to absorbed water or methanol motions in swollen Nafion® membranes. All these studies showed evidence for ionic clusters. Far infrared studies of the alkali and alkaline earth metal PFSA ionomers show the presence of ion motion due to cation site vibration indicating that the metal ions are held to the polymer by ionic force.

Extensive additional studies have been performed on the structure of ionic clusters in the perfluorinated ionomers, and many other various models were suggested. These models have been reviewed by Mauritz (see, K. A. Mauritz, G. J. Hora, and A. J. Hopfinger, in "Ions in Polymers", Adv. Chem. Series 187, ACS, Washington, D.C., 1980, Chapter 8) and are listed in Table 1

TABLE 1

Models of perfluorinated ionomers

Model

Figure 5:
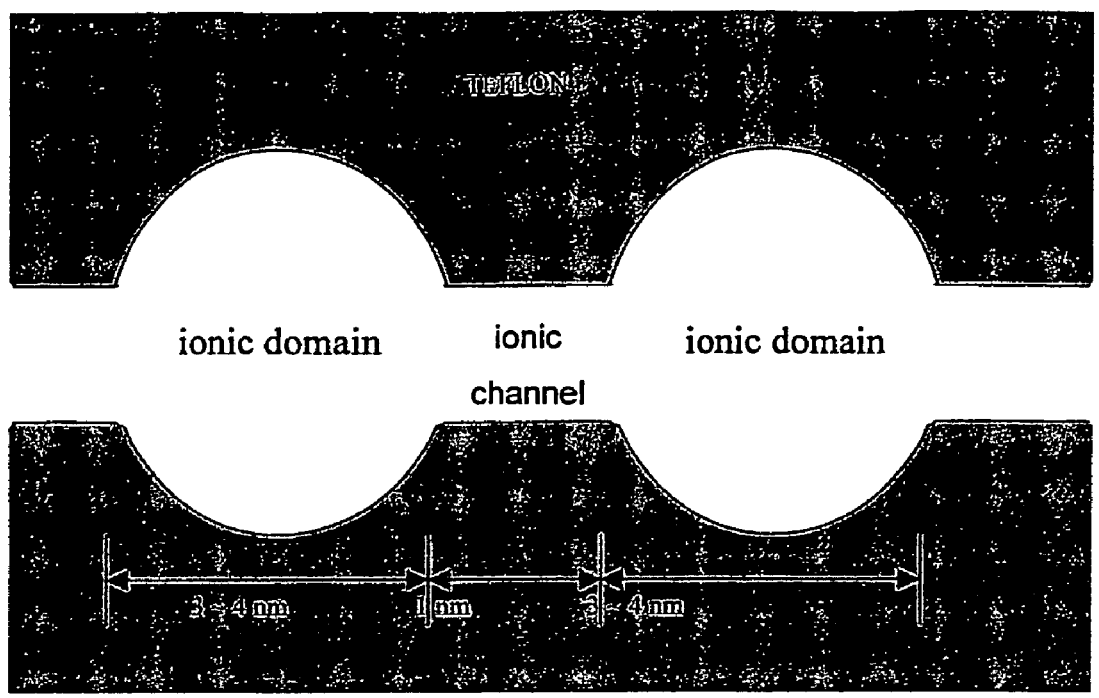
FIG. 5 is a depiction of a conceptual view of ionic domain formation in Nafion® ionomers.

Cluster-network model
Elastic theory of cluster swelling
Four-state model of hydration-mediated counterion dissociation equilibrium
Ion-dipole hydration shell cluster model
Redistribution of ion exchange sites upon hydration
Rod-like micellar structures in solutions
Spherical surface micelle geometry model
Three-phase model
Three-region structural model
Two environments of sorbed water
Water sorption isotherm model Based on all of these studies by diffraction, spectroscopic, and other techniques, there is a conceptually suggested general structure for the micro-morphology of Nafion® membrane. While it does not contain all of the known and unknown information, and there are other views, it often is expressed as the model pictured simply in FIG. 5. Here, the sulfonate groups form into ionic domains that are arrayed in a fluorocarbon matrix. The domains typically are 30-40 Å in diameter and are connected by hydrophilic short narrow channels of about 10 Å in diameter. When the membrane is hydrated, it is a protonic conductor. The well-connected, hydrophilic domains provide transport channels for the protons and water, whereas the interactions of the hydrophobic perfluorinated backbone chains provide the polymer with mechanical strength and chemical and morphological stability.

Figure 4:
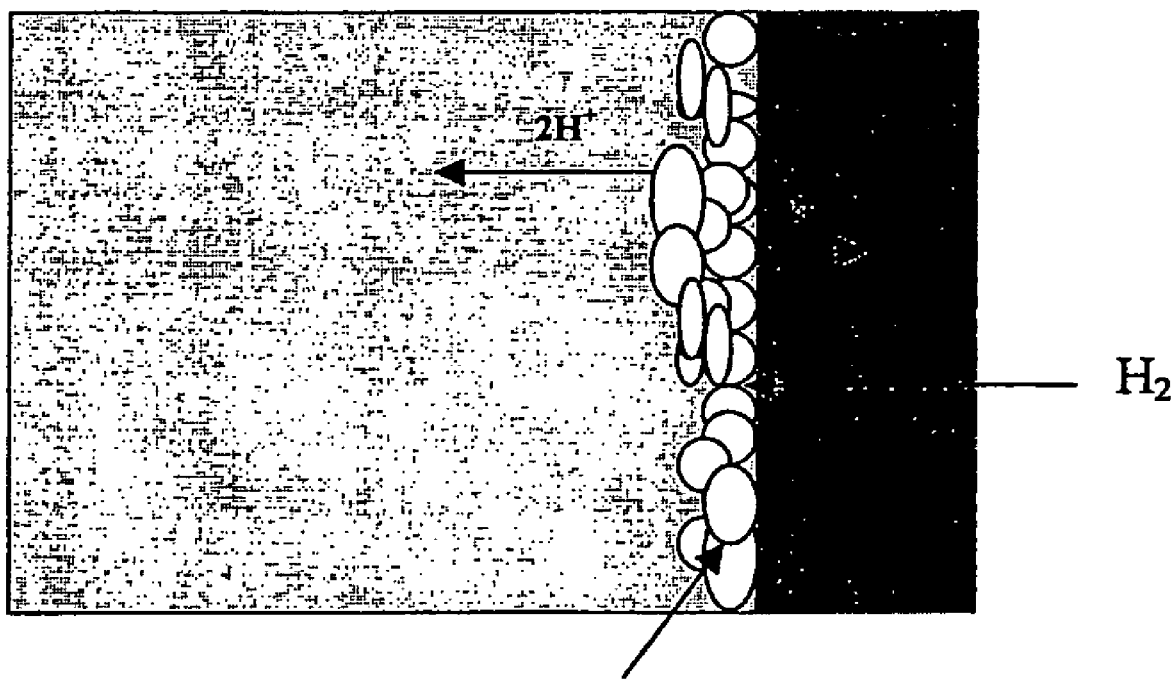
FIG. 4 is a schematic drawing of a single catalyst-built-in polymer membrane without interfacial region.

One goal of the present invention is in simplifying the interfacial structure and provide more designing flexibility by building more of the chemistry of a fuel cell into the membrane structure itself. One form of this is shown in FIG. 4, where the catalyst layer is built near the surface region of the polymer membrane. The catalyst layer and the polymer membrane are then combined together as a single material while it has the same functions as the more current one.

It is one object of the present invention to design an efficient fuel cell having a high interfacial area of the boundary between gas and electrolyte, which is one of the major challenges for fuel cell research.

The first step in achieving the more efficient fuel cell is to modify the polymer membrane surface and increase the surface area, so that the membrane will be more accessible to gas reactants. A new high voltage electrochemical method to modify the near surface morphology of perfluorinated ionomer membranes has been discovered in this work. It leads to development of significantly increased surface area.

The second goal is to build a catalyst system within the membrane and in the near surface region. In keeping with the earlier discussion, the metal particles must be able to make electrical contact to the external circuit. Moreover, the metal particles within the near surface region must be able to do the reactions, such as coordination of CO by Ru, that are important in $H_2/O_2$ fuel cell systems.

The performance of a PEFC is highly dependent on its fuel supply. Although Pt is the most effective catalyst known so far for hydrogen oxidation in a fuel cell, it requires pure hydrogen supply at the operating temperature (<100° C.). Hydrogen from methanol steam-reforming or partial oxidation usually contains up to a few percent of CO (typically, 20-100 ppm), which, as mentioned above, creates a problem for a Pt catalyst since CO absorbs on the Pt surface and blocks the active sites for hydrogen oxidation. Even CO concentrations as low as 5 ppm lead to a substantial degradation in the fuel cell performance.

Binary Pt—Ru catalysts are promising catalysts for $H_2$ dissociation with CO tolerance in PEFC as an alternative to pure Pt. The Ru/Pt alloy electrode has been widely used as the anode in direct methanol fuel cells (DMFCs). Ru/Pt catalysts also have good CO tolerance. The adsorption of oxygen-containing species onto a Ru electrode commences at potentials much more negative than on Pt. Thus ruthenium can enhance the oxidation of the adsorbed CO by bifunctional mechanism.

Therefore, a catalyst layer including Pt/Ru may be built in the near surface region of polymer membrane according to the present invention. These Pt/Ru particles function firstly as hydrogen oxidation catalyst. And more importantly, they catalyze reactions to help to control (or eliminate) catalyst poisoning by CO.

Three different types of preparation methods (i.e, chemical, electrochemical and physical) for building the catalyst layer in the near-surface region of polymer membrane will be discussed. Other applications of metal/polymer composite also will be discussed herein.

It is clear that the preparation of particles with Pt and Ru in Nafion® membranes, and their reactions with CO, $H_2$, $O_2$, and $H_2O$, at least, will be interesting to consider. The chemistry of Ru and Pt metal ions and particles, alone or in combination, has also been investigated by reactions of the metallic sites with CO, $H_2$, $O_2$ and $H_2O$ under different conditions. The variation of the reactions leads to further understanding of the material structure. Pt—Ru bimetallic catalytic structures are found to form in these materials. The mechanism of catalytic reactions is investigated by the interactions among gas-metal, metal-polymer and metal-metal.

The construction of interfacial regions of catalyst layer is very important. The catalyst typically is Pt/carbon particles, which are in contact with each other and with the electrode. These particles are surrounded by a proton conducting material in which they initially were dispersed as a paste. This region is complicated because it is necessary to deliver reactants, remove products, manage water, and accomplish a number of other engineering goals. They are often prepared by special process and are difficult to reproduce. It frequently can be unstable in operation.

In one aspect of the present invention, the near surface region of a perfluorocarbon sulfonic acid (PFSA) membrane, Nafion®, was both physically and chemically modified in an attempt to improve fuel cell design. In addition, the discoveries according to the present invention suggest additional high voltage membrane chemistries that could lead to other valuable processes.

The present research has three main aspects; the modification of the morphology of proton conducting membranes, the exploration of the chemistry required to build-in catalytic constituents in the near surface region of the membranes, and the exploration of key reactions of the metal-ion-exchanged and metallic domains of the membranes. The results of electrochemical methods for modifying these membranes will be presented first.

It would be valuable to have a membrane that has both a high surface area and the catalytic functionality required for the membrane assembly's operation. In the case of a fuel cell with hydrogen and oxygen, the hydrogen is obtained by reformation or another reaction, which leaves some CO in the gas. Thus, the catalysts must provide for the catalysis of the hydrogen and oxygen reactions, and preferably also for the catalysis of the oxidation of CO. Typically, the membrane is in a structure, sometimes called a Proton Membrane Electrode Assembly (sometimes with acronyms such as PEM, MEA, PEMA, and PMEA which, for the purposes of this application, will be used synonymously) which contains the membrane and other constituents such as catalysts for the gas reaction, catalysts for dealing with impurities or undesired side reactions, conductors, electrodes, and arrangements for delivering the reactants to the surfaces and removing the products from the surfaces. These are complicated multiphase assemblies and often are prepared by special complex, secret "recipes". They often are difficult to reproduce and can be unstable in operation. They have limited surface areas and functionality.

The experiments, set forth below were designed to determine the origin of the observed changes in surface morphology and to define more completely how such changes depend on the experimental parameters. This part of the invention leads to development of a method for increasing the surface area of a proton-conducting membrane in a controlled manner.

EXPERIMENTAL

The membranes studied in the following examples are two Nafion® films, Nafion® 117 and Nafion® 161. They both were obtained from the E. I. DuPont Co. They are PFSA ionomers, and have the chemical structure shown in structure 1 from page 13. The Nafion® 117 is about 7 mils (0.007 inches) or about 175 micrometers in thickness and has equivalent weight 1100 g/mol. The Nafion® 161 is only about 25 micrometers in thickness and it has equivalent weight 1600 g/mol. The latter is thin enough to allow a reasonable transmission of infrared light in much of the spectrum, so it was used when that was needed. The Nafion® 117 was used for most experiments, because its thickness prevented small variations in thickness for making a major difference in electrochemical cell experiments, and it is thick enough to make it possible to study the cross sections by electron microprobe. It is important to note that while concepts and ideas described herein are applicable to any ion conducting polymer membrane, Nafion® membrane is used in all experiments described for convenience and consistency. Nevertheless, one should realize that other polymer electrolyte membranes might be used.

The membranes were prepared as follows. Pieces of Nafion® 117 or 161 that were about 0.75×0.75 inch$^2$ (~3.6 cm$^2$) were purified to remove plasticisers, by-products of the synthesis, and salts by treating them with nitric acid to transform them into complete $H^+$ forms. They first were stirred for an hour in a 5M nitric acid aqueous solution and rinsed with distilled water, then stirred for an hour in DMSO (analytical grade), and rinsed thoroughly with distilled water. The films then were dried in air at room temperature prior placing them between the electrodes.

Some of the $H^+$-form PFSA membranes were ion-exchanged individually with a solution that was a source of one of Ag, Pt, Ru or another cation. The solutions used were aqueous solutions of $AgNO_3$, $RuCl_3.3H_2O$, and $Pt(NH_3)_4Cl_2$, which were obtained from Aldrich Chemical Co. and used without further purification.

Some of the membranes were coated with a metal before being used in the electrical experiments. The coatings were done by ultrahigh vacuum deposition of Pt, Au, Pd, or Ru, and resulted in coating of 0.1-0.5 micrometer thickness. Hydrogen gas was obtained from Medical Technical Gases, Inc. in high purity.

Membrane/Electrode Assemblies

Devices for the Initial Experiments

A glass device was made for the initial experiments. It is shown schematically in FIG. 6. The device includes an envelope 40 of glass, having two side tubes 42, 44 through which lead wires 46 pass and are sealed in place by epoxy cement. The top of the tube can be removed at an o-ring seal or standard taper joint 48. The top tube is attached to a stopcock 50 through which the cell can be attached to a vacuum line. One form of an electrochemical cell is also pictured in FIG. 6. The cell was constructed of PTFE (Teflon) and electrodes. The electrodes 52, 54 pass through Teflon holders 56 to a connection to a wire leading to the outside of the cell. The two halves then are clamped around a PSFA membrane sample 60 and secured by the bolts or screws 58 passing through the Teflon blocks. In another form, the electrodes 52, 54 were formed in the shape of a ring. Then, the sample was clamped between two stainless steel ring-shape electrodes using the Teflon holders which also had gas access holes (not shown).

In some experiments the electrodes 52, 54 were machined from stainless steel, and in some cases they were made from brass and then coated with gold. The gold coatings were applied by Electroplating Chemicals and Services, Inc., a Lucent Technologies company.

In some experiments, a metal-ion (such as $Ag^+$, $Pt^{2+}$, and $Ru^{3+}$) exchanged PFSA (Nafion®) membrane was placed between the electrodes. In some experiments, such membranes were also coated with a thin layer of gold or platinum deposited on both sides by vacuum evaporation. Ultimately, in the cases described next, the sample was an $H^+$-form membrane without ion-exchange or metal-containing species.

Once the cell assembly had been loaded with the membrane, it was placed in the glass cell 40. The air was pumped from the cell, a drying process was carried out, and dry hydrogen gas was added to the cell.

In the initial experiments, the membrane was placed in the assembly, the cell was evacuated at ca. $1\times10^{-3}$ torr pressure and 25° C. for 24 hours, and then $H_2(g)$ was admitted at 40 torr. Then the cell was disconnected from the vacuum line and moved to an electrically isolated space and a DC voltage was applied across the electrode-membrane-electrode assembly. The voltage was applied in the manner described below, and the appropriate data were collected. After the voltage had been applied for some time, the assembly was removed and the membrane and electrodes were investigated. These are referred to as the "initial electrical experiments".

Single-Cell Assembly Surface Modification Experiments

In one set of experiments, a Nafion® 117 or 161$H^+$-form membrane was clamped between two stainless steel ring-shape electrodes using the set up described above with gas access holes. Gold-coated brass electrodes in disc-form, rather than ring-shape, were used in some experiments. The assembly was set in a glass cell and the samples were evacuated for about 10 hours or until the apparent conductivity, measured at low voltage through the unguarded electrodes with the cell attached to the vacuum line, decreased to about $1\times10^{-9}$ $\Omega^{-1}$ $cm^{-1}$. Some of vacuum-dried samples were then exposed to water vapor for specified periods of time to allow them to absorb specified levels of water. In some cases the cells were opened and the membranes removed and weighed to determine the amount of water that had been gained. In some otherwise identical experiments, the system was evacuated for a minute to remove water vapor from the cell, and the cell was removed from the vacuum line and taken to an electrically isolated place before the high voltage treatment. Then the sample was treated electrically, removed and investigated. The experiments are referred to as the "surface modification" experiments.

Multi-Electrode Assemblies

In accordance with the present invention a device was designed and built to allow for the experiments to be conducted at various voltages on the membrane samples while keeping the level of hydration identical. The device consists of two main components. One is the sample handling and multi-electrode measurement device. It is pictured in several stages of assembly and operation in FIG. 7. The second main component is a large brass vacuum chamber in which this multi-electrode assembly is loaded for experiments. The multi-electrode device is designed so that seven independent electrodes can come in contact with the surface of a membrane whose opposite side is mounted on a larger planar electrode. The device has the multi-electrode assembly mounted on a linear translator-motor, accurate to 1 micron, that can move the electrodes into place at the membrane surface after the membrane has been dried and exposed to water vapor. Thus, the membrane can be dried by evacuation, taken to a given hydration level, and then be treated electrically in a number of independent electrical experiments. The electrodes include a single cathode (diameter ½") and seven flat-ended anode rods (diameter 3/32"). The electrodes are all made of brass with a thick, hard gold coating.

Figure 7:
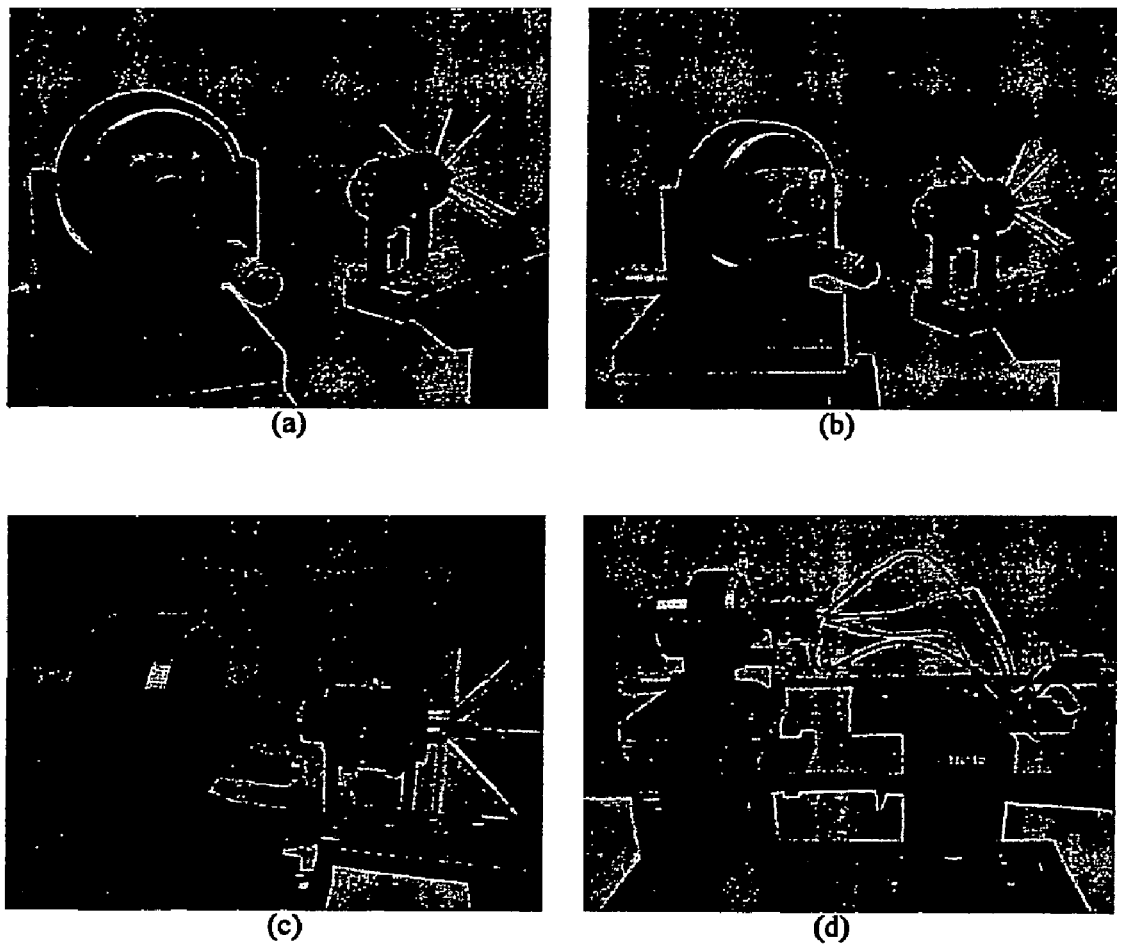
FIG. 7 is a depiction of the multi-electrode assembly used to gather data in the present invention.

Referring to FIG. 7, a cathode was mounted in a Teflon block and this block set in an aluminum cylinder, into which heating elements, a thermal sensor and a thermocouple were inserted. The position of the whole cathode set can be adjusted in any direction (x, y, z, δ, θ, φ). Seven anode rods were mounted in a linen/epoxy insulated block, which was set on a micro-mate translator (FIG. 7a), so that it could be controlled to move forward and backward by an external controller.

A Nafion® membrane was clamped onto the cathode by a hollow Teflon piece, which allows the anode rods pass through (FIG. 7b). The cathode and anode blocks were then adjusted to the same position, but initially did not touch the sample (FIG. 7c).

The whole assembly then was put into a large brass vacuum chamber. This chamber had two vacuum valves, two observation ports, and three multi-pinned vacuum pass-through connectors. The whole system can be evacuated, and then water vapor can be admitted using the vacuum valves. The wires attached to the inside assemblies were connected to outside devices, including a power supply, humidity detector-monitor, micro-mate translator controller, thermocouple monitor, and heater power supply, through the vacuum pass-through connectors.

In a typical experiment, a controlled hydration level of a sample is achieved by exposing it to water vapor. The humidity in the chamber can be measured with a solid-state humidity sensor (IH-3605A, HYAL Sensing Products) and a circuit. Then the anode rods are moved forward and brought into contact with the membrane. Thus, the sample also was held tightly to cathode (FIG. 7d). Each anode rod can form a circuit with the membrane and cathode. A specific treatment can be applied to the membrane through one of the seven anode rods and the cathode. Thus seven different treatments can be applied to the same sample. After that, seven spots on the membrane having individual surface features are achieved. These spots can be observed separately with SEM. These are referred to as the "quantitative surface modification" experiments.

The actual process of exposure of the membranes to water vapor was as follows. The brass chamber has a volume of about 40 L, and it was pumped to vacuum (ca. $1 \times 10^{-3}$ torr) by connecting it to a glass preparative vacuum line (manifold) through a stainless steel needle valve and a rubber hose. The evacuation process took about 4 minutes. Then, the pump was sealed from the manifold and the stopcock connecting the manifold to a tube of degassed water was opened. This allowed water vapor to leak into the large chamber and to build up the water vapor in the chamber slowly. There was enough water in the system to always have liquid water, so the system approached its equilibrium vapor pressure of water, which is about 20 torr. The vapor pressure of water in the chamber was measured by the humidity sensor. The humidity sensor was calibrated by measuring the water vapor in equilibrium with known humidity, standards, which are water itself, and saturated solutions of KBr and $CaCl_2$. As the system approached its equilibrium very slowly, over a period of about 2 hours, the membranes were exposed to increasing water vapor over extended periods of time. Therefore, the procedure was adopted that for each experiment (set of electrical treatments) the chamber was isolated from the water vapor source after some period of time by closing the needle valve. At that point the water vapor had reached a particular value, recorded as its relative humidity, and the membrane was allowed to be exposed to that pressure thereafter as the multi-electrode assembly was moved into place by remote control of the Micro-Mate positioning device. Then, the chamber was evacuated for about 2-4 minutes to reduce the water vapor pressure to less than 0.01 torr, and the electrical experiment was carried out.

The experiments were done with relative humidity values of 22.4, 28.5, 34.2 and 63.5%, respectively and with the voltages and times indicated in the Results section, below. Since it was shown in other experiments, described below, that vacuum dried Nafion® 117 films take up water quickly relative to this experiment, it is assumed that the membranes were effectively equilibrated with the water at these vapor pressures.

Water Sorption and Measurement

For the single-cell surface modification experiments, the vacuum dried Nafion® membranes were exposed to water vapor in the vacuum cell at P-20 mmHg at room temperature for 0, 10, 20, 30, 40, 50, 60 and 90 minutes. The 0 minute samples correspond to the vacuum level of hydration under these standard conditions, which are known to correspond to approximately 2% by weight of water in the membranes. The water sorption in Nafion® membrane was determined by measuring the weight gain of the membrane, and the value was added to 2% for the dried material.

For multi-electrode assembly experiments, the membranes were exposed to water vapor at room temperature in the chamber for more than one hour. The humidity in the system was measured by humidity sensor directly. The humidity sensor was calibrated using the following solutions of known partial pressure of water: $H_2O$, RH=100%, $P_{H2O}$=17.5 torr at 20° C., $CaCl_2$, RH=32.3%, $P_{CaCl2}$=5.65 torr at 20° C., and KBr, RH=84%, $P_{H2O}$=14.7 torr at 20° C.

High Voltage Treatment and Current Measurement

The electric field was applied across the membrane in each of the experimental setups described above. In each case, the voltage and the current were measured. The apparent resistance of the membrane in each condition also was determined under these conditions simply by assuming the whole circuit element, including the membrane, the membrane-electrode interfaces, and the wiring, acts as a resistor. This does not distinguish between electrode bulk resistance and other factors. Constant voltage was supplied in the 0-400V range by a Heath Model PS-4, Heath Co., Benton Harbor, Mich., and in the 400-800V range by an AIC Model 316, Atomic Instrument Co., Boston, Mass.

The 50-800 V potential was applied to a sample in the closed glass cell or in the brass chamber through extended wires at room temperature. The current through the membrane was measured at different times during the electrical treatment.

SEM, Electron Microprobe and Spectral Analysis

The surfaces were examined by scanning electron microscopy (SEM). The SEM analysis was performed on a Hitachi S-2700 SEM. Some of the quantitative surface modification experiments were analyzed with the use of the SEM at Arkwright, Inc. of Fiskeville, R.I.

The SEM images were analyzed in a semi-quantitative manner initially. The result is, qualitatively, a set of indentations and protrusions that constitute surface features. It is evident that the various regions, whether a valley or a peak, has a size that can be estimated. In order to place the results on a more quantitative basis, the SEM images were magnified and the sizes of many identified surface features in a given image were measured by hand. Then, an arithmetic average of the sizes was calculated and used in graphs as the parameter "feature size".

The Electron Microprobe experiments were carried out using a Cameca Electron Microprobe. The elemental identifications were done by energy selective scanning and identification of the x-rays emitted.

Figure 6:
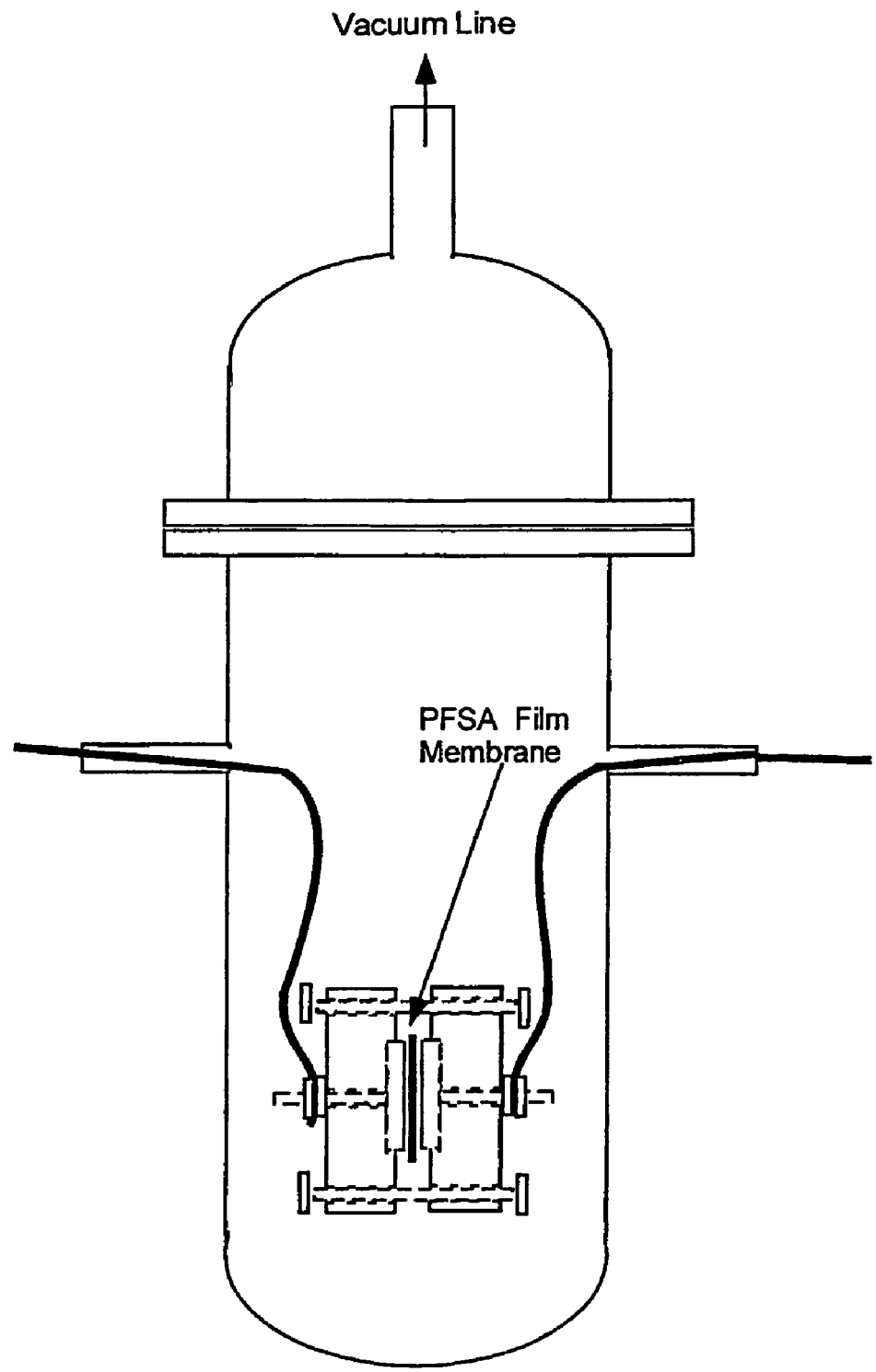
FIG. 6 is a schematic drawing of a typical electrochemical cell used in the experiments.

The infrared spectra of a Nafion® 161 film before and after application of an electric field of 40 V ($1.6 \times 10^6$ V/m) in the glass cell shown in FIG. 6, when the film contained 5% $H_2O$ initially, were measured on a Bruker Fourier Transform Infrared Spectrometer (FTS 113v) at 2 $cm^{-1}$ resolution. In addition, they were measured on a Nafion® 161 membrane as a function of water content in a metal reaction cell, which allowed the spectra to be measured as the water content increased.

Results and Discussion

Initial Electrical Experiments

In accordance with the present invention a Ag, Pt, or Ru metal ion-containing membrane was coated with vacuum-deposited Au (or Pt) and it was dehydrated significantly. Then it was placed in a glass cell through which wires were run to connect to the electrodes. Then the air was pumped from the cell and hydrogen gas was added. A DC voltage was placed across the electrode-membrane-electrode assembly in order to reduce the metal ions inside the membrane. Experiments were carried out with voltages of 50 to 800 V. Since the membranes were about 175 microns thick, this meant that electric fields of $2.86 \times 10^5$ V/m to $4.57 \times 10^6$ V/m, were applied. These are in the range of just below and, in the case of some materials, just above dielectric breakdown fields.

After the voltage was applied for some time, the assembly was removed and investigated. This was repeated at various voltages and at time ranging from 2 to 60 minutes. At high voltages and relatively long times, the membrane came to be distorted significantly. The main distortion observed was delaminating and 'rumpling' of the metal coating electrode on one side of the membrane. Any alterations to the surface of the membrane were not obvious in the presence of this large effect. It is further discovered that a similar result could be obtained without the metal ion in the membrane, without the Au (or Pt) coating layer, without the hydrogen gas, and with only a partially dehydrated PFSA itself between two metal electrodes simply put in contact with the membrane.

Surface Modification Experiments

Figure 8:
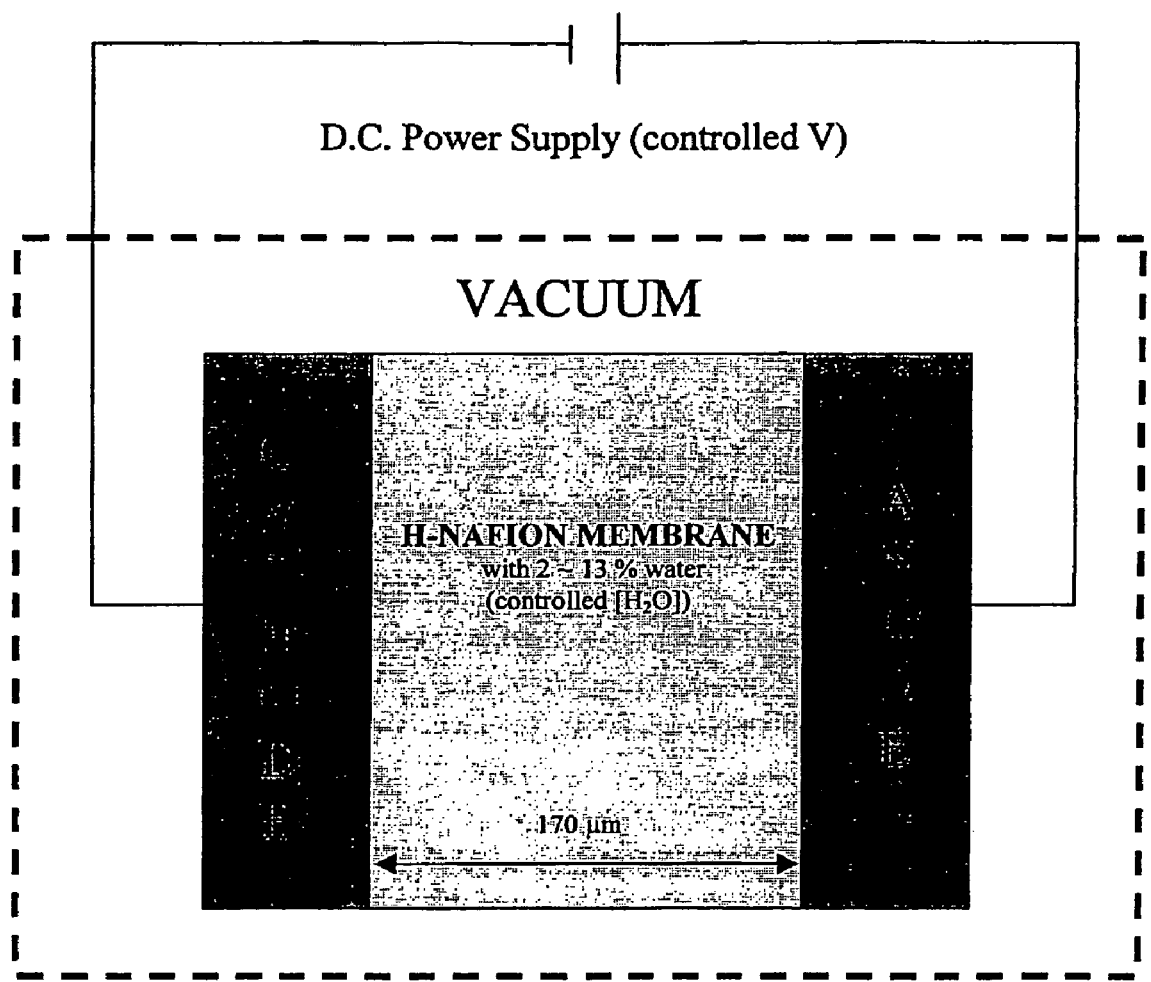
FIG. 8 is a schematic of a device used in the invention for electrical surface modification of Nafion® membranes.

Once it was determined that the de-lamination and other phenomena were associated with a reaction at the surface and that the surface was being modified to some extent, as shown by SEM observations of the samples used in the initial experiments, a study was undertaken to determine what were the key variables and what were the main consequences of changing them. The schematic diagram in FIG. 8 shows what the simpler experiment for surface modification studies became after the initial exploration was complete. The membrane is held between two electrodes, and the system is defined by the thickness and water content of the membrane, the atmosphere in the cell, the voltage applied, and the character of the electrodes. The electrodes are made of stainless steel or brass with gold coating, and the membrane is a piece of partially dehydrated PFSA in the form of Nafion® 117.

Experiments were carried out over a range of variables with controlled amounts of water and with the application of voltages from 50 to 800V. In all cases, the result was qualitatively the same. The SEM images of the surfaces, taken after the application of the field for a given period show that the surface next to the cathode remains essentially unchanged during the treatment while the surface next to the anode is modified significantly.

Figure 9:
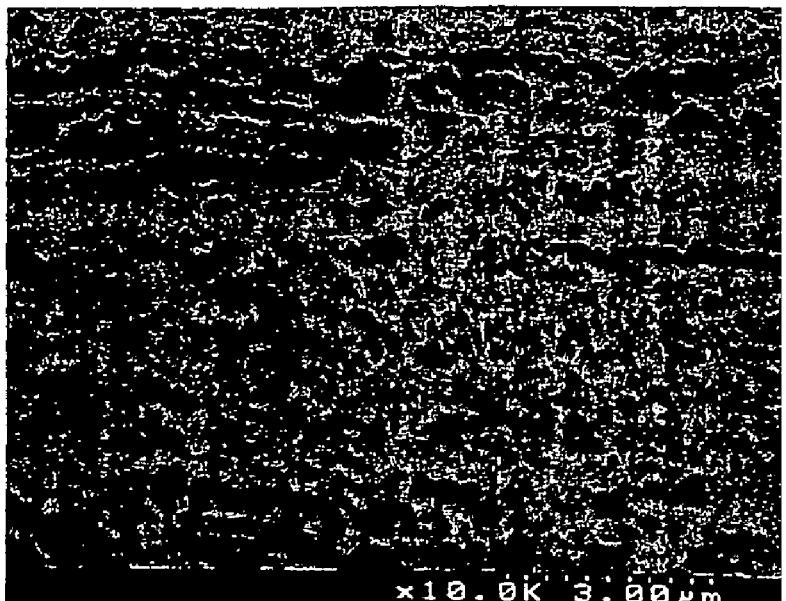
FIG. 9 is a SEM image of Nafion® membrane surfaces after 800 V applied to vacuum-dried membrane for 60 min showing the (a) anode side surface and (b) cathode side surface.
Figure 9:
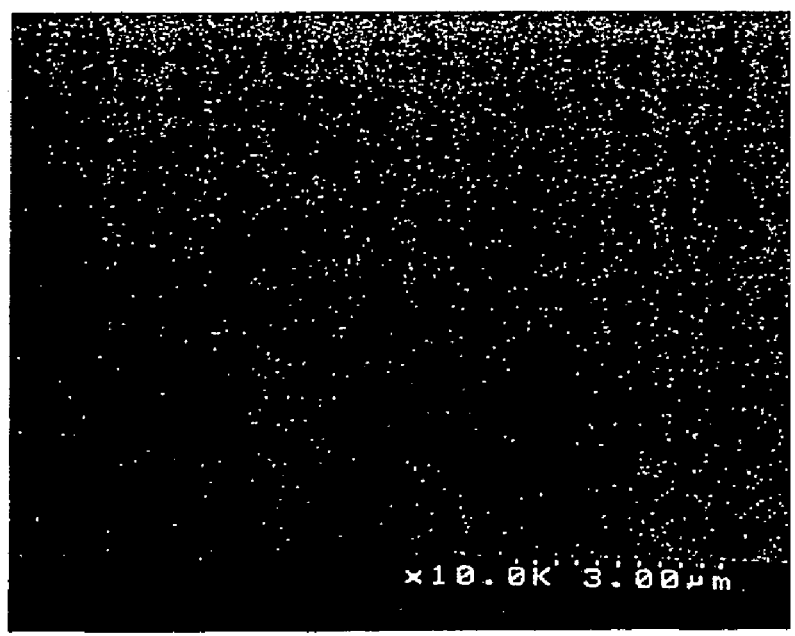

A typical result is shown in the SEM images of FIG. 9. In that case, a vacuum-dried membrane (ca. 2% water by mass percent) was treated with 800 V for 60 minutes. The SEM images in FIG. 9a show that the surface features or distortions on the anode side of the membrane are on the scale of about 0.1 to 0.8 micrometers in height and breadth. FIG. 9b shows that cathode side is essentially unchanged. As will be shown below, the surface distortions tend to increase in size as the water content increases, and to become more numerous as the applied voltage is increased for the same water content. Different levels of surface treatment were achieved by varying the voltage from 50 to 800 V, the times from periods of a few minutes to several hours, levels of water contents ranging from slightly more than 1.5 to about 7 $H_2O$ molecules per proton in the membrane.

Membranes that were subjected to the most severe modification processes (highest voltage, greatest amounts of water and longest time) did develop a small amount of a deposit on the surface next to the anode. The deposit was yellow, and in small amounts of microscopic particles it was not clear whether that color was more like the color of sulfur from decomposition of sulfonates or iron oxide from oxidative decomposition of part of the stainless steel electrode. Since it was on the anode side of the membrane, it did not seem likely that it was a reduced form of sulfur, of course. Nevertheless, the experiments had to be repeated with gold electrodes. In that case the deposits were red.

Nafion® 117 membranes containing 10% $H_2O$ that had been electrically treated at 200 V for 10 minutes with either gold or stainless steel electrodes were examined by electron microprobe analysis. This method is valuable for analysis of most elements, but analyses of elements with low atomic mass, especially oxygen, carbon and hydrogen are problematic. On the other hand, analyses for S, Fe, Au, Cr, and Ni, and perhaps F are quite good. The yellow deposit on the membrane that had been electrolytically treated with a stainless steel electrode turned out to contain Fe, Cr and Ni. In all cases the $K_\alpha$ and $K_\beta$ lines were observed. There was a small signal for Si and for S. The S signal was consistent with the detection of a small amount from the underlying ionomer membrane measured in another region of the sample. The ratios of the signal strengths were qualitatively consistent with the contents of these elements in stainless steel 303 from which the electrodes were machined. There is about 1-3% Si in stainless steel. There also is a very small amount of Mn, perhaps as high as 2%, but it was not detected in the microprobe scan on these microscopic particles on the membrane surface. The red deposit turned out to be gold. There was no evidence for any other element, except for a possible small S interference from the underlying ionomer. It is reasonable to say that these deposits are oxides. In fact, gold(III) oxide, $Au_2O_3$, is red, and iron oxides are yellow. Accordingly, this appears to be a way to prepare these compounds and other oxides of metals that do not react under mild conditions. Such deposits signal a new way to produce species at the near surface region, by adding various alcohols to the surface of the membrane and then reducing them to form various compounds such as methane, ethane, ethylene, etc.

Another question that can be addressed experimentally is whether varying the water content of a PFSA membrane modifies its structure. This is a question that has many dimensions, but for the current purpose, the test was whether the infrared spectrum changed when the water content was changed in the range of the experiments reported here. Water molecules in Nafion® membrane have strong absorption in infrared region and can be investigated by using infrared spectroscopy. Thus, Nafion® 117 membranes have been investigated using the attenuated total reflection (ATR) technique, and thin Nafion® films (<20 μm) cast from Nafion® solution has been reported using transmission FTIR recently.

To study the interaction between water and polymer matrix, Nafion® 161 membranes with a thickness of ~25 μm were studied. The thickness is appropriate for a transmission FTIR study in most regions of the IR. Although it is not exactly the same as Nafion® 117, and must be considered a model study, it is similar to that material as used in the majority of electrical experiments conducted herein.

After treating a membrane in the above-described manner, it was loaded in a sample holder inside a closed glass cell. The glass cell had two potassium bromide windows sealed to it to allow IR observation of the sample in the sealed cell. The sample was aligned in the path of the infrared light. Infrared spectra in the region of 4000-400 $cm^{-1}$ were recorded at 20° C.

Figure 10:
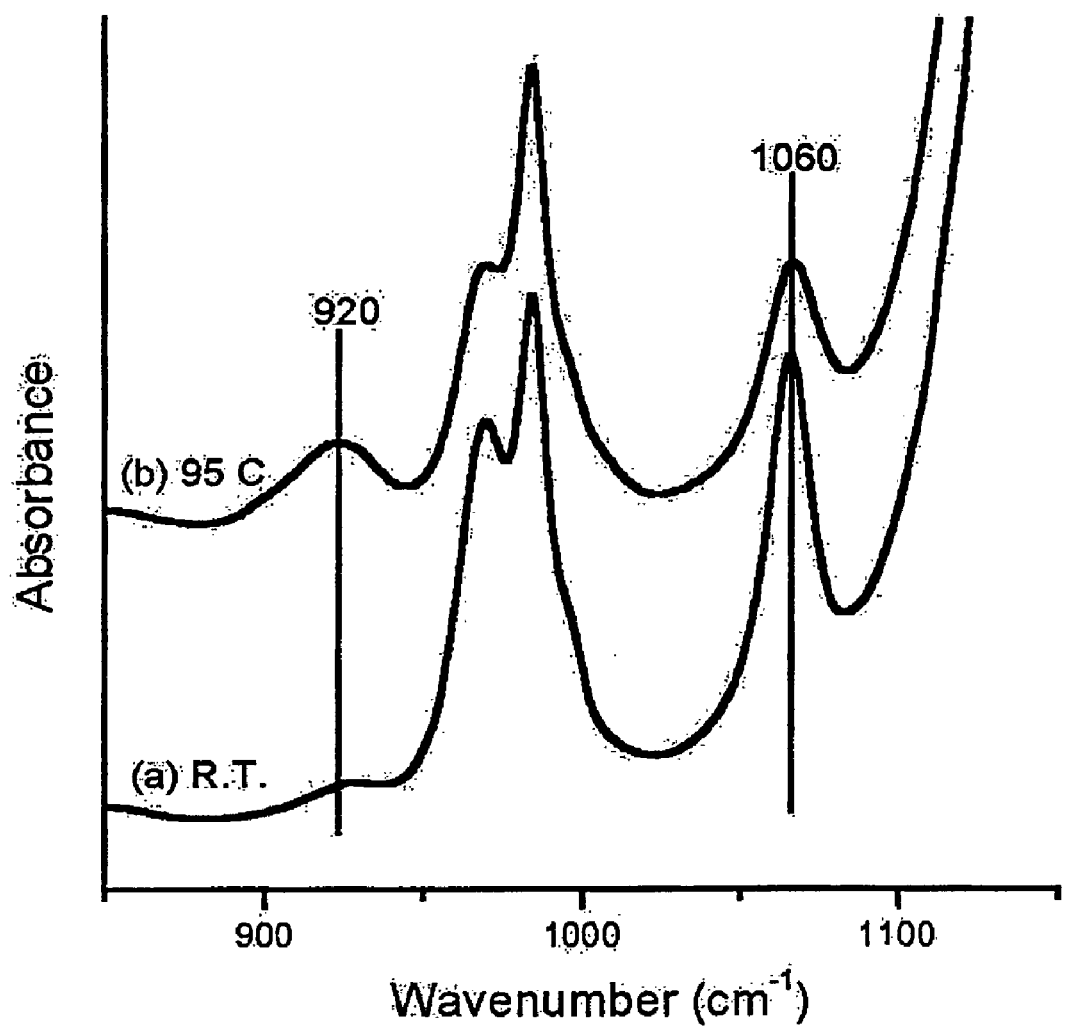
FIG. 10 is a FTIR spectra of Nafion® 161 membranes (a) Evacuated in $1 \times 10^{-2}$ torr for 20 hours at (a) room temperature and (b) at 95° C.
Figure 11:
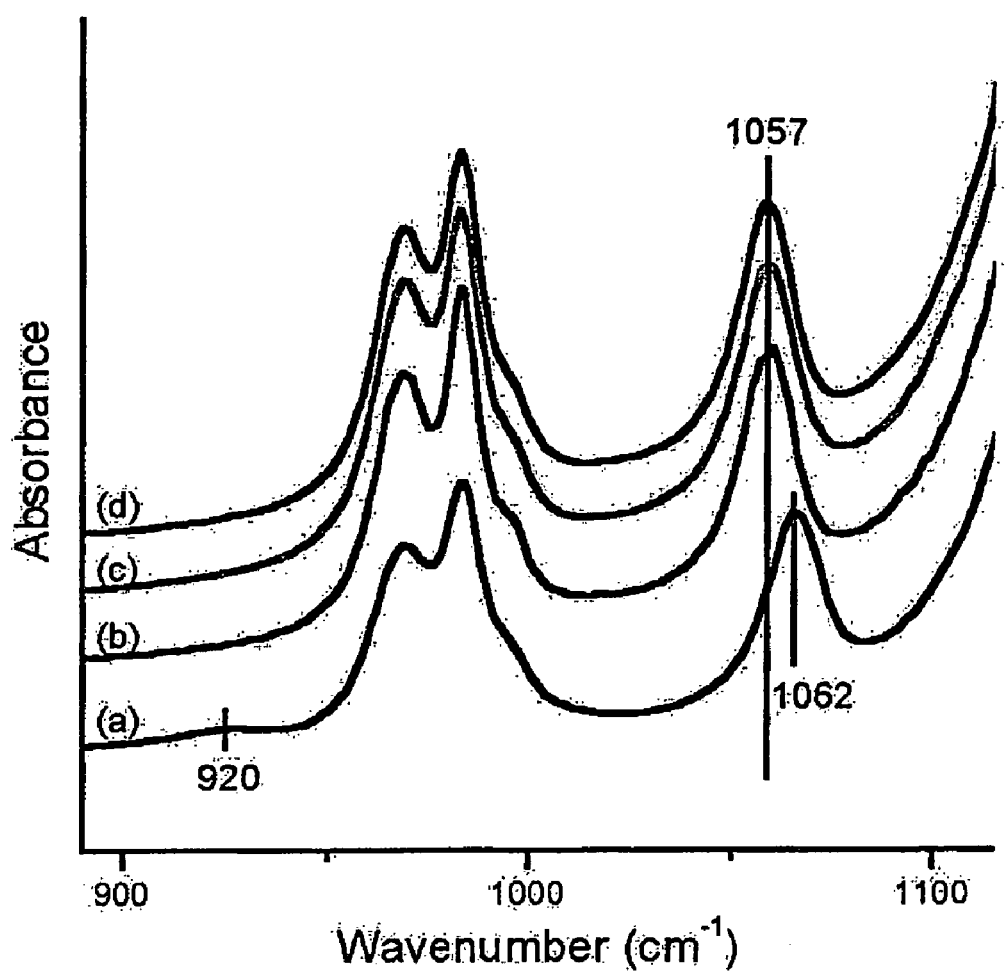
FIG. 11 is a FTIR spectra of Nafion® 161 membranes (a) Evacuated in $1 \times 10^{-2}$ torr for 20 hours at room temperature (a) and then exposed to 20 torr water vapor for 10, 35, and 65 minutes, respectively (b), (c), and (d).

The infrared spectra of the membrane that had been vacuum dried at room temperature and at 95° C. are shown in FIG. 10 as (a) and (b), respectively. The IR spectrum of the membrane dried at room temperature shows a small peak at 920 $cm^{-1}$, which is assigned to the single-bond S—OH vibration of —$SO_3H$ group and very strong band around 1060 $cm^{-1}$, which is due to the symmetric dissociated —$SO_3^-$ stretching band. The evacuation at room temperature cannot remove all the water from the membrane. The remaining water around sulfonate group will cause the dissociation of —$SO_3H$. However, the evacuation at high temperature removes almost all the water out of the membrane, so that most of —SO$_3$H groups stay in the associated form. Its IR spectrum shows a strong adsorption at 920 cm$^{-1}$ and weak adsorption at 1060 cm$^{-1}$. The dry membranes (evacuated in 1×10$^{-3}$ torr at room temperature for 20 hours) then were exposed to about 20 torr water vapor for different periods. So, through a series of samples the water content in the membrane increased systematically. FIG. 11 shows the IR spectra of these membranes, labeled (a)-(d), wherein (a) was evacuated in 1×10$^{-2}$ torr for 20 hours at room temperature; (b), (c), and (d) then exposed to 20 torr water vapor for 10, 35, and 65 minutes, respectively.

The peak at 920 cm$^{-1}$ is absent in all the cases, which means that there is no associated SO$_3$H group in these membranes. The intensity increase of the 1060 cm$^{-1}$ band means more of the acid groups dissociated due to the interaction of the absorbed water molecules with —SO$_3$H group.

A careful examination of this region shows a position shift around 1060 cm$^{-1}$. The band at 1062 cm$^{-1}$ for the vacuum dried membrane is shifted to 1057 cm$^{-1}$ when more water absorbed. The band at 1062 cm$^{-1}$ is assigned to —SO$_3^-$ groups coordinated to hydronium ions (H$_3$O$^+$) and 1057 cm$^{-1}$ to —SO$_3^-$ groups coordinated to water molecules. The partially dry membrane, evacuated at room temperature, contains ~1.5H$_2$O/H$^{+1}$ in the form of H$_3$O$^+$, and therefore most of —SO$_3^-$ groups coordinated to hydronium ions (H$_3$O$^+$). When more and more water molecules are absorbed in the ionic domains of the membrane, more and more —SO$_3^-$ groups are coordinated to water directly. The shift from 1062 cm$^{-1}$ to 1057 cm$^{-1}$ is evidence of the change of the coordination environment around sufonate group.

Overall, these data show that the modifications caused by the hydration and dehydration processes are, as expected, the hydration and dehydration of the acid groups. There is no spectral evidence for other changes of the sort that might be equivalent to formation of acid anhydrides, for example.

Figure 12:
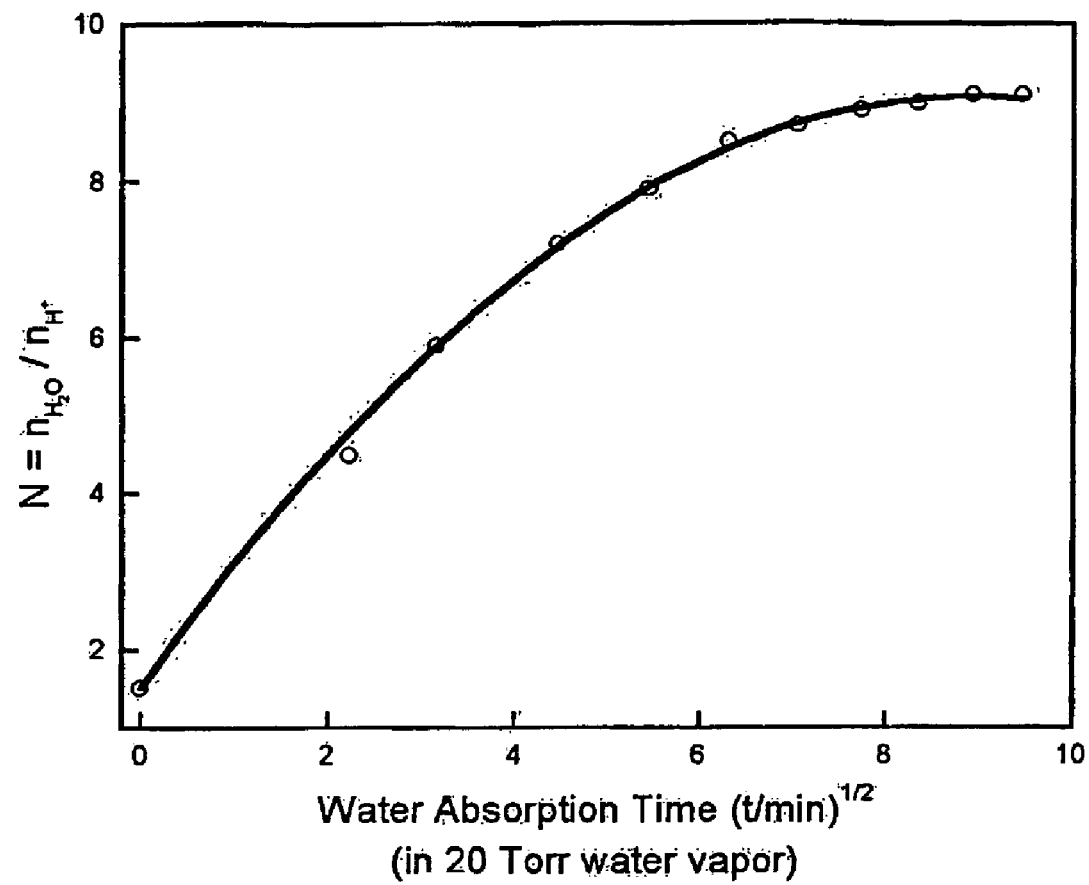
FIG. 12 is a graph of water sorption in Nafion® 117 membrane under 20 torr water vapor at 25° C.

The next information that is needed for the interpretation of these data is the water content of each membrane that is electrolytically treated. This was done in a number of ways. One involved exposing dried Nafion® 117 membrane samples to water vapor at 25° C. for various periods of time and weighing them before and after this exposure to determine how much water is gained and how fast it is gained. These data are presented in Table 2 and FIG. 12. The experimentally accessible range, using this drying and re-hydration procedure is about 1.5 to 9H$_2$O molecules per proton or, in the case of Nafion® and other sulfonic acid containing membranes, sulfonic acid site in the membrane.

Figure 13:
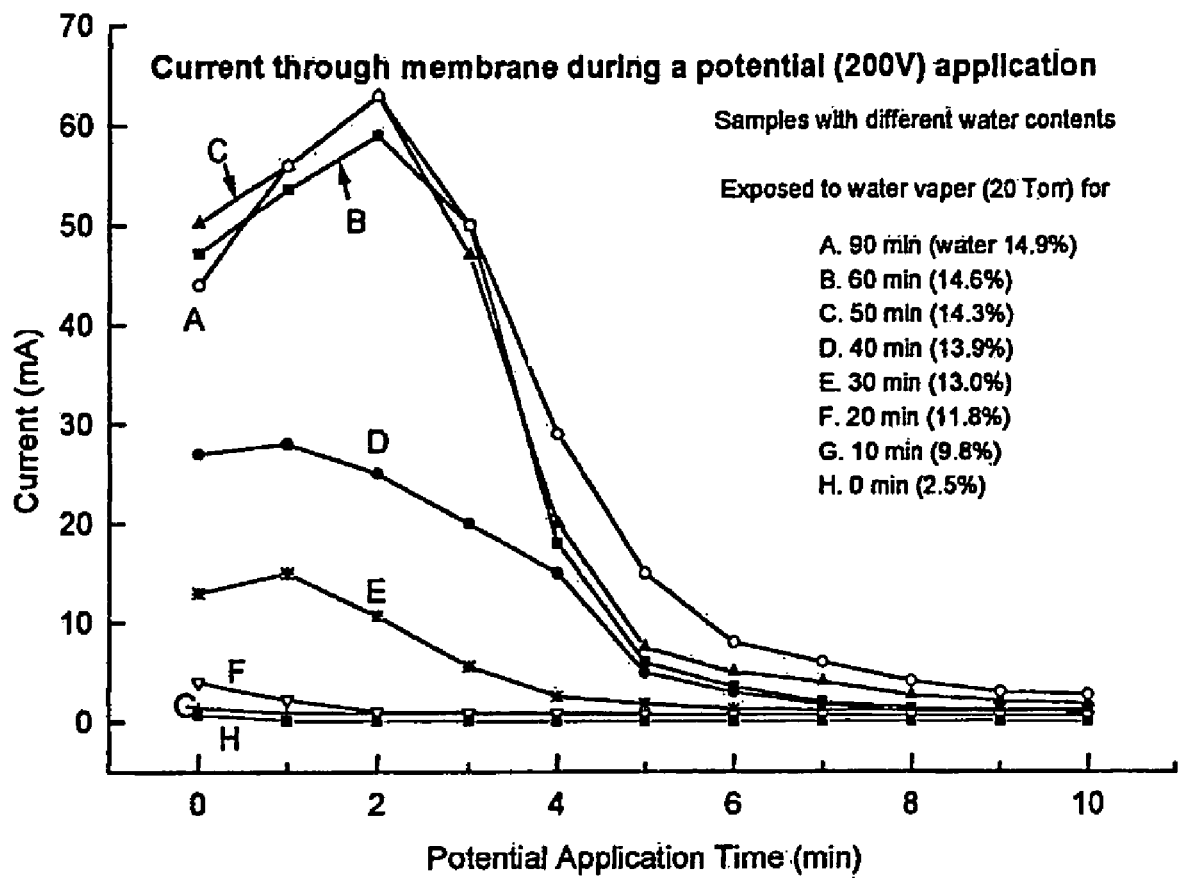
FIG. 13 is a graph showing current through membranes with different water contents during the high voltage treatment.

Finally, in this section about the surface modification experiments, it is the set of experiments in which the treatment of the membranes with an electric field was carried out. The results are shown in Table 3 and FIG. 13. In the figure are plotted the values of the current through the circuit when 200V dc is applied across a number of Nafion® 117 membranes with different water contents as a function of time.

It is clear that the current is highest during the first several minutes of high voltage treatment and decreases fast thereafter. After 5 minutes, the current drops to a very low value. It means that the effect of this treatment, which will be discussed below in terms of water electrolysis, happens mostly during the first 5 minutes. After that, very few water molecules are left inside the membrane and the current thus decreases to a low value and changes a little.

The initial current (at the beginning of electric field application) is an important parameter because it depends largely on the electrical conductivity of the membrane. They are not measures of ac conductivity, of course, and they are not static dc values, since electrolysis is proceeding, but they are related to the conductance of the overall circuit. The conductivity (a) can be calculated from the values of voltage, initial current and membrane dimensions with the equation:

$$\sigma = (I*L)/(U*A) \quad (2.1)$$

where, I is initial current, L is length of the membrane (0.0175 cm for Nafion® 117), U is applied voltage, and A is the electrode area. The results from the present experiments give values for apparent conductivity that are about two orders of magnitude lower than those in the prior references, which report conductance measured with Wheatstone conductance bridges in the region 50 to 1000 Hz and operating voltage lower than 2 V.

Figure 14:
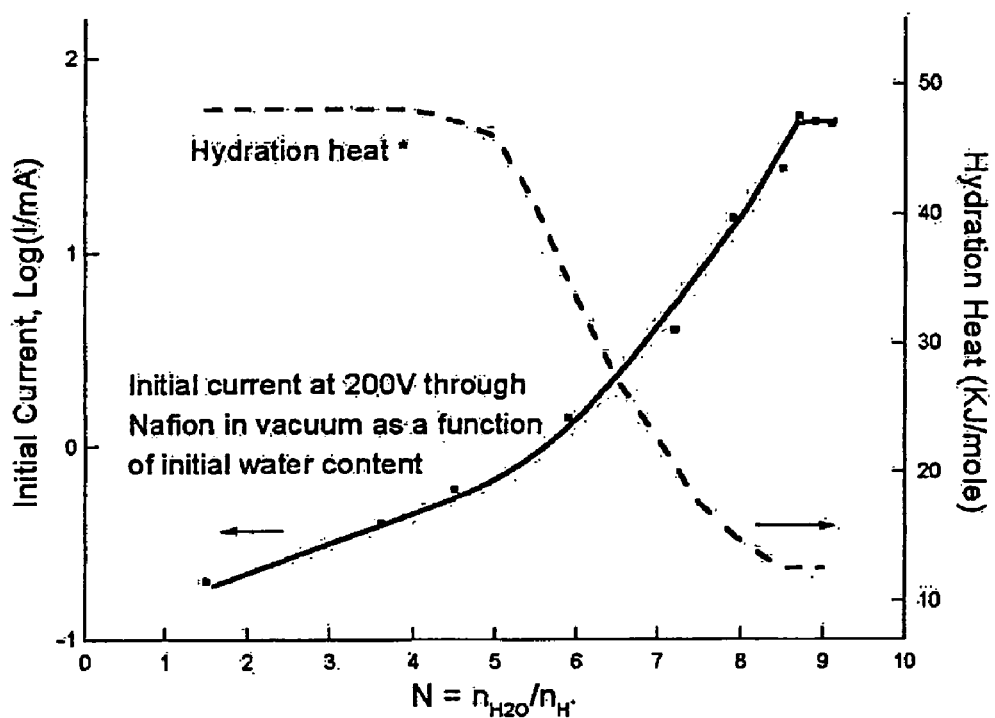
FIG. 14 is a graph showing initial current through Nafion® membrane as a function of initial water content compared to the hydration heat data.

The results of initial current measurements with Nafion® 117 as a function of the water content are presented in FIG. 14. Three regions are observed in this plot: water content of 1-5H$_2$O molecules per SO$_3$H, 5-9 H$_2$O per SO$_3$H, and higher than 9 H$_2$O per SO$_3$H. This plot trend has a good agreement to the average hydration energy in Nafion® 117 in the region of similar water contents, also shown in FIG. 14.

When the water ratio, $N = n_{H2O}/n_H^+$, is from 1.5 to about 5.0, the initial current increases slowly. The average hydration energy for 1-5 waters is about 50 kJ/mole. These waters are hard to remove. For a higher amount of water inside the membranes (from 5 up to 9 water molecules per SO$_3$H), there is a fast increase of initial current value. The hydration energy in this region drops from 50 to 10 kJ. When the water level is larger than 9 water molecules per acid group, a plateau is reached for initial current value versus N, and so does the hydration energy (~10 KJ/mole).

Figure 15:
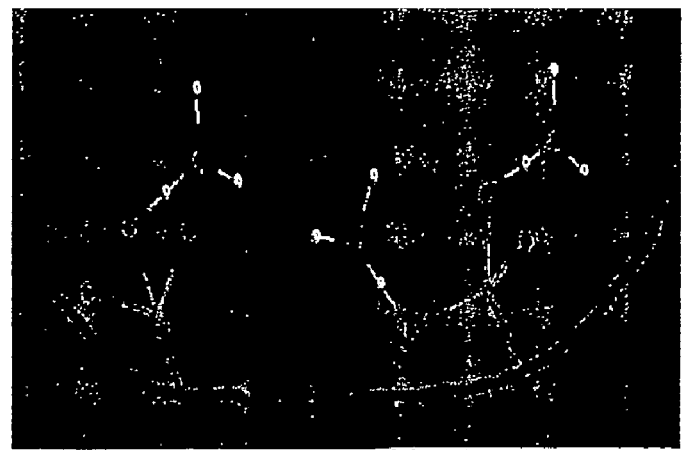
FIG. 15 is a depiction of the water structure inside Nafion® membrane domains.
Figure 15:
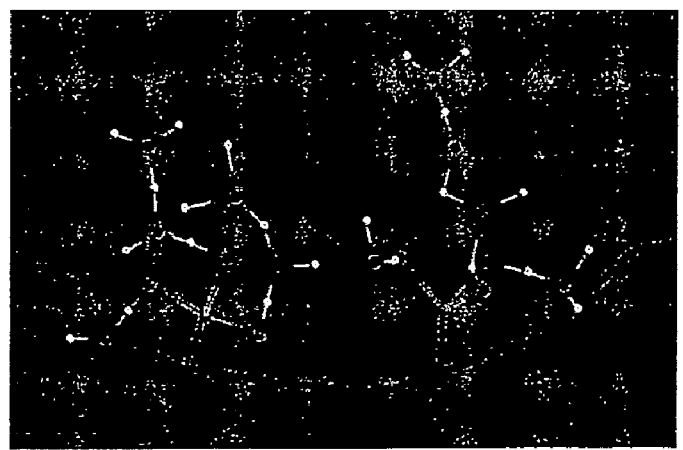
Figure 15:
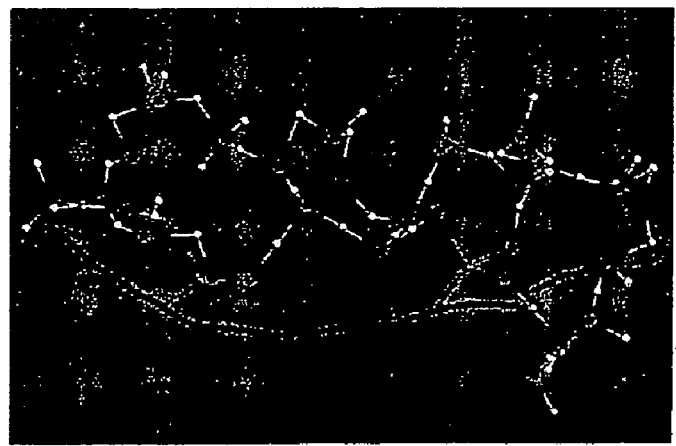

According to the present invention the interaction between water and polymer and water structure formed inside the membrane contributes to the initial current (i.e. conductivity) change. A three-step-conductive model is proposed to explain this interesting phenomenon in FIG. 15. It should be noted that FIG. 15 shows how the H$_2$O molecules bind to sulfonate groups on the polymer backbone of the membrane. The H$_2$O molecules are in fact shown as H$_3$O$^+$ molecules bonded to negatively charged sulfonate groups. However, the discussion below applies equally to both this arrangement as well as that described below.

For N<5 H$_2$O per H$^+$ (or sulfonate group), the region corresponds to solvation of the proton and sulfonate ions. Those water molecules bind to the ionic group very tightly and form rather stable local hydration clusters (a), which results in a high hydration energy value. These water-sulfonic acid clusters are separated from one another in space. Ions such as protons that move through space most readily by mechanisms that involve interconnected water structures are not expected to be very mobile. Thus, in this region, even at high voltage, the current through the membrane is not high.

In the composition region of 5<N<9, when more water molecules are loaded in, they bind to the local water clusters and form a secondary water structure depicted in FIG. 15(*b*). The secondary water layer can act as bridging molecules to connect the "isolated" water clusters to each other. Eventually, a continuous water structure can form. The membrane's contribution to the conductivity increases fast because the conduction "channels" formed. During the formation of secondary water layer, the average interaction between water molecules and ionic groups is weaker and weaker, because the newly added ones do not interact with the ionic site greatly. Thus, the hydration energy per water molecule per H$^+$ drops from 5 to 1 kJ/mole.

Once N exceeds 9, water bridging structures have been formed fully as seen in FIG. 15(*c*). Additional water molecules only form "bulk" water inside the ionic domain and contribute to polymer matrix swelling. Since all the conduction pathways have already formed, the conductivity, and thus the initial current, should be independent of water content.

Figure 16:
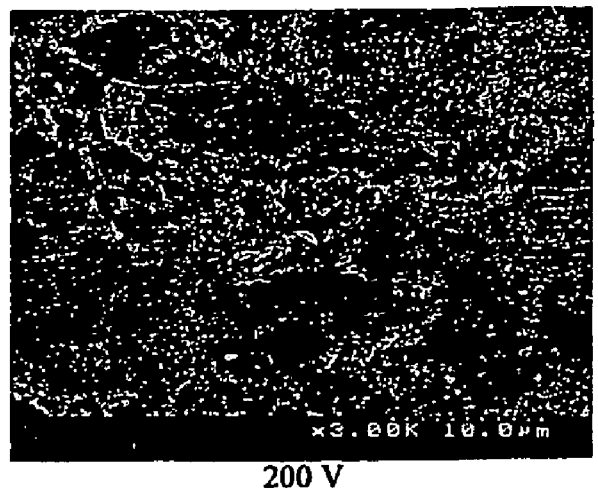
FIG. 16 are SEM images of an anode side surface of a Nafion® membrane evacuated in a vacuum after high voltage treatment of 200, 400, and 800 V FIG. 17 are SEM images of anode side surfaces of Nafion® membranes with different water contents: (a) 1.5 $H_2OH^+$ (b) 5 $H_2O/H^+$ (c) 7 $H_2O/H^+$.
Figure 16:
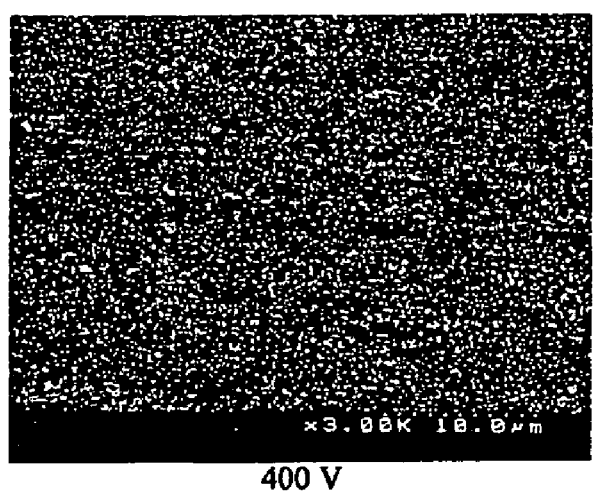
Figure 16:
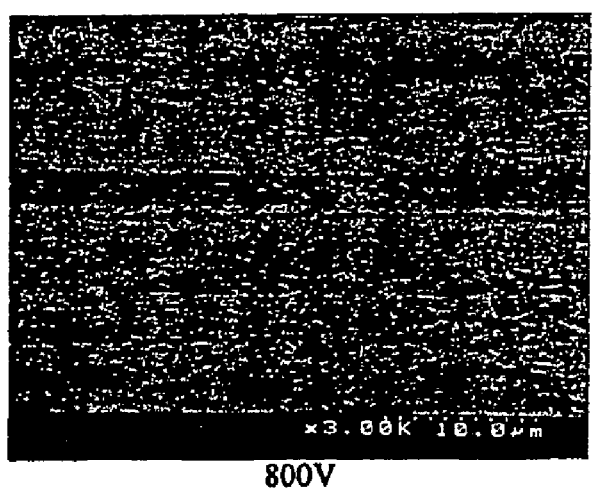

The effect of the application of the electric field on the surfaces of the Nafion® 117 membranes was shown in FIG. 9 to be that the surface near the cathode was unchanged but the morphology on the side next to the anode was changed significantly. In light of the electrical measurements described above, it is of interest to report the effects on the membrane surface near the anode for two types of conditions. In the case of very low water content, near 2% by weight or about 1.5-2.0H$_2$O per H$^+$, the anode side SEM images are shown in FIG. 16. The SEM scale is shown on the lower right side of the images. The 10 micron scale is divided into 10 spaces by dots. Each space is 1 micron. In the top image, labeled 200V, there are very few small defects. The shape of the image is just the imprint in relief of the anode that had been pressed into it. The middle image shows that the application of 400V potential for 30 minutes caused a number of surface modifications to be produced. The overall horizontal sense of the spots is due to the machining direction of the construction of the anode. The bottom image is the equivalent experiment at 800V. Again, the overall direction is due to the anode shape, but the main result is that there is a much bigger effect on the morphology. Thus, even thought these membranes were very dry, it is possible to cause some effect.

Figure 17:
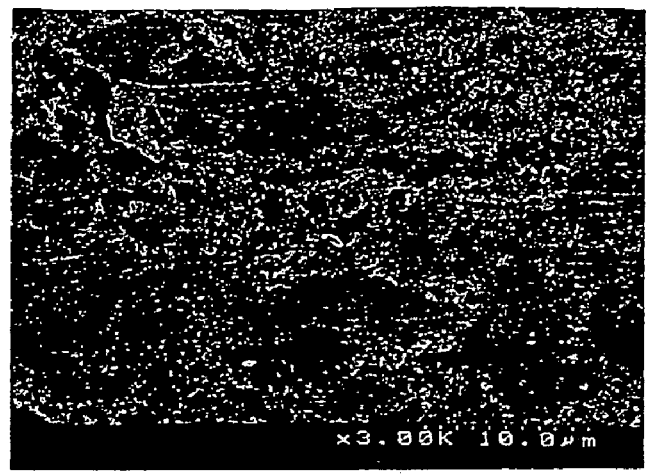
Figure 17:
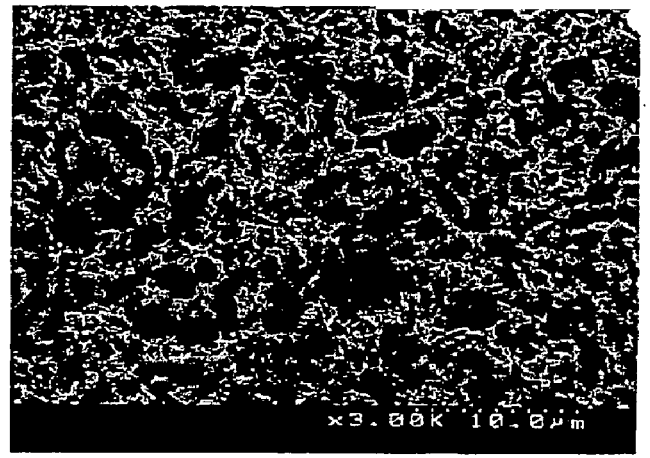
Figure 17:
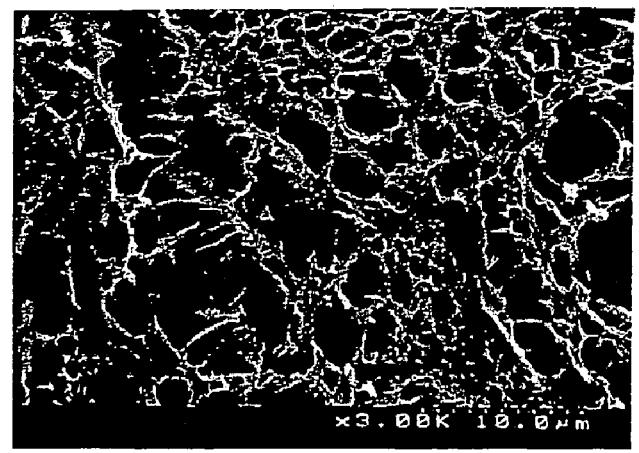

The surface deformation effect is much larger and easier to produce when the water content is higher. This is shown in FIG. 17, which shows SEM images of Nafion® membranes having different water contents subjected to 200V for 30 minutes. The top image (a) is the same one that was on top in FIG. 15. This should make the comparison easier. In FIG. 17, the middle image (b) is of the anode side of a membrane that had been treated with the same voltage, but it initially had 5 H$_2$O/sulfonic acid site. Clearly, larger and more numerous features had been produced on the surface. Finally, in the bottom image (c) it is clear that the anode side near surface morphology has very large features ranging from about 1 to 10 microns.

Figure 18:
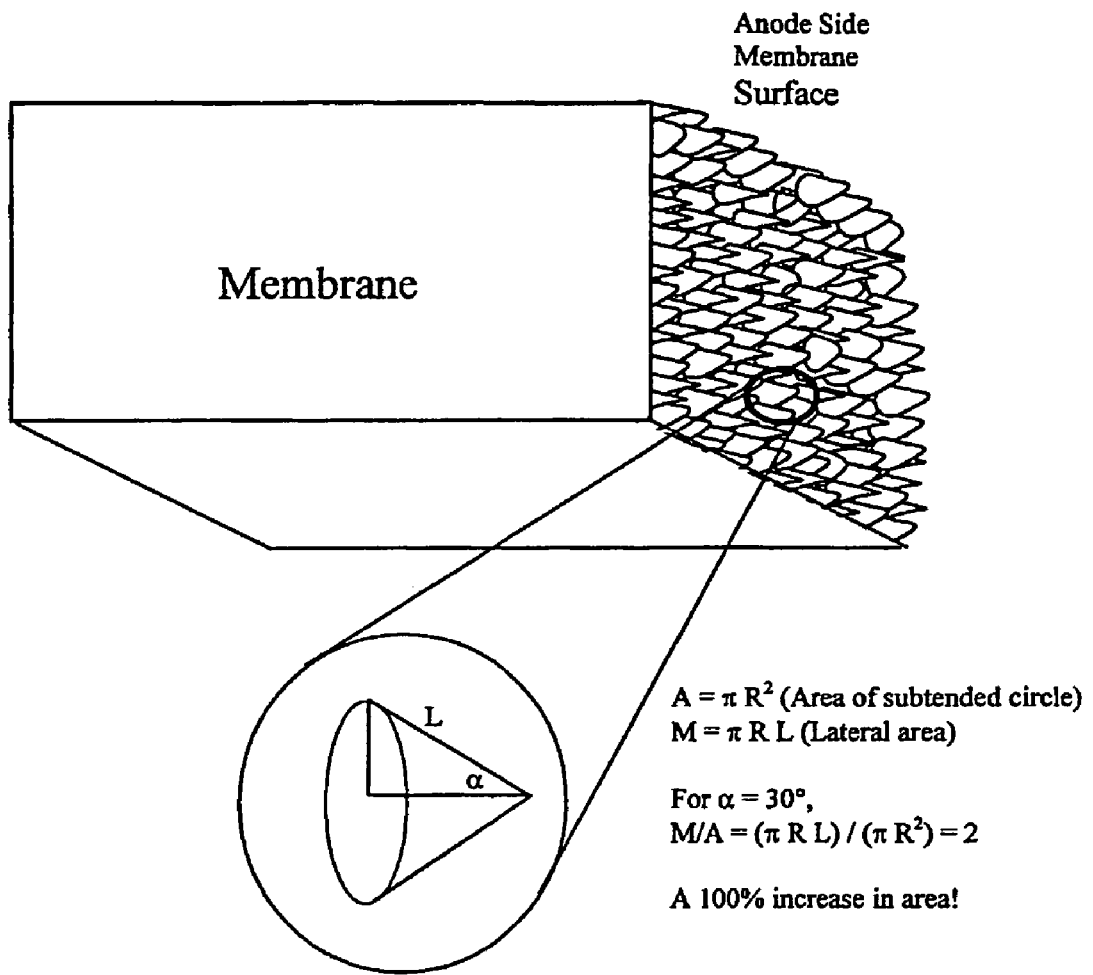
FIG. 18 is an idealization of the surface and calculations for the increase of surface area after surface modification.

An idealization of these surface distortions as a set of "cone-like" protrusions leads to the depiction and calculation shown on FIG. 18. This calculation was done only to estimate the effect on the geometric surface area. To that level of approximation, the area is increased by about 100% relative to the planar starting surface. Clearly this is an idealization, and the surface could be modeled in other ways, such as by a set of valleys or other depressions. By such considerations, we conclude that the surface area is increased by at least 20% relative to the initial cross sectional area of the membrane. In some areas, the increase appears to be about 100%.

TABLE 2

Water contents in membranes equilibrated with water vapor for different time

| equilibration time, t (min) | Water content (%) | ratio of water to H$^+$ N = n$_{H2O}$/n$_{H+}$ |
|---|---|---|
| 0 | 2.5 | 1.5 |
| 5 | 7.3 | 4.5 |
| 10 | 9.7 | 5.9 |
| 20 | 11.8 | 7.2 |
| 30 | 13.0 | 7.9 |
| 40 | 13.9 | 8.5 |
| 50 | 14.3 | 8.7 |
| 60 | 14.6 | 8.9 |
| 70 | 14.8 | 9.0 |
| 80 | 14.9 | 9.1 |
| 90 | 14.9 | 9.1 |

TABLE 3

Current (mA) through the membranes with different water contents

| high voltage of 200 V applying time (min) | equilibration time with water (min) | | | | | | |
|---|---|---|---|---|---|---|---|
| | 10 | 20 | 30 | 40 | 50 | 60 | 90 |
| 0 | 1.4 | 4.0 | 15 | 27 | 50.2 | 47.2 | 44 |
| 1 | 0.93 | 2.2 | 15 | 28 | 56 | 53.6 | 56 |
| 2 | 0.90 | 1.0 | 10.7 | 25 | 63 | 59 | 63 |
| 3 | 0.84 | 0.94 | 5.6 | 20 | 47 | 50 | 50 |
| 4 | 0.79 | 0.90 | 2.6 | 15 | 20 | 18 | 29 |
| 5 | 0.73 | 0.79 | 1.8 | 5.0 | 7.5 | 6 | 15 |
| 6 | 0.67 | 0.73 | 1.3 | 3.0 | 5 | 3.5 | 8 |
| 7 | — | 0.65 | 1.2 | 1.7 | 4 | 2 | 6 |
| 8 | 0.63 | 0.62 | 1.2 | 1.1 | 2.7 | 1.4 | 4.1 |
| 9 | — | 0.60 | 1.2 | 1.0 | 2.1 | 1.1 | 3 |
| 10 | 0.59 | 0.57 | 1.2 | 1.0 | 1.8 | 0.9 | 2.7 |

Modification Mechanism

Without being bound to any particular theory, it is the inventors' belief that based on the experimental results presented above, the electrolysis of water according to the following is the main process taking place and the cause of the observed surface deformations. The small amount of water in the partially dehydrated film plays a very important role in this process. The water electrolysis reactions are:

$$\text{Anode: } 2H_2O \rightarrow 4H^+ + 4e^- + O_2 \tag{2.2}$$

$$\text{Cathode: } 4H^+ + 4e^- \rightarrow 2H_2 \tag{2.3}$$

H$_2$ produced on the cathode side and O$_2$ on the anode side. This is combined with proton transport to the cathode, where protons are reduced to H$_2$.

Figure 19:
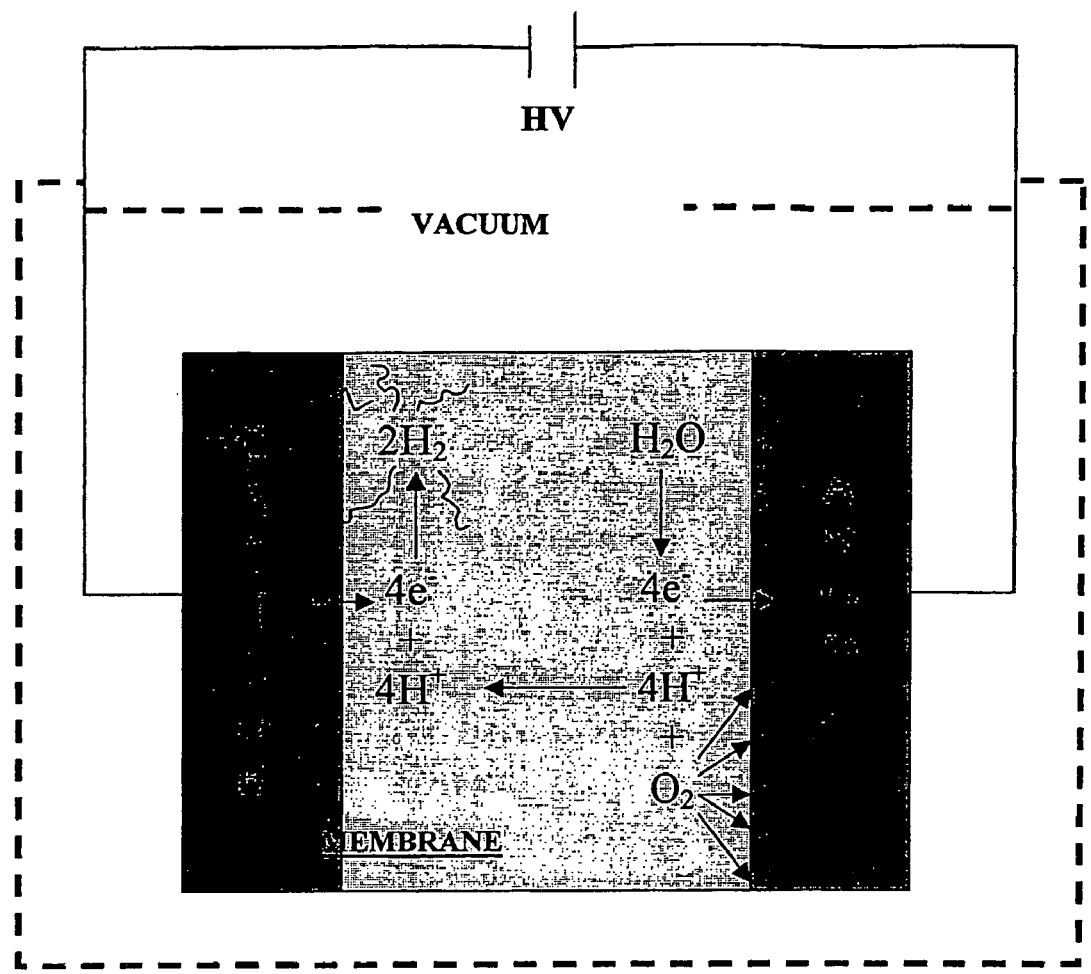
FIG. 19 is a depiction of the electrochemical process for surface modification.

The situation becomes more complicated when attempting to determine how the surface deformations occur. Consider FIG. 19, where the overall process is pictured. The diffusion rates and solubilities of H$_2$ and O$_2$ in Nafion® 117 are known to be quite different. The data for the permeability and diffusivity of H$_2$ and O$_2$ in Nafion® membrane are shown in Table 4. The diffusion rate for H$_2$ is more than 20 times higher than that of O$_2$. These data support the idea that H$_2$ apparently forms at the cathode and diffuses away from the cathode-membrane region faster than it is being generated. It appears that the conditions employed in this study happen to be ones in which the O$_2$ that is generated cannot escape without having other effects. One interpretation is that O$_2$ was built up at the interface on the anode side until a high local pressure is reached. This is due its low diffusion rate in Nafion® film relative to the rate at which it is being generated. At some time in the process, the amount of O$_2$ in a given volume exceeds its solubility and cannot diffuse away fast enough to avoid building up a high local pressure. When this local O$_2$ pressure exceeds the mechanical strength of the Nafion® material, the "pockets" of O$_2$ burst. When they do, they leave the surface modifications observed.

It is interesting that the surface modification occurs at a low enough local temperature that the near surface region does not reconstruct. Since the current at the anode and cathode must be the same, this means that the local resistive heating cannot be the cause of the morphological result. If it were, there would be a modification at the cathode side surface, and there is none. That does not mean that there is no resistive heating; indeed some of the electrical work must go into heat.

TABLE 4

Permeation, diffusion, and solubility data of $H_2$ and $O_2$ in Nafion ® (H+ form) membranes (30° C.)

| Gas | $P_m^{(a)} \times 10^{10}$ | $D^{(b)} \times 10^8$ | $S^{(c)} \times 10^3$ |
|---|---|---|---|
| $H_2$ | 14.0 | 200 | 0.70 |
| $O_2$ | 1.43 | 8.8 | 1.8 |

$^{(a)}$Permeability coefficients ($cm^3$(STP)-cm/$cm^2$-s-cmHg)
$^{(b)}$Diffusion coefficients ($cm^2$/s)
$^{(c)}$Solubility ($cm^3$(STP)/$cm^3$-cmHg)

Electrical Experiments with the Multi-electrode Assembly

The method for applying an electric field to a membrane using the multi-electrode assembly, shown in FIG. 7, was described in detail in the preceding Multi-Electrode Assemblies section. This device makes it possible to carry out a set of experiments at a range of different voltages on a single membrane sample of known water content. By combining such data from a number of experiments, it also is possible to discover the effect of varying the water content at different voltages.

The effect of interest is the feature or pore size of the surface modification. That is, the average size of the features produced on the anode surface under each set of conditions. Thus, the results are presented as images and as plots of the average feature size versus a controlled variable.

Figure 20:
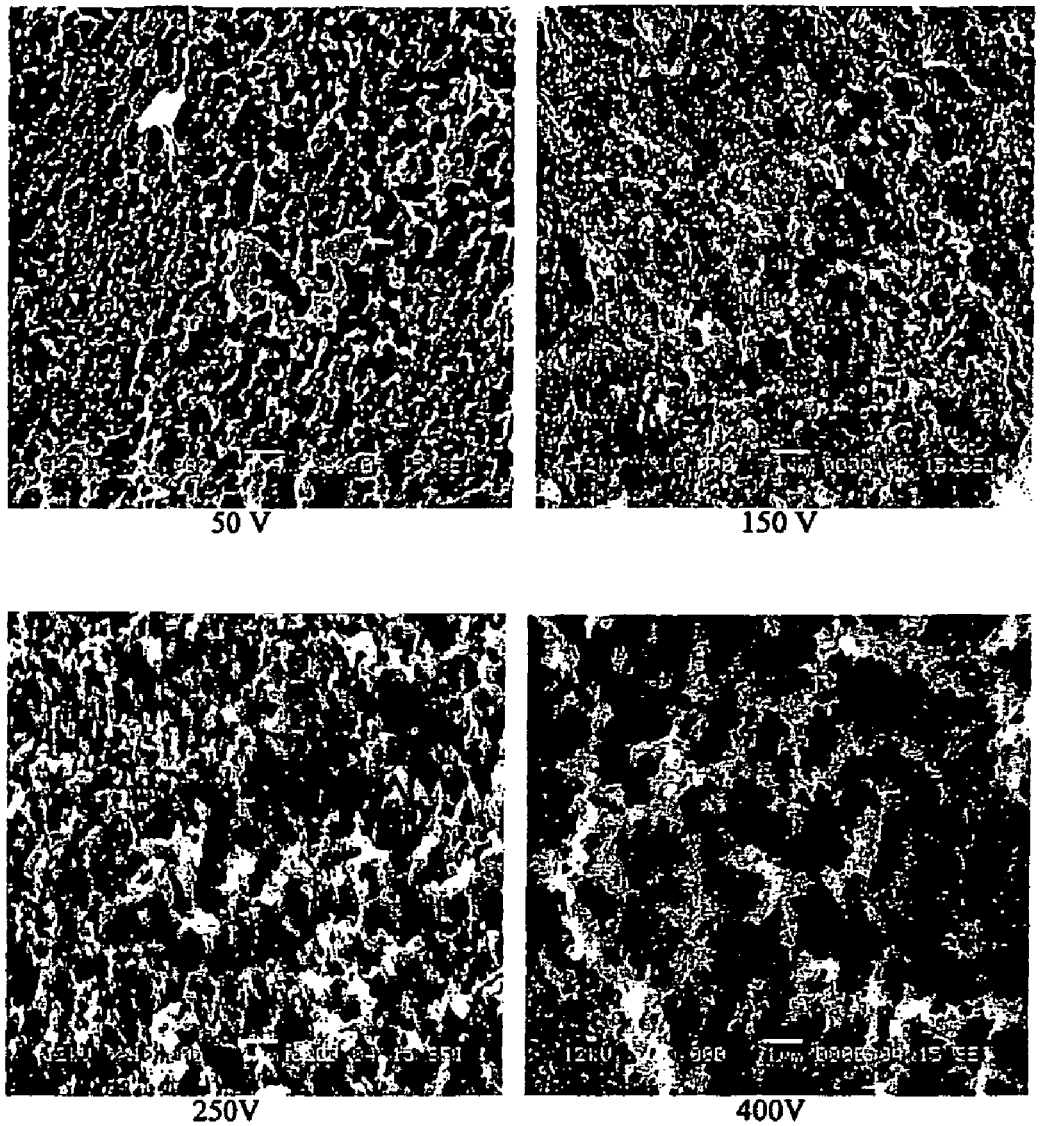
FIG. 20 are SEM images of an anode side surface of a Nafion® membrane after high voltage treatments of 50, 150, 250, and 400 V, with the membrane equilibrated with RH 22.4% water vapor.

In FIG. 20, the images of the surface are shown for a membrane that had been exposed to water vapor at 22.4% RH and then electrolyzed for 10 minutes by four different electrodes in the Multi-electrode assembly at 50, 150, 250, and 400V, respectively. The feature size increased with the voltage. The electrode morphology in the electrode used for the 50 V experiment was not quite flat, so it appears in the image. Note that the scale of the images is that the white bar at the bottom center of the image is 1 micron. Thus, the entire image in each case is about 12 microns across. The feature sizes are plotted in FIG. 21. The 400V image looks like the average size is about 1 micron, but when the smaller ones are counted and a simple arithmetic average is taken, the average is less than 0.5 micron. Alternatively, a different type of average, can be taken since more of the current is used to produce the $O_2$ that produces the larger features, but the arithmetic average is employed here.

Figure 22:
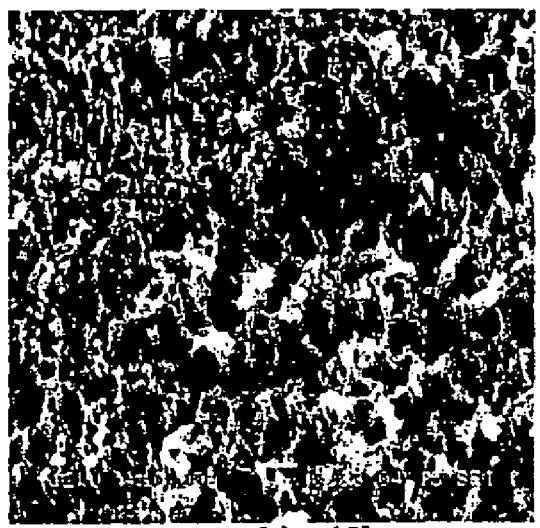
FIG. 22 are SEM images of anode side surfaces of Nafion® membranes after a constant high voltage treatment (250 V).
Figure 22:
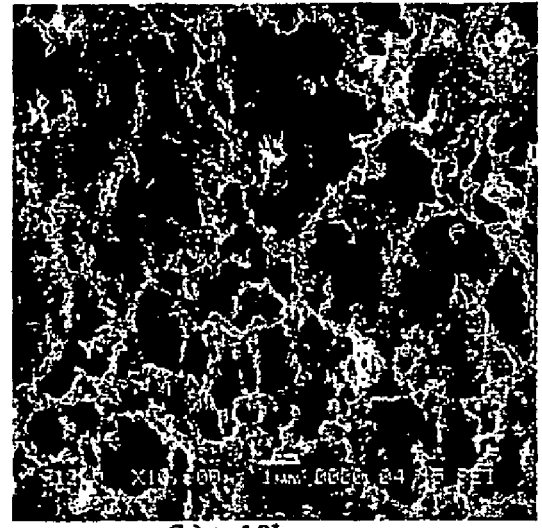
Figure 22:
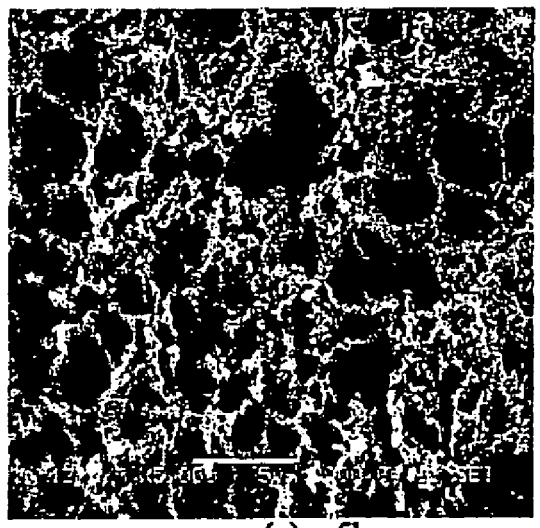
Figure 22:
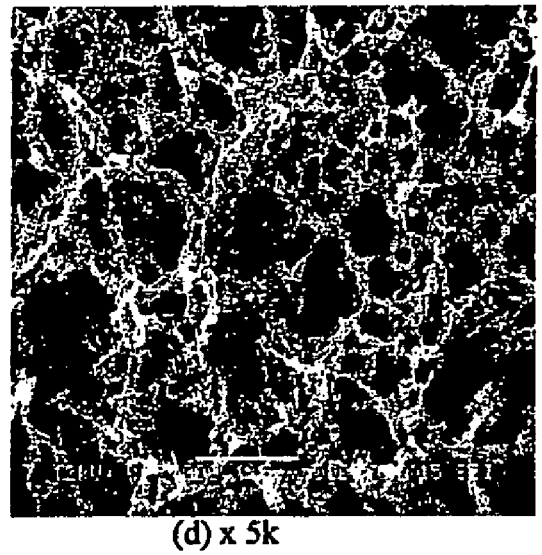

In the SEM images presented in FIG. 22, the voltage is held constant at 250V, but the water content of the membranes is varied with the relative humidity of the samples being (a) 22.4%, (b) 28.5%, (c) 34.2%, and (d) 63.5%, respectively. Again, the average feature size was determined and the data presented in FIG. 23. Note that the SEM image scales are not the same for all images in FIG. 22. The white bars at the bottom of the top two images are 1 micron, and the overall images are about 12 microns wide. The white bars across the lower images are 5 microns wide, so the bottom two images are about 25 microns wide.

Figure 21:
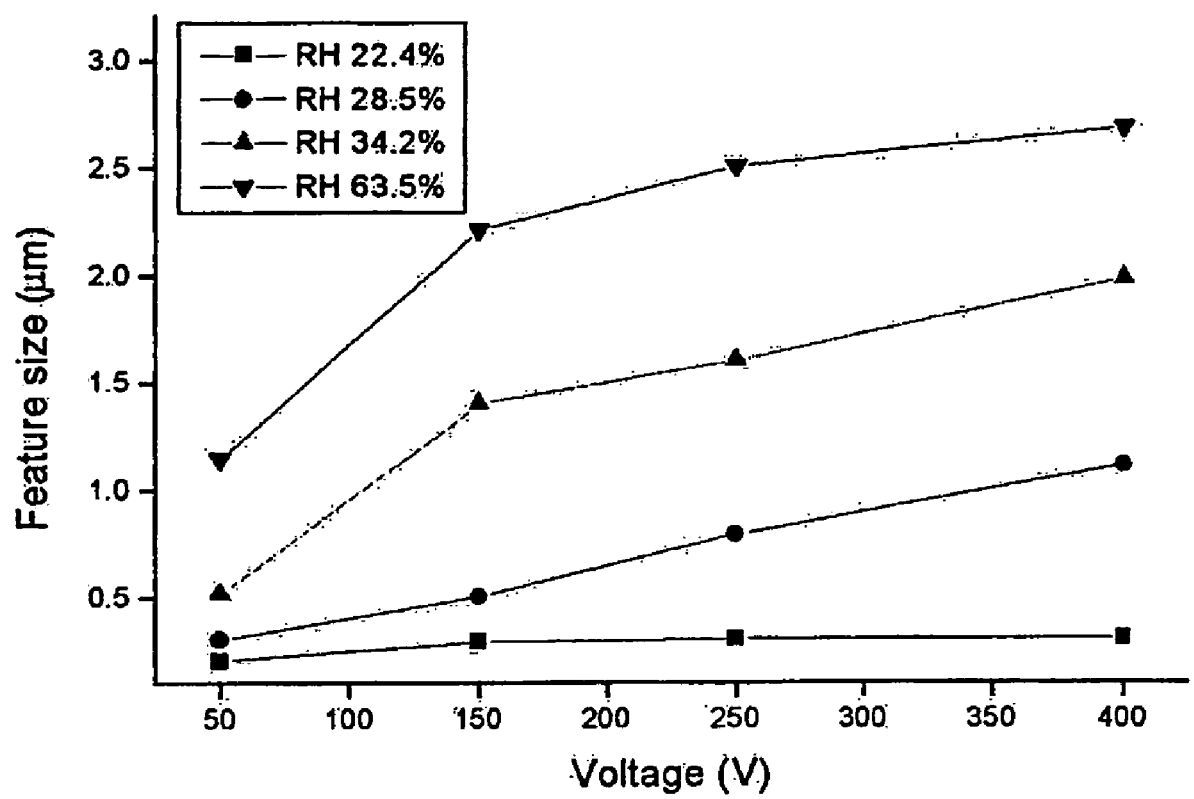
FIG. 21 is a graph of feature size of modified surface vs. applied voltage, Nafion® membranes equilibrated with 22.4~63.5% RH water vapor before high voltage treatment.

From the plots in FIGS. 21 and 23, one can see that the feature size increases with hydration and applied voltage.

Without being bound by any particular theory, set forth below is a suggested feasibility calculation to potentially explain this model.

Calculation of the Gas Generation and Diffusion

The high voltage applied across the membrane generates $H_2$ and $O_2$ at the surface region of the membrane. The local pressure of gas products on the surface region is critical for surface modification. The local pressure comes from the competition between the generation and the loss of gas products. If the gas production rate is higher than its diffusion rate, then gas can build up at the interface between electrode and membrane and then surface-modification may occur. On the other hand, if the gas production rate is lower than its diffusion rate, there is no way to form surface features. This model has been generally discussed previously.

The model first considers the generation of $H_2$ and $O_2$. During the electrical treatment, the electric quantity (Q, coulombs) passing through the membrane is the product of current (I) and time (t):

$$Q=It \quad (2.5)$$

The amount (moles) of electrons produced can be calculated by equation 2.4:

$$Q=nZF \quad (2.6)$$

where, Q is in coulombs, n is the numbers of moles, Z=1 for the electron, and F is the Faraday constant.

If a simplifying assumption is made that all electrons produce $H_2$ and $O_2$ (i.e., no other chemical reactions, such as $M^+$ electrolysis, sulfur reduction, etc.), then one mole of electrons (one Faraday) will produce ½ mole of $H_2$ and ¼ mole of $O_2$. Under this assumption, the production rate ($R^0$) of $H_2$ or $O_2$ will be:

$$R^0 = dn/dt \approx \Delta n/\Delta t = I/(ZF) \quad (2.7)$$

where, Z=2 for $H_2$ and Z=4 for $O_2$.

The second aspect is the loss of $H_2$ and $O_2$ from the electrode-membrane interface. When $H_2$ and $O_2$ are generated, they can permeate through the membrane, which leads to loss of gas products. This is difficult to model simply, because the gas must first diffuse into the membrane as it is generated, then that gas must become part of a reservoir of gas that is being depleted and replenished. In order to simplify the matter, consider the simple gas diffusion across a membrane.

If a film with an area of A and a thickness of L separates two regions containing a permeable gas at different pressures, then the gas will permeate from the high pressure part to low pressure region. If the gas concentration in the two parts are $C_1$ and $C_2$ (pressure is $p_1$ and $p_2$), the total permeate amount (Q) to pass through a film of area A after time t is $$Q=-DAt(C_2-C_1)/L \quad (2.8)$$

where, D is diffusion coefficient and L is the pass length.

Now, assume that Henry's law applies here, then solubility coefficient, K will be:

$$K=C_1/p_1=C_2/p_2 \quad (2.9)$$

Thus, the amount of permeable gas (i.e., Loss of gas, n') is given by:

$$n'=DKAt(p_1-p_2)/L=P_mAt(p_1-p_2)/L \quad (2.10)$$

where the permeability coefficient $P_m$ is the combination of diffusion coefficient and solubility coefficient ($P_m=DK$).

Then the gas loss rate is calculated from equation 2.9 to give:

$$R' \approx n'/\Delta t = P_m A(p_1-p_2)/L \quad (2.11)$$

In the experimental conditions employed in this work, $p_1 \gg p_2$, so equation 2.11 can be rewritten as:

$$R'=P_m A p_1/L \quad (2.12)$$

The third aspect is the competition of two processes. There is a competition between the gas generation and gas loss. If $R^0 > R'$, local pressure can form and surface modification may occur. If $R^0 <= R'$, all the gas diffuse away right after the generation, no surface modification expected.

As an example, 200V was applied on a Nafion® 117 membrane for a minute, and the average current through the membrane was 100 mA. The anode side surface was modified but the cathode side surface had no change. The parameters in this system were $A=0.95$ cm$^3$, $L=0.018$ cm, $I=100$ mA, $t=60$ s, and $T=298$ K. From the equation 2.3 and 2.4, the amount of $O_2$ and $H_2$ can be calculated ($Z=4$ for $O_2$ and 2 for $H_2$).

$n^0(O_2)=1.55 \times 10^{-5}$ mol $n^0(H_2)=3.10 \times 10^{-5}$ mol

From equation 2.5, the generation rate of gases is also calculated.

$R^0(O_2)=2.58 \times 10^{-7}$ mol/sec $R^0(H_2)=5.17 \times 10^{-7}$ mol/sec

To calculate the loss of gas products, it is necessary to know the gas pressure at the surface region, so that the pressure difference before and after the gas permeation can be achieved.

The gas molecules are generated at the interface of electrode and membrane: The absorption of $O_2$ and $H_2$ on metal electrodes is negligible comparing their solubility in Nafion® membrane. The generated gas products will diffuse away towards the membrane (not the electrode). Assume that they initially are generated in 1 μm deep near the surfaces (h=1 μm). Then the initial volume (V) where the gases stay is shown in equation 2.10 is:

$V=Ah=9.5 \times 10^{-11}$ m$^3$ \hfill (2.13)

Thus the initial pressure of the gas products will be $p_1(O_2)=n^0(O_2)RT/V=4.0 \times 10^8$ Pa$=3.0 \times 10^5$ cmHg \hfill (2.14)

$p_1(H_2)=n^0(H_2)RT/V=4.0 \times 10^8$ Pa$=6.0 \times 10^5$ cmHg \hfill (2.15)

From equation 2.10 and 2.11, gas product loss can be calculated.

$n'(O_2)=P_m A^* t^* \Delta P/L=0.136$ cm$^3$(STP)$=6.1 \times 10^{-6}$ mol $n'(H_2)=1.2 \times 10^{-4}$ mol $R'(O_2)=1.0 \times 10^{-7}$ mol/sec $R'(H_2)=2.0 \times 10$ mol/sec In this experiment, $R^0(O_2) > 2 R'(O_2)$ at the interface of the anode and the membrane. Then local pressure of $O_2$ can form in the near surface region and the pockets of $O_2$ will explode on the anode side surface and increase the surface area.

On the other hand, $R^0(H_2) << R'(H_2)$ at the interface of the cathode and the membrane. That means that the produced $H_2$ will diffuse away right after the generation, no surface modification should occur.

In addition to the use of this method for modifying the surface morphologies and other materials properties of ionomer and other polymers, there are a number of ways in which the surface-modified proton conducting membranes can be employed in fuel cells.

Alternative uses for the invention include:
1. Use as modified membranes directly, so that the modification improves gas flow ($H_2$, $O_2$ or $H_2O$) near the surface.
2. Use after subsequent ion exchange and chemical treatment to produce catalyst regions.
3. Use after subsequent deposition of particles that provide catalytic or other functions. This deposition can be followed by treatment to embed, adhere, or otherwise attach and incorporate the particles including, but not limited to, particles dispersed in a paste, paint or other dispersion that also comprises a compound that is or forms an ion or proton conducting medium.
4. Use after subsequent application of a paste of material such as the catalyst particles and the dissolved or dispersed membrane material.
5. Use as modified membranes wherein the modification serves to make them adhere more readily or more effectively to another material. One example of this is the case where a patch of one piece of membrane is to be attached to a torn piece of membrane. In this case, the two modified surfaces are mated and then partially fused. The purpose is to use the greater surface area and the low heat requirement for surface melting to enhance the adhesion.
6. Use as modified membranes wherein the surface modification enhances the ability of the membrane to be attached to the surfaces of tubes, cell walls and other components to achieve seals that show improved resistance to the flow of gases or liquids, as well as to adhere to solid or liquid dispersions of particles in ion or proton conducting media.
7. Use of the modified membranes as membranes whose gas transport and/or liquid transport properties have been modified from those of the original membrane material in a controlled manner.

In addition to these fuel cell related applications, there are a number of other products and applications of the methods. They include the modification of other proton-conducting polymeric materials, and the modification of any water-containing polymeric material. In the case of the modification of any water-containing polymers, this can result in polymers that have been surface-modified in particular regions. Those regions then would exhibit spatially selective behavior, such as spatially selective adhesion, ink uptake, gas transport, etc.

To summarize at this point, a high voltage electrochemical process has been discovered and used to modify the surface structure of a proton-form Nafion® film to produce 0.3 to 5 μm scale features. A significant increase in the area of the surface was achieved.

Absorbed water inside the membrane plays a very important role in surface modification process. It is suggested that water builds up in Nafion® in a three-step water absorption process, and this was discussed relative to the data for hydration energy and apparent conductivity. The electrical conditions cause the electrolysis of water to produce $O_2$ in the anode side surface region and $H_2$ at the cathode side. The permeability of $H_2$ in Nafion® membrane is much higher than that of $O_2$. The production and diffusion of gas products were calculated. The results indicate that the diffusion rate of $H_2$ is equal or faster than its production rate, while production rate of $O_2$ is much faster than its diffusion rate about one magnitude. The local pressure of $O_2$ built up at various regions at the interface of anode and membrane, and then "pockets" of $O_2$ exploded and built the rough near surface region of the anode side of the membrane.

The surface structure modifications depend on voltage (current density) and the water content of the membrane. The dependence was studied systematically by using single-electrode assemblies as well as multi-electrode cells.

The potential applications of the modified membranes, in addition to the fuel cell application, were discussed. This method also may be used for modification of other proton-conducting polymeric materials, and the modification of any water-containing polymeric material.

The new approach to studying physical and chemical processes that could lead to useful modification of the morphology and composition of PFSA (Nafion®) membranes for fuel cell applications includes two parts: The first analysis, as outlined above, was to employ physical methods to increase the surface area. The second is to employ chemical and physical means to build a catalyst in the near surface region of a membrane with a greatly increased surface area.

The discovery of a new method to increase the surface area of a proton-conducting membrane was previously discussed. It brought together elevated voltage electrochemistry, molecular diffusion, mechanical properties, and electrical properties of Nafion® membranes to produce a surface region of greatly enhanced surface area. Chemical and electrochemical studies designed to explore the formation of a catalyst in the near surface region will now be described.

Three different types of methods (i.e, chemical, electrochemical and physical) for building catalyst layer in the near surface region were investigated. These three methods are shown schematically in FIG. 24.

The three methods will be described separately. First, the experiments using purely chemical methods for making the catalyst type region will be discussed. This approach is to introduce metal ions (such as Ru and Pt ions) into the Nafion® membrane by ion-exchange in the first sequence of steps. Then these ions are treated with reducing agent.

Once these ions are in the membrane, and subsequently reduced, the question to be addressed is what kind of metallic region is formed. However, before that can be addressed, it is necessary to find out how to carry out the ion exchange and how to determine what is formed in this process.

At first view, it might not seem difficult to carry out an ion exchange between protons in a hydrophilic ion transport membrane and transition metal containing ions. However, considerable experiment work was required because the ions are large and can be highly charged. When they are incorporated in the near surface region, they can modify the morphology in such a way as to control the spatial distribution of, the cations. When two types of metal-containing cations are to be exchanged with one membrane, this problem is greater. Since both Pt and Ru must be present in the near surface region, this problem is present, and the work is restricted to species containing Pt and Ru.

Thus, results for experiments in which Pt and Ru containing ions were ion exchanged into a Nafion® membrane and then reduced are described. Emphasis is placed on the measurement of metal ion distribution in the membrane achieved by one method, a sequential ion exchange, and subsequent reduction with $NaBH_4$.

The second approach examined in this part of the study is called In-situ Electrolysis, and will be described below. The idea behind this set of experiments is to use a metal-ion-exchange membrane as both a metal source and as an electrolyte in an electrolysis process. While a range of conditions was explored, electrolysis voltages that are great enough to produce reduced metal fast enough to allow it to grow as aggregates, layers or crystallites in the near surface region were used. In this analysis, the principal interest is the behavior of Ru and Pt, of course, but explorations of Cu, Ni, Co, Rh and Ag illustrate some of the types of morphologies that can be obtained.

In FIG. 24, the third type of approach to putting metallic species in this near surface region is physical deposition. The idea behind the process is to find a way to make nano-scale metal particles coated with proton conductive polymeric material and to place them in the sub-micron scale crevices that were produced by the electrochemical surface modification process. Again, the experiments reported here are limited to the Pt and Ru system, although the results are applicable to other catalyst systems as well.

Chemical Deposition

As described earlier, perfluorocarbon sufonic acid, PFSA, polymer (Nafion®) consists of a poly-tetrafluoroethylene backbone with pendant fluoroether-like side chains. Each side chain is terminated with a sulfonic acid group. The sulfonic acid groups aggregate to form ionic domains and channels in the hydrophobic perfluorocarbon matrix. The acidic protons can be replaced by cations via ion-exchange in aqueous or alcoholic solutions. This has been shown in the cases of Pt(II) and of Ru(III) ions. Thus, platinum ions have been exchanged into Nafion® membrane and then reduced to platinum (O) particles by $H_2$, $NH_2$—$NH_2$, or $NaBH_4$ in Risen's group and other groups. Others have also studied the incorporation of Ru(III) ions and their reduction by hydrazine.

Even though it has been possible to exchange some Pt(II) and Ru(III) species into Nafion® films, there is no report of attempts to exchange both into the same membrane. This is a significant difference because any two different ions are expected to exchange with protons at rather different rates. That effect can be exaggerated in the case of large species whose charges depend on their coordination state.

Thus, experiments were designed to find ways to incorporate both of these two ions in the same membrane and to do so uniformly if possible. Three methods were used. The first was to place the membrane in aqueous solution containing both $Pt(NH_3)_4^{2+}$ and $Ru(H_2O)_xCl_y^{+(3-y)}$. Since the $Pt(NH_3)_4^{2+}$ was known to exchange relatively fast, the relative concentrations of the species were adjusted to favor the Ru(III)-containing ion. The second approach was to bring the two ions to the membrane from opposite sides. The third approach was to carry out a partial exchange with the slower species and then to complete the exchange with the faster one.

Once ion exchange was accomplished, the metal ions were reduced using $NaBH_4$. The products of the successful ion exchange and reduction were characterized by a combination of scanning electron microscopy (SEM) and elemental analysis by an Electron Microprobe in the SEM mode.

Scanning Electron Microscope (SEM) is widely used in characterization of polymer morphology due to its resolution on non-transparent (electron transparency) samples, its great depth of field and focus (compared to optical microscopy), and its ease of operation and sample preparation (compared to TEM). For this study in particular, the Electron Microprobe operating in the SEM mode was of great importance. It makes it possible to do a quantitative analysis of the elements present in a small region. Specifically, it can analyze for elements heavier than oxygen in a spot of about 5 µm diameter. Since the thickness of a Nafion® 117 membrane is about 175 µm, this made it possible to determine the concentrations of Ru and Pt across a cross section of a membrane. In addition, the surface morphologies were observed using Scanning Electron Microscope (SEM). The distribution of Pt and Ru over the membrane cross-section was measured using Electron Micro-probe Analysis method.

Membrane samples of Nafion® 117 ionomer were supplied by the DuPont Co. They have an equivalent weight of 1100 and a thickness of 7 mil (i.e. 0.007 inch) or 175 µm. The materials were purified by the method described earlier. The metal ion sources were $RuCl_3 \cdot 3H_2O$ and $Pt(NH_3)_4Cl_2 \cdot H_2O$. They and $NaBH_4$ were purchased from Strem Chemicals and used without further purification.

Ion exchange was carried out by exposing the purified Nafion® 117 membrane samples to aqueous solutions of $Pt(NH_3)_4^{2+}$ and Ru(III) ions. The results were analyzed in two ways. One, mentioned above, was a combination of SEM and Electron Microprobe. It was employed on the successfully exchanged samples. The other, simpler method was a spectrochemical assay. This method involved reacting a dried membrane sample with CO and studying its infrared spectrum. It is described in more details later. Since Ru(III) is more reactive with CO than Pt(II) and it also is ion exchange much more slowly, this method served to assess the extent to which Ru(III) was incorporated.

Three methods were used to perform the ion exchange. The most successful method is as follows. A Nafion® membrane was stirred in 0.005 M aqueous solution of $RuCl_3$ hydrate for 0.5 to 5 hours, then in 0.001 M aqueous solution of $Pt(NH_3)_4Cl_2$ hydrate for 0.5 to 5 hours at room temperature. The times were selected to vary the total and relative concentration of the ions in the final membrane. After the ion-exchange process, the membrane was reduced chemically by reacting it with a 0.1 mol/L ethanol/water (1/1, v/v) solution of $NaBH_4$ for 30 minutes at room temperature.

As mentioned above, the membranes were assayed for Ru(III) content by drying them in vacuum at 90° C., reacting them with 0.1 atm CO (g), evacuating the CO (g), and measuring their FTIR spectra. As noted in Chapter 4, the presence of Ru is indicated by the appearance of IR bands in the 2000 $cm^{-1}$, region, at ~2090 and 2040 $cm^1$, due to C—O stretching vibrations.

The Scanning Electron Microscopy (SEM) analysis was performed on a Hitachi S-2700 SEM to examine the surface morphology of the membranes. The electron source typically was run at 8 kV and 10 nA. A thin conductive Pd/Au coating was applied on the polymer surface to produce secondary electrons and to minimize charge buildup.

The distribution of Pt and Ru elements in the membrane during the chemical deposition process was measured using CAMCA MBX Electron Microprobe analyzer, which was run at 20 kV and 10 nA. Five spots were measured as shown across the membrane cross-section in FIG. 25. One is in the center, two near the edge and two are ¼ of the way across the membrane.

Of the three approaches to the overall deposition process shown in FIG. 24, one involves ion exchange followed by chemical reduction with $NaBH_4$. This process involves the following reactions, and is shown in detail in FIG. 25.

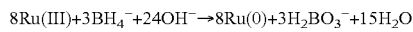

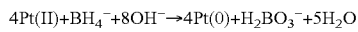

In this approach, a PFSA membrane first is soaked in an aqueous solution of the cationic sources, in the present case $RuCl_3$ and $Pt(NH_3)_4Cl_2$ were used. In principle, the cations simply exchange with the hydrogen ions. The actual situation is more complicated, however, since ions exchange at different rates and the exchanged membrane was different diffusion rates than the acid form material. In fact, the cationic platinum species diffuse into the membrane faster than ruthenium species.

Several different ion-exchange methods were explored to put approximately equivalent amount of platinum and ruthenium species in the membrane. Firstly, the membrane was stirred in an aqueous solution containing both $Pt(NH_3)_4Cl_2$ and $RuCl_3$. By examination of the infrared spectra of the membranes after exposure to CO, it was found that the membrane absorbed much more Pt than Ru. This was true even when the Pt concentration is one-tenth of Ru concentration in the mixed solution. In principle, this approach should work at same ratio of ionic concentration.

In a second set of experiments, Pt and Ru ions were brought to two sides of the membrane by clamping a membrane between two tubes which contained Pt and Ru source solutions separately.

A preferred method in this approach was found to be to exchange ruthenium and platinum ions for $H^+$ in the membrane using a step by step process: First, the membrane is placed into a $RuCl_3$ solution and stirred long enough to assure that Ru(III) ions have exchanged with $H^+$ in the membrane. The level of exchange is controlled by the time and concentration. Then the ruthenium-containing membrane, with some $H^+$ remaining, was placed in a $Pt(NH_3)_4Cl_2$ solution. It was found experimentally that approximately equivalent amount of Pt- and Ru-containing species were incorporated if the exchange step times are the same and the [Ru(III)]≈5 [Pt(II)]. The concentrations and their spatial profiles are discussed below.

After both ruthenium and platinum were exchanged into Nafion® membranes, the membranes were placed into a 0.1 M $NaBH_4$ solution. The purpose of the last step is to reduce metal ions to metal particles, so that a Pt and Ru containing catalyst layer can be formed near the surface region of the membrane.

The ion exchange and chemical deposition process is shown schematically in FIG. 26. After the ion-exchange part of the process, distribution of ruthenium and platinum in the membrane was analyzed by Electron Microprobe Analysis method. The results are presented in the top chart of FIG. 27. The Ru(III) and the Pt(II) ions were dispersed homogeneously through a membrane prepared by ion exchanging with 0.005 M $RuCl_3$ and 0.001 M $Pt(NH_3)_4Cl_2$ solution for 3 hours, respectively.

The membrane was then was reacted with 0.1 M $NaBH_4$ solution for 0.5 hour. Then the membrane was rinsed in 0.1 M $HNO_3$ for 0.5 hour and rinsed again with $H_2O$. Then a portion of this membrane was analyzed for its distribution of Ru and Pt by Electron Microprobe. As shown in the bottom chart of FIG. 27, the concentration of the metal ions in the middle of the membrane decreased to a very low level, and the concentration of Pt and Ru increased significantly in the near surface region. The atomic ratio of Pt to Ru near the surface is about 1:1. This metallic composition could be ideal for $H_2/O_2$ fuel cell systems. It has been reported that the catalysts with Pt/Ru atomic ratio of 1:1 are the most CO-tolerant Pt—Ru/C catalysts.

The data can be understood, in part, by the following consideration. When the Ru and Pt exchanged membrane is reacted with a solution of $NaBH_4$, ruthenium and platinum ions diffuse out of the matrix toward the surface because a concentration gradient between inside and outside of the membrane as the ions near the surface are reduced and their concentration is lowered. The charge imbalance developed in the membrane causes Na$^+$ ions to diffuse into the membrane. Anionic $BH_4^-$ can also be transferred across Nafion® although its rate is low. Thus the Ru and Pt ions are reduced by $BH_4^-$ group and Ru/Pt particles are formed near the surface region of the membrane. When the chemical deposition is completed, sodium ions were rinsed out by the nitric acid solution.

The chemical reactions near the surface are:

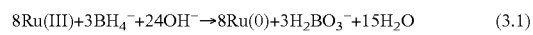 (3.1)

 (3.2)

Through this reaction sequence, a Pt/Ru layer is built in the near surface region of unmodified Nafion® membrane. It is evident that the composition of the bimetallic layer could be controlled by varying the preparation conditions.

It was reported previously herein that the membrane may be surface-modified by an electrochemical method. While the surface area was increased significantly after the electrical treatment, it is not apparent whether that was accomplished by a modification of the physical and chemical properties that would prevent the development of a bimetallic near surface region. The goal is to form catalyst-containing membrane with increased surface area by combining surface modification and chemical deposition methods.

In accordance with the present invention, to combine the physical and chemical modification processes, a piece of Nafion® 117 membrane was first treated by high voltage at 200 V using the method described earlier. The surface next to the anode was modified while the other side remained essentially unchanged as observed by SEM. This treated membrane was used as a starting membrane to carry out the chemical deposition. It was first stirred in Ru and then Pt ion solution sequentially. The resultant metal ion-containing membrane then was soaked in a 0.1 M $NaBH_4$ solution and then it was rinsed in 0.1 M $HNO_3$ and $H_2O$. The metal ions were reduced to metal particles and concentrated near the surface region.

Figure 28:
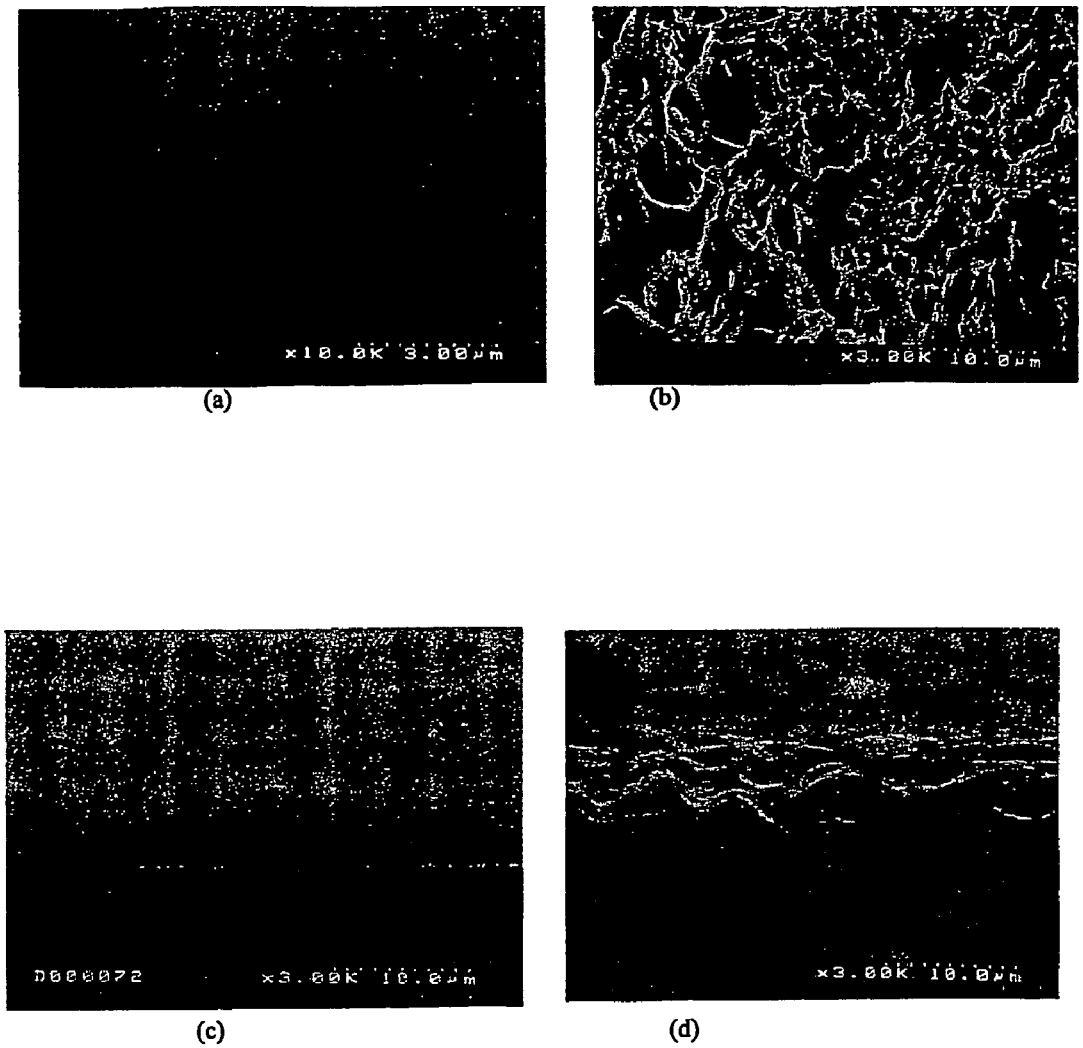

The morphologies of the membranes made by the combination of high voltage surface modification and chemical deposition are shown in FIG. 28. Figure (a) and (b) are SEM images of the unchanged and modified surfaces after high voltage treatment, respectively. With the formation of a metal layer on the unchanged surface region, the layer surface remains flat and smooth (c). If the catalyst layer is formed near the modified surface region, a big surface area increase is achieved (d), although it should be noticed that the surface features are somewhat covered by the new-formed catalyst layer.

A three step chemical method has been developed to prepare Ru and Pt bimetallic catalyst layer near the surface regions of Nafion® membranes. First, Ru(III) ions were exchanged into the membrane, then Pt(II) ions were exchanged into the membrane. This two step ion-exchange process results in a homogeneous dispersion of ruthenium and platinum in a Nafion® membrane. The metal ion-containing membrane then was soaked in $NaBH_4$ solution. The diffusion of different species inside and outside membrane and the chemical reduction reaction resulted in the formation of Pt/Ru bimetallic layer in the near surface region of the Nafion® membrane.

Combination of electrical surface modification and chemical deposition methods have been carried out. A Pt/Ru-built-in Nafion® membrane with high surface area has been developed. The composition of this bimetallic catalyst can be controlled by preparation conditions. The 1:1 (atomic) Pt/Ru catalyst is prepared via chemical means, which is supposed to have excellent CO tolerance in fuel cell applications.

In-Situ Electrolysis

After the metal ions are exchanged into Nafion® membranes, two methods were used to diffuse the metal ions out and reduce them to form a bimetallic layer in the near surface regions. One is chemical deposition, which has been described above. The second method is to reduce the metal ions electrochemically, which is an electrolysis or "electroplating" process.

Electroplating has been a well-known method for depositing metal coatings on various substrates for many years. A typical electroplating system consists of a power source, two electrodes and the electrolyte solution, which is also the metal source. This approach can be applied to forming a metallic layer in the near surface regions of a membrane. To explore this approach, Nafion® membranes that had been ion-exchanged with an aqueous metal salt solution were prepared. The membranes are then placed between two metal plate electrodes. Since a PFSA membrane has good ionic conductivity when water is present inside the membrane, the metal ions have relatively good mobility. So the hydrated metal ion-containing membrane is both a metal ion source and an electrolyte (or, electroplating "bath"). When a voltage is applied across the membrane to electrolyze the metal ions inside the membrane, one of the results is the deposition of a metal layer in the near surface region adjacent to cathode. Other physicochemical processes occur as well, including electrolysis of $H_2O$ and proton diffusion.

In this section, the results for the electrolysis of PFSA membrane that contain a range of transition metal ions are described in a qualitative manner.

Nafion® 117 membranes, having equivalent weight of 1100 g/mol and thickness 0.007 inch (ca. 170 µm) were used for these experiments. They were purified by the method mentioned previously. The following salts were used to form solutions with which to ion-exchange the membrane: $AgNO_3$, $CuCl_2$, $Ni(NO_3)_2$, $CoCl_3 \cdot 6H_2O$, $RhCl_3$, $RuCl_3 \cdot 3H_2O$, $Ru(NO)Cl_3 \cdot H_2O$, $PtCl_2$, and $PdCl_2$. They were purchased from Strem Chemicals Co. and used without further purification.

In each case membranes for electrolysis were prepared by ion exchanging the Nafion® membrane with a 0.001~0.1 M aqueous solution of the appropriate salt. Each ion exchanged membrane was rinsed in $H_2O$ before use.

The basic device for building catalyst layer near surface region electrochemically is shown in FIG. 29. A piece of 1.5 cm×1.5 cm ion exchanged Nafion® 117 film was used as solid electrolyte and metal source. The film was placed between electrodes (circular block of 1.27 cm diameter). In a typical experiment, a constant voltage of 10 V was applied across the membrane for 15-45 minutes. In each case, a metal layer was formed in the near surface region adjacent to cathode.

The product membranes and metallic species were studied by SEM. The measurements were performed on a Hitachi S-2700 Scanning Electron Microscope to examine the surface and the cross-section morphology of the membranes.

The concept of in-situ electrolysis is simple. A typical electroplating cell must have a power source, electrodes, electroplating bath and solution, and this system works much like an electroplating cell. A piece of Nafion® membrane containing metal ions and water has two functions: it is an electroplating bath (a matrix to contain the metal ions), and, it is also an electrolysis salt source itself (solid electrolyte).

The experimental result of carrying out the electrolysis as described in the Experimental section, above, is production of metallic material on the cathode side of the membrane. Under 10 V constant voltage, the electrolysis is carried out. Water is oxidized at anode to produce $O_2$ and protons (see Eq. 3.3). The protons and the metal cations diffuse toward the cathode side, helped by the electrical field. Some of the metal-containing cations are reduced at the interface of the membrane and the cathode. As the metal-containing cations are removed through reduction, the negative sulfonate groups are then neutralized by protons (see Eq. 3.4).

$$½H_2O \rightarrow H^+ + ¼O_2 + e^- \tag{3.3}$$

$$R-SO_3^-M^+ + H^+ + e^- \rightarrow R-SO_3^-H^+ + M^0 \tag{3.4}$$

$$H_2O + 2M^+ \rightarrow 2H^+ + ½O_2 + 2M^0 \tag{3.5}$$

The morphologies of the metallic layer formed in this manner indicated that a range of diffusion, reduction, nucleation and crystal growth phenomena are important.

First, note that it would have been possible for no metallic material or layer to be formed in the near surface region. Indeed, all of the oxygen could have escaped at the anode and all of the metal could have been deposited on or alloyed with the metallic cathode. Similarly, oxidation of the anode to form anode metal oxides could have dominated the processes. However, these were not the observation.

Second, the production of $M^0$ atoms must compete with the production of $H_2$, from electrolysis of $H_2O$, at the cathode. This $H_2$ production could have dominated, and the reaction of $H_2$ with transition metal ions could control the processes. Indeed, it may be very important in several cases.

Finally, the relationship between the rate of production of the metal atoms, a function of the voltage and resistivity, and the rate of nucleation and growth of metallic layer structures is an important factor to consider. If the atoms are being produced at a rate that is higher than the effective diffusion rate, the atoms can add to the effective cathode surface before it diffuses away. In such cases dendritic growth can be expected as illustrated schematically in FIG. 30.

Morphologies of the metallic layers in the individual electroplating experiments, along with observations about the process can be described as follows.

For silver, a Nafion® membrane was colorless after being treated with 0.1 M $Ag(NO_3)$ aqueous solution. The electrolysis then was carried out, and a shiny metallic layer appeared on the membrane surface towards cathode side. Black particles could be observed under the surface. The cross-section of the silver metal layer was characterized using SEM and is present in FIG. 31. The thickness of metal layer outside the membrane is less than 1 μm and metal layer formed inside the membrane is 5-10 μm thick under this condition. The morphology is not as clear as it is in later cases (e.g. the Rh case in a later figure), but it appears that dendritic Ag growth occurs under these conditions to make the metal layer grow inside the membrane.

For copper, after being ion-exchanged with 0.1M $CuCl_2$ aqueous solution and treated with 10 V potential, a metal layer appeared on the membrane surface next to the cathode. The metal layer is not uniform and three different regions were observed. An idealized schematic of this is shown in FIG. 32. In it, a shiny copper layer is in the middle, and it is surrounded with a black color circle and then a light black circle.

The SEM images for these different regions are shown in FIG. 33. The reduced copper species in region 1 are isolated copper particles (right bottom corner of FIG. 33). The crystal grows laterally from a spot on the surface, as can be observed clearly in an enlarged image (FIG. 34).

In region 2, the isolated particles connect to each other and form a loose copper layer (the middle of FIG. 33). In addition, the particles grow into the membrane as well as laterally as can be observed in an enlarged image (FIG. 35, the dark crystal structures under bright spots).

The SEM image (FIG. 36) shows a closeup of the condensed multi-metallic layer formation seen in region 3 of FIG. 33. The condensed thick layer appears a typical shiny color of copper.

It is fortunate that the experiment was carried out in such a way as to have the electric field stronger in some regions than others, because this made it possible to observe several stages of the metal layer growth. The membrane containing the metal ions was loaded between two flat electrodes and a constant potential was applied across the membrane. However, the membrane was not entirely flat and of uniform thickness, so some regions were in better contact with the cathode and subject to a higher field than other regions. The electrical reduction in these regions of membrane have a faster rate than others, because of these differences overall, then the copper morphologies in different regions represent stages in the process of copper reduction. The images in the area near the edge represent the early stage of copper formation, while those in the center give the picture of late stage of copper layer formation. At the beginning, copper ions are reduced to copper particles, which are isolated. It is in the similar case to copper particles formed at the edge. Then more and more ions are reduced, and the particles grow bigger to form continuous layer and further into the membrane. A thick metal layer is finally built near the surface region of the membrane. It is the case of images observed in the middle of the metal layer.

For cobalt and nickel, the ion-exchanging sources are 0.1 M $CoCl_3$ and 0.1 M $Ni(NO_3)_2$ aqueous solutions, respectively. After the complete reduction of metal ions, a shiny metal layer is formed on the surface adjacent to cathode for both Co and Ni cases. SEM images show the uniform cobalt particles growth on the surface (FIG. 37). From the enlarged image shapes (FIG. 38), the particle growth can be observed underneath the surface and the crystals appear needle shapes. The similar phenomena are discovered in nickel case, but Ni crystals are mostly in cubic shape (FIGS. 39 and 40).

Figure 41:
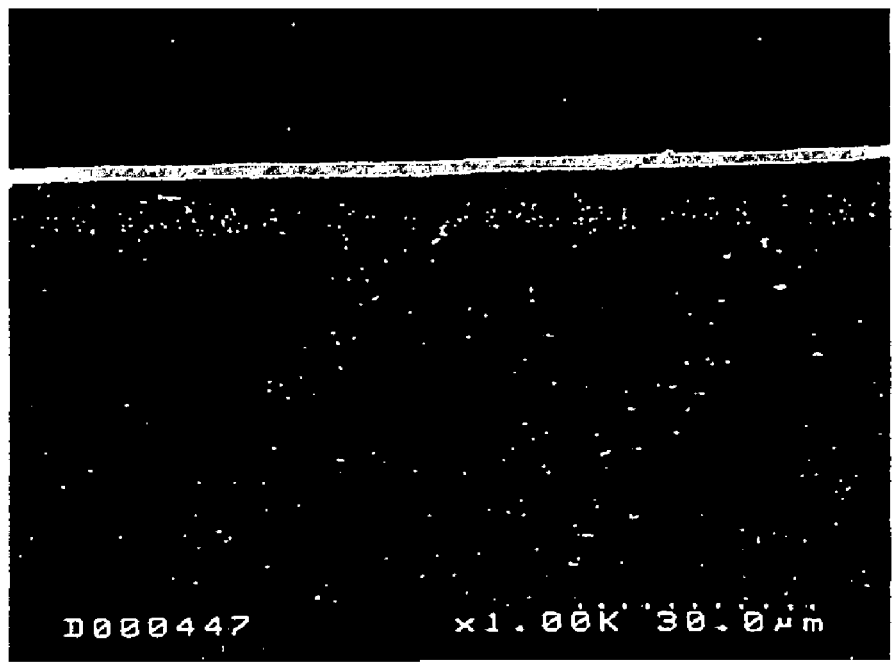
Figure 41:
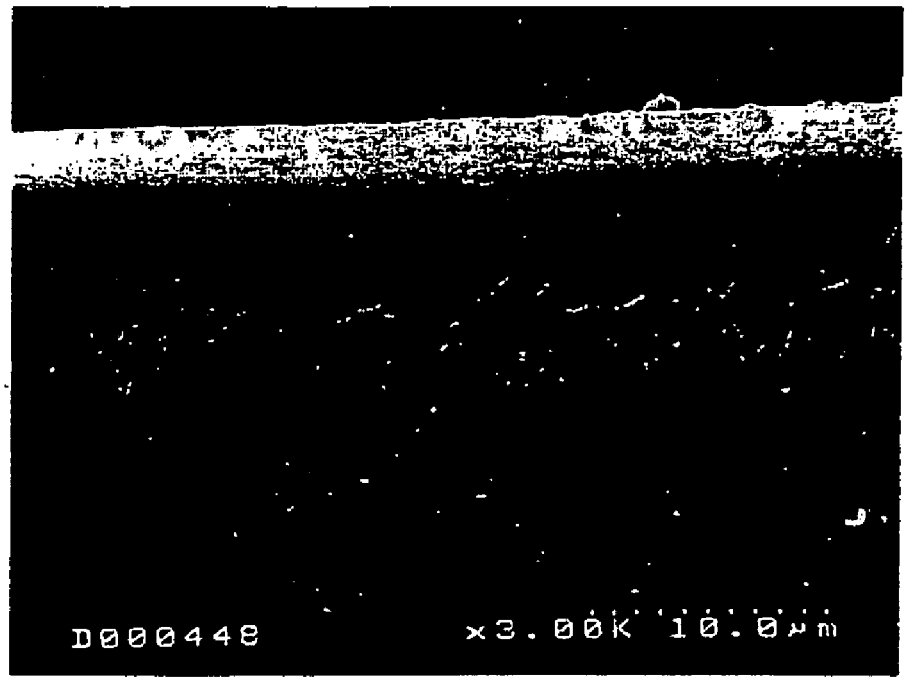

For rhodium, a Nafion® membrane was treated with 0.005 M $RhCl_3$ aqueous solution for 7 hours, and then it was rinsed and electrolyzed at 10 V for 15 minutes. Rhodium ions were reduced on the cathode side at a constant voltage. A shiny metal layer was deposited on the surface after the electroplating process. The metal layer inside the membrane is about 5-10 μm (FIG. 41). In some areas, it is clear that dendritic growth into the membrane has occurred. Thus, metal "branches" clearly are observed (FIG. 42). The extension of the dendritic structure from the surface down to the membrane was found to reach up to 20 μm. It gave evidence that the metal layer (or metal branches) grows from the spots on the membrane surface down into the membrane.

In the chemical deposition of Pt, $Pt(NH_3)_4Cl_2 \cdot H_2O$ was need as the source of Pt(II) ions. It has good solubility in water and is a stable species. Platinum electroplating solutions used to deposit high quality Pt layers at a reasonable rate often are based on $Pt(NH_3)_4^{2+}$ in a dilute pH 10.0-10.5 buffer. However, such processes operate at a temperature of 90° C. or above. It is thought that the high temperature is necessary because the kinetically inert $Pt(NH_3)_4^{2+}$ is itself not the electro-active species. Its reduction to Pt metal occurs according to a complicated mechanism involving a set of precursor chemical reactions, in which, $NH_3$ ligands are replaced by water.

On the other hand, if the Pt(II) is coordinated to $H_2O$, the electrical reduction of Pt(II) to Pt(0) can be operated at room temperature. It is known that the platinum chloride salt ($PtCl_2$) can be used to prepare a Pt-Nafion® membrane. Thus, this method was used to prepare a Pt-Nafion® membrane for electrolysis, but the process is not a simple ion exchange. Thus, $PtCl_2$ is sparsely soluble in water. It undergoes hydrolysis in awueous solution so an exchangeable cationic species is $[Pt(H_2O)_3Cl]^+$.

The acid form Nafion® 117 membrane was placed in a saturated $PtCl_2$ solution, which was in contact with solid $PtCl_2$, and stirred for 2 days. Its color changed from colorless to light brown as Pt(II) (mainly in the form of $PtCl^+$) was exchanged into the membrane. The electroplating then was carried out. It resulted in formation of a shiny metallic layer on the membrane surface towards cathode. As shown in the SEM image in FIG. 43, the thickness of the metal layer that grew into the membrane appears to be from 1 to 3 µm. The image is somewhat unclear about the metallic layer inside the membrane, because it appears that the region is shown only because of the fracture-cleavage of the sample. However, this and other samples were prepared analogously and only the Pt and Ru reduced membranes showed this structure, and it was reproduced several times.

For ruthenium, a number of methods for electro-deposition of ruthenium have been discovered in ruthenium industry. Among these, ruthenium nitrosyl salt is the most widely used ruthenium source in Ru plating baths in order to get a smooth and adherent deposit.

The ruthenium salt solution used in this experiment is 0.005 M Ru(NO)Cl$_3$ aqueous solution, which has a wine-red color. After being soaked in the Ru(NO)Cl$_3$ solution for 10 hours, the Nafion® membrane had a reddish appearance, which indicated the impregnation of ruthenium ions into the membrane. This membrane then was placed between two electrodes and a voltage of 10 V was applied to the membrane for 15 min. A shiny metallic ruthenium layer was formed on the cathode side surface. The thickness of the metal layer in the near surface region of membrane is about 5 µm (FIG. 44). Here, too, as in the case of Pt, the SEM image of the cross-section is less clear than it would be ideally. Again the question has to do with whether the feature is due to cleavage alone or whether the cleavage is a result of a change in material at about 3 µm depth. Unfortunately, Electron Microprobe SEM is not helpful here because of its 5 µm spot size and the fact that it would detect the surface metal.

The in-situ electroplating method has been shown to deposit a metal layer on Nafion® membrane surface, and, in some cases, the reduction process continues to grow metal particles further into the near surface region to form 1-10 µm metal layer or dendritic metal branches. Electrochemical deposition is a general method for building metal particles in the near surface region of polymer membranes. Metal layers other than those reported above can be produced principally if they meet the basic requirements that the metal ions can be exchanged to the membrane and have high enough diffusion coefficients to be transported through the membrane under the electrolysis conditions, that the metal ions can be reduced at room temperature (e.g., use of PtCl$_2$ instead of Pt(NH$_3$)$_4$Cl$_2$), and that the metallic species formed do not react with water or oxygen (e.g., alkali and alkaline earth elements).

The morphology and the thickness of a deposited metal layer may be (indeed is expected to be) a function of the concentration of the metal ions in the membrane, the applied voltage, current density, and the duration of the experiment.

The formation of Ru and Pt layers near the surface region of Nafion® will definitely have an application in fuel cell systems. It is a major challenge to electroplate the Pt/Ru catalyst near the surface region in a controlled fashion. Through the use of appropriate electrolytes, current density, electrical potential, and so on, the designed metal structure may be produced.

Physical Deposition

The third approach to forming a bimetallic layer in the near surface region is based on the idea that small metal particles could be placed in the "valleys" formed on the membrane surface by the electric field modification. Then heat and pressure could be applied to achieve a surface melting of the protrusions that form the walls of those sub micron scale valleys. That would encapsulate the metal nanoparticles in the near surface region. The idea is illustrated schematically in FIG. 45.

This is an interesting approach, but it requires the formation of highly dispersed metal nanoparticles, or in this case bimetallic nanoparticles. To achieve this dispersion, in the reduced form, it is necessary to protect the surface of the metals from oxidation and prevent agglomeration.

Polymer protected metal nanoparticles, microparticles and clusters have attracted much attention in recent years due to their high catalytic activities. Colloidal dispersion of a number of types, including Pt and Ru nanoparticles, can be prepared by reducing the corresponding metal ions in the refluxing solution of alcohol/water containing poly(N-vinyl-2-pyrolidone). It is reasonable to explore that mixed Pt/Ru particles, either mixtures of the two elements or alloys, could be formed this way. Indeed, it is shown in this work that the reaction apparently proceeds smoothly to analogous bimetallic products.

Unfortunately, forming nanoparticles in this way for use with the modified fuel cell membrane is difficult for two reasons. First, the mechanical properties of the material are poor, because PVP is a quite brittle polymer, and the resultant membrane would therefore have PVP component that is incompatible with PFSA matrix.

Thus, an ideal nanoparticle would be one in which a zero valent metal cluster is coated with PFSA (Nafion®) that has the same morphology, or can be transformed thermally into the same morphology, as the membrane matrix. To explore this possibility, the synthesis of PVP-encapsulated Pt particles was repeated and extended to a mixed Pt/Ru system. Then the method was attempted with PFSA.

It is possible to form PFSA (Nafion®)) "solution". Indeed, they are available commercially. However, extensive studies by light scattering and other physical methods have shown that they are colloids as well. Moreover, it has been shown that there is an exothermic transition between dried film of the dispersed material and a film of the more stable form that is spectroscopically the same as the original membrane.

In accordance with the invention, two syntheses were attempted. First, a mixture of Ru(III) and Pt(II) compounds in solution were reacted with alcohol and water in the presence of PVP. Second, attempts to replicate this using PFSA were made.

Poly(N-vinyl-2-pyrrolidone) (PVP) (K-30, average molecular weight 40,000, Aldrich Chemical) was employed in the published method for making polymer protected metal particles. Nafion® "solution", a 5% mixture (w/w) of Nafion® 117 in a 50/50 (w/w) mixture of water and lower aliphatic alcohols was obtained from Aldrich Chemical Co. Ruthenium chloride (RuCl$_3$.3H$_2$O), tetraamineplatinum (II) dichloride (Pt(NH$_3$)$_4$Cl$_2$.6H$_2$O), hexachloropatinic(IV) acid (H$_2$PtCl$_6$.6H$_2$O), and sodium borohydride (NaBH$_4$) were purchased from Strem Chemical Co. and used without further purification.

Following a method outlined in, among others, M. Harada, K. Asakura, and N. Toshima, *J. Phys, Chem.*, 1993, 97, 5103, the disclosure of which is incorporated herein by reference, ruthenium chloride (RuCl$_3$.3H$_2$O, 0.035 mmol), Hexachloropatinic(IV) acid (H$_2$PtCl$_6$.6H$_2$O, 0.035 mmol) and poly(N-vinyl-2-pyrrolidone) (PVP, 2.8 mmol) were dissolved in 50 mL water/ethanol (1:1, v/v) solution. The brown solution was refluxed at about 90° C. for 5 hours. The product was a brown-black colloidal suspension.

In a first approach, modified from the above reference, ruthenium chloride (RuCl$_3$.3H$_2$O, 0.025 mmol), hexachloropatinic(IV) acid (H$_2$PtCl$_6$.6H$_2$O, 0.025 mmol) and 5 mL of 5% Nafion® 117 dispersion (0.2 mmol as one acid unit) were suspended in 50 mL ethanol solution. The brown mixture was refluxed at about 90° C. for 10 hours. This produced an ink-blue dispersion. When it was heated in a closed container at 80° C. for 10 hours, a grey-black dispersion resulted.

In the second approach, ruthenium chloride (RuCl$_3$.3H$_2$O, 0.04 mmol), tetraamineplatinum (II) dichloride (Pt(NH$_3$)$_4$Cl$_2$.6H$_2$O, 0.04 mmol) and 10 mL 5% Nafion® 117 dispersion (~0.4 mmol as one acid unit) were suspended in 50 mL ethanol. Then, 10 mL sodium borohydride (NaBH$_4$, 1.0 mmol) ethanol solution was then added, quickly and with vigorous stirring. A black dispersion was formed immediately. It stirred for 10 hours.

Ruthenium chloride, hexachloropatinic(IV) acid and PVP polymer were dissolved in 50 mL ethanol. The mixture was heated to about 90° C. for 3 hours in air, resulting in clear and stable dispersion of polymer-protected bimetallic clusters. No precipitation was detected after 6 months at room temperature in air. This is consistent with properties of PVP-protected Pt nanoparticles reported by others.

It has been suggested that ruthenium and platinum ions are reduced in hot ethanol through the reactions:

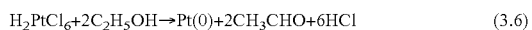

$$H_2PtCl_6 + 2C_2H_5OH \rightarrow Pt(0) + 2CH_3CHO + 6HCl \quad (3.6)$$

$$2RuCl_3 + 3C_2H_5OH \rightarrow 2Ru(0) + 3CH_3CHO + 6HCl \quad (3.7)$$

As discussed in the literature, the PVP polymer plays a key role in formation of colloidal dispersions of nano-scale metallic clusters. The PVP first coordinates to metal ions in solution before the reduction. So the metal ions are surrounded within the PVP environment. In hot ethanol, the metal ions within the polymer matrix then are reduced to form metal clusters, which are still surrounded by PVP polymer molecules. The polymer can protect the metal clusters from concentrating or precipitating. The so formed metal clusters in polymer solution are smaller and have a narrower size distribution than those without polymer protection, and they are reported to against air oxidation.

The Nafion® "solution" obtained from Aldrich Chemical Co. was made by methods reported in W. G. Grot and F. Chadds, European Patent 0066369, 1982. Dissolution or dispersion of small pieces of Nafion® 117 in a 50/50 mixture of water and lower aliphatic alcohols (such as ethanol) was effected at 250° C. under pressure to produce a visible clear and colorless liquid.

Ruthenium chloride and hexachloropatinic(IV) acid were dissolved in ethanol resulting in brown mixture. Then 5% Nafion® solution was added into the metal salt solution and the color changed to red-brown after 5 minutes of stirring. This initial color change may have resulted from the coordination of Nafion® polymer to metal ions, although the solvation process also is accompanied by a lowering of the pH. The mixture was heated to reflux temperature (90° C.-95° C.) for several hours. After 5 hours of heating, it began to change color to dark blue. Further heating did not change the solution color; it remained dark blue. This solution was put in a closed container and left in a 80° C. oven. The final product was grey-black mixture after 40 hours of heating under pressure. Upon evaporation of solvent, an agglomerated dark grey powder was observed. It is obvious that the reduction of metal ions in Nafion® solution is much harder than it is in PVP solution. In PVP, the reduction to metal was completed in 3 hours. The color change (red brown→dark blue→black) indicates the formation of the intermediate Ru (II) during the reduction process. This means that the Ru(II) ions, which have a dark blue color in solution, are relatively stable in the presence of Nafion® colloidal particles at the pH to which the Nafion® takes the solution. This is about pH 3 in an equivalent experiment in H$_2$O.

The difficulty of reduction of Nafion®-protected metal ions in hot ethanol suggested that a stronger reductant needed to be introduced in a new method. This leads to the second attempt to prepare such materials. In this case, ruthenium chloride (0.025 mmol), tetraamineplatinum (II) (0.025 mmol) and Nafion® 117 solution (0.2 mmol) were dissolved in ethanol to form a brown solution. The requisite amount of sodium borohydride ethanol solution was then added quickly with rapid stirring. A color change from brown to grey-black happened in several seconds. This indicates that the strong reductant NaBH$_4$ reduces metal ions to metal particles very quickly. It was continuously stirred for 10 hours to give a stable dispersion.

The reduction reactions during the metal cluster formation may be the same as we discussed in chemical deposition part:

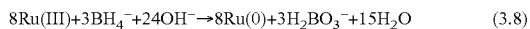

$$8Ru(III) + 3BH_4^- + 24OH^- \rightarrow 8Ru(0) + 3H_2BO_3^- + 15H_2O \quad (3.8)$$

$$4Pt(II) + BH_4^- + 8OH^- \rightarrow 4Pt(0) + H_2BO_3^- + 5H_2O \quad (3.9)$$

In accordance with the invention, PVP- and Nafion®-protected Pt/Ru colloidal dispersions were produced. The metal particles in the dispersion are in nano-scale size (<100 nm). The electrical modified surface features are in the range of 0.3~5 µm. The metal particles may then be dropped into the "valleys" on the surface. A thermal process that causes some or all of the cone-like protrusions to flow around the particles can produce a membrane containing these particles in the near surface regions.

To make a catalyst layer near the surface region, the membrane is heated to cause the protrusions to flow around the particles. The surface melting requires lower heat energy than bulk polymer because of the high surface area. The heating temperature must be well controlled, so that the polymer is only partially fused (i.e., only surface melted, not the bulk).

By varying the sizes and process conditions, the fraction of the particles that are completely surrounded by membrane material, the fraction of the particles that are simply adhered to the surface, and the fraction of particles that are partially surrounded by membrane material may be varied.

Polymer (PVP and Nafion®) protecting Pt/Ru clusters have been synthesized. They can be directly dropped on the pre-modified membrane surface and become part of the near surface region through subsequent treatment. It can be used as the catalyst material. By optimizing process conditions, the new catalyst containing polymer membrane is achieved.

Properties of Metal Containing Polymer Electrolyte Membranes

A further object of the invention discovered whether and how gaseous compounds that are important in the H$_2$/O$_2$ fuel cell system, CO, H$_2$, O$_2$ react with Ru and Pt in Nafion® membranes or in the near surface regions of the membranes. Since the presence of any CO would be caused by the reforming reactions that produced H$_2$ fuel, the principal interest is in the reactions of H$_2$ and CO with metals and metallic ions in Nafion®.

In accordance with the above, a number of forms of PFSA film containing Ru have been prepared and reacted with CO and H$_2$. They include films comprising Ru$^{n+}$ ions, preliminary Ru(III) ions, and those with Ru(0). In addition, to vary the states and forms of Ru present, both ruthenium oxide and ruthenium nitrosyl forms of the PFSA films have been made and reacted.

The approach to studying these materials is to form each particular ruthenium-containing film and then to react it with CO. Following or preceding this stage, the film is reacted with $H_2$ or $O_2$, so the role of Ru oxidation state can be explored.

As will be apparent, the Ru-forms of PFSA are more reactive than the $Pt(NH_3)_4^{2+}$ forms, but it is important to show how the latter material reacts with CO under the same conditions as those where ruthenium carbonyls can form. Thus, an experiment is reported with a Pt(II) exchanged film and one with a Pt(0) containing film.

Finally, the reaction of CO with a bimetallic Nafion® film containing Pt(0) and Ru(0) deposited together in a near surface region was carried out and the results compared to the results obtained with the individual Pt(0) and Ru(0) containing films. To introduce this study it is helpful to review briefly a few aspects of Ru chemistry.

Ruthenium is one of the rarer platinum metals, comprising about $1 \times 10^{-8}\%$ of the earth crust. Its chemistry resembles that of osmium more than iron, another element in its group. It has a tendency to form tri- or tetra-valent polynuclear complexes with oxide, nitride or hydroxy bridges. It also, particularly when in the zero-valent state, readily forms bridging carbonyl complexes, which will be discussed in the following part. Another feature is that ruthenium forms nitrosyl complex more readily than other metals.

Elemental Ru has a $4d^7 5s^1$ electronic structure. It can form compounds with a wide range of oxidation states, from (VIII) to (0), primarily. Its most common oxidation state is Ru (III). But it can form $Ru^{2-}$ in some solid compounds with electron-donating ligands. Many Ru(III) compounds have octahedral coordination (regular or distorted), but four-coordinated tetrahedral coordination occurs to a lesser extent. Some five-coordinated complexes, such as $RuCl_2(PPh_3)_3$, are known, but they are relatively uncommon and they tend to be stabilized by the steric effects (i.e., the sixth coordination position is blocked by the large, bulky groups). Coordinating ligands can stabilize ruthenium ions in specific oxidation states; for example, cyanide and carbonyl ligands stabilize the lower oxidation states, such as Ru(0).

"$RuCl_3.3H_2O$" is the most commonly used in laboratory compound of ruthenium. It can be dissolved easily in water, acetone, ethanol and other solvents and it often is used as the starting material in preparation of other ruthenium compounds. It is a mixture of $Ru^{n+}$ species, including Ru(II) and Ru(IV) as well as Ru(III), although it is written with the formula "$RuCl_3.3H_2O$". As supplied, it frequently contains some polynuclear Ru (IV) oxy and hydroxy chloro species as well as mononuclear ions. The aquation of ruthenium trichloride in aqueous solutions can occur slowly, and the resulting solutions are easily hydrolyzed. Its aqueous solutions contain the aqua ion $[Ru(H_2O)_6]^{3+}$, but also chloro series such as $[RuCl(H_2O)_5]^{2+}$, cis- and trans-$[RuCl_2(H_2O)_4]^+$, cis- and mer-$RuCl_3(H_2O)_3$, $[RuCl_4(H_2O)_2]^-$, $[RuCl_5(H_2O)]^{2-}$, and $[RuCl_6]^{3-}$. These species can be separated by ion exchange and identified by their electronic spectra. Rates and rate laws of interconversion of these species have been determined.

Solutions of ruthenium trichloride in aqueous hydrochloric acid are effective catalysts. They can catalyze the isotopic exchange between water and deuterium, the hydration of acetylene and mono- and di-substituted acetylene, and the dimerization of olefins.

The adsorption of CO on supported Ru species has attracted great interest for many years. The reactions involving Ru ions and Ru-containing particles on inorganic supports have been studied extensively. The absorption of CO on $Ru/Al_2O_3$ and $Ru/SiO_2$ catalysts were studied by Lynds using infrared spectroscopy. Two IR absorption bands, at 2135 and 2060 $cm^{-1}$, were observed in the $Ru/Al_2O_3$ case, and at 2151 and 2083 $cm^1$ in the $Ru/SiO_2$. This shows effects related to oxidation state and to interactions with the support. Two broad bands for CO absorbed on $Ru/SiO_2$ have been found. The band around 2000 $cm^{-1}$ was assigned to Ru—CO and the band around 1900 $cm^{-1}$ was assigned to bridging carbonyl on ruthenium clusters ($Ru_2CO$). It has also been found that when CO was adsorbed on reduced Ru site, it had a band at 2030 $cm^{-1}$. But the CO bands appeared at 2135 and 2080 $cm^{-1}$ when CO was adsorbed on a surface oxide and on a Ru atom perturbed by a nearby oxygen atom, respectively.

In addition, two bands for CO on $Ru/SiO_2$ in the positions of 2040 and 1980 $cm^{-1}$ have been discovered. Specific assignments for these bands have not been made, but it has been suggested that they might be attributed to multiple adsorption of CO on Ru sites. Studies have been conducted on the dependence of CO adsorption on ruthenium particle size in the supported and unsupported Ru catalyst systems. It was found that three CO bands formed on small particles while only one CO band on the large metal particles.

The chemistry of ruthenium in polystyrene sulfonic acid (PSSA) ionomers has been studied as well. The chemical reactivity of Ru sites in PSSA-Ru(III) films was investigated by reacting them with CO, $H_2$, $O_2$, $CH_3OH$ and $C_2H_5OH$ under mild conditions. The infrared spectra, taken after the reactions of these films with CO in temperature range of 25~186° C., resulted in identification of four different Ru carbonyl species. These species and their ν (CO) band positions are: physical absorbed CO at 2150, PSSA-Ru(III)(CO)$_2$ at 2085-2020, PSSA-Ru(II)(CO)$_2$ at 2067-1985, PSSA-Ru(0)(CO)$_n$ at 2050-2001-1968 $cm^1$, respectively.

Others have studied the chemical reactions of Ru(III)-PFSA (Nafion®) with CO, $H_2$, NO, and some other small gaseous molecules. They assigned the CO bands to carbonyl formed on three major Ru sites, i.e., "Ru—O" sites (ruthenium sites perturbed greatly by the oxygen), the highly oxidized ruthenium center, and ruthenium sites in lower oxidation states. They did not study cases in which metallic or bimetallic domains including Ru(0) were formed.

In accordance with the present invention, Ru (III) was ion-exchanged into the perfluorocarbon sulfonic acid copolymers (PFSA). The membranes were then treated with reducing agents, such as ethanol and $NaBH_4$, or agents such as NaOH, which causes migration to the near surface region and precipitation. Through these experiments, ruthenium is either dispersed homogeneously through the membranes or concentrated near the surface region. Furthermore, the ruthenium can be studied with various oxidation states (as, oxides, ions, metal particles, and mixed metal particles). The chemical reactivity of these films has been investigated by reactions of the metallic sites with CO, $H_2$, $O_2$, and $H_2O$ under a range of conditions. The resultant materials were characterized using Fourier Transform Infrared (FTIR) and Ultraviolet-Visible spectroscopy.

The following discussion first focuses on experiments involving PFSA films containing ruthenium alone. Following that, the experiments concern reactions of films containing both Ru and Pt species.

Investigation of Ru-Nafion® Films

The perfluorocarbon sulfonic acid (PFSA) copolymer membranes were provided by E. I. du Pont de Nemours & Company, Inc. as Nafion® 161 membranes. They are chemically the same as Nafion® 117 membranes studied above, but they are only 1 mil (ea. 25 µm) thick. Their equivalent weight is 1600 g/mol.

The RuCl$_3$.3H$_2$O, NaOH, NaBH$_4$, and ethanol were purchased from Aldrich Chemical Co. and were used without further purification. The gases used in this work were carbon monoxide (99.99%, Mateson Corp.), hydrogen (99.999%, Medical-Technical Gases, Inc.) and oxygen (99.99%, Medical-Technical Gases, Inc.).

Individual pieces of Nafion® 161 films with 1.5 cm×1.5 cm dimension were cleaned thoroughly by the method described in Section 2.2. Then they were stirred in 5×10$^{-3}$ mol/L RuCl$_3$.3H$_2$O aqueous solution for 20 hours. These films then were removed from the solution and rinsed with deionized water for an hour. The product was a clear dark brown film.

Some Ru-containing Nafion® 161 films were treated with ethanol. An individual film was stirred in dry ethanol at reflux for 20 hours. The color of the films after this treatment was blue grey.

Some Ru-containing Nafion® 161 films were reacted with NaOH. They were placed in a 0.1 M aqueous NaOH solution and stirred for 30 minutes at room temperature. They were then rinsed thoroughly by stirring in deionized water for 1 hour. Following this treatment, the films were black and opaque.

SomeRu-Nafion® 161 films were reduced by NaBH$_4$ to produce Ru(0) near surface metallic domains as described in Chapter 3. Thus, they were stirred in 0.1 M ethanol/water (1:1, v/v) solution of NaBH$_4$ for 30 minutes under N$_2$ at room temperature. They then were rinsed by stirring in deionized water for 1 hour. The film color changed to black.

Some Nafion® 161 films were cleaned carefully and then reacted with Ru(NO)Cl$_3$.H$_2$O. Nafion® 161 membranes were stirred in 0.1 M Ru(NO)Cl$_3$ aqueous solution for 7 hours, then rinsed with deionized water. The clear Nafion® films reacted with the wine-red solutions over this period to produce yellow membranes of about 25 μm thickness.

The ultraviolet-visible spectra of the films were measured using a Hewlett-Packard 8452A Diode Array Spectrophotometer in the ambient atmosphere in the range of 200-600 nm.

Infrared (FTIR) spectra of the reacted samples were measured in the region of 400~4000 cm$^{-1}$ on a Brucker (IFS 113V) FTIR spectrometer at room temperature (64 scans at 2 cm$^{-1}$ resolution).

The reactions and infrared measurements were mainly carried out on films in a metal chamber fitted with KBr windows. It has a stainless steel body. Within the body there is a brass cylinder into which heating elements and temperature control devices are inserted. The temperature inside the chamber can be regulated with these devices. Attached to the cylinder is a brass "cartwheel" which can contain six individual samples. The cartwheel can be rotated by a knob outside the chamber so as to place any particular sample in the path of the infrared light. The chamber contains vacuum valves, through which the samples can be evacuated or gases can be admitted. In a typical experiment, film samples were placed on the cartwheel sample holder, and this was sealed inside the outer steel body. This chamber was evacuated first, and then gaseous molecules were admitted to react with the sample films. After the reaction was complete, the excess gases were evacuated before infrared measurement in the case of CO (g) and H$_2$O (g), because they absorb infrared light strongly. Then, the infrared spectra were measured. In some reaction sequences, additional exposure to gas or additional heating time was required. The conditions used in each sequence are described along with the figures in the following discussion.

The results of these reactions are presented below. They are organized so that the experiments on a particular type of starting film sample are presented together. Within each of those categories, one or more sequences of reactions are described in the text below and in the brief description of the figures showing the spectral characteristics of the products of the reactions.

The first reactions presented are those carried out with RuCl$_3$-exchanged Nafion®. The films were prepared by reacting H-Nafion® with aqueous RuCl$_3$.3H$_2$O solution, which contains some polynuclear Ru(IV) species and a range of Ru(III) ions of the form of Ru(H$_2$O)$_{6-x}$Cl$_x^{3-x}$. As discussed above, the aqueous solution of "RuCl$_3$.3H$_2$O" contains the ruthenium ions with aqua, chloro, or hydroxy ligands.

After the membrane was soaked in this solution, it became dark brown. Its Ultraviolet-visible spectrum was measured and is presented in FIG. 46. The spectrum labeled (a) is that of H-Nafion® before exchange, while that of (b) is the product film, and the top spectrum labeled (b)-(a) is the difference spectrum. Absorption bands are identified, after background subtractrion, at ~220, ~230, ~320, and ~480 nm. The known chloro- and aquo-Ru(III) species, with the numbers of chlorides indicated on the figure, have their main absorption bands at the positions indicated, i.e. 220, 230 and 320 nm.

The weak broad band around 480 nm (21 kK) is assigned to a Ru(IV)-chloro species. The Π→T$_{2g}$ transition in the known Ru (IV) chloro complexes occurs in the range of 17~25 kK, while Ru(III) does not have bands in this range. Thus, Ru(IV) is present inside the membrane. For stoichimetric balance, some Ru(II) also must be present.

Accordingly, most of ruthenium species inside the membrane have the oxidation states of three, and this ruthenium containing Nafion® can be represented as Ru(III)-Nafion®. However, some of the ruthenium ions have oxidation states of IV and II.

In one set of experiments, a Ru(III)-Nafion® 161 film was held in vacuum (i.e. evacuated) at room temperature for an hour at 1×10$^{-2}$ torr, then it was reacted with 400 torr CO at 95° C. for several hours. From time to time the free CO gas was evacuated, and the infrared spectrum of the membrane was measured. These measured after 6, 25, and 50 hours (FIG. 47) showed a sharp, intense band at 2096 cm$^{-1}$, a small peak at 2155 cm$^{-1}$ and two medium intensity bands at 2050 and 2035 cm$^{-1}$. The band at 2035 cm$^{-1}$ appears earlier than the other ones. The bands at 2050 and 2096 cm$^{-1}$ arise at the same time. The band at 2155 cm$^{-1}$ only appears when the reaction has been carried out under conditions of higher CO pressure and long reaction time. All the bands are stable under vacuum at 95° C. That is, evacuation of the sample cell at this temperature and ca. 1×10$^{-2}$ torr for 24 hours does not cause the band absorbance to change.

All of the bands for the carbonyl species formed in this sequence of reactions are above 2000 cm$^{-1}$, and thus are assigned to vibrations of terminal, linear Ru carbonyl species.

The carbonyl species whose band is at 2155 cm$^{-1}$ has a higher frequency the vibration of free CO, which is 2143 cm$^{-1}$. This band is assigned to a CO that is weakly bound. Since its frequency is above 2143 cm$^{-1}$, it is reasonable to assume that it is bound by a ay interaction, in which some of the CO's σ* electron density is shared with a substrate ion. The decrease in σ* character of the CO (abs) causes the increase in (CO).

The simultaneous growth of the bands at 2095 and 2050 cm$^{-1}$ suggests that they are from the same carbonyl species. They are assigned to the vibration of a Ru(III)-dicarbonyl with the cis-geometry.

Ruthenium (III) ions can be reduced to ruthenium (II) in the presence of water and CO. Some of the CO can react with water to form H$_2$ and CO$_2$ under the conditions of this reaction. Some Ru (III) will be reduced to Ru (II) by $H_2$ or by an equivalent reaction in which Ru(II) and $H^+$ are formed. The band at 2035 cm$^{-1}$ is assigned to a Ru(II)-CO species. The overall reaction for such a process, which has been observed in other systems is:

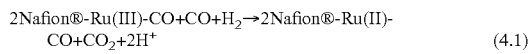
$$2\text{Nafion}\text{®-Ru(III)-CO+CO+H}_2 \rightarrow 2\text{Nafion}\text{®-Ru(II)-CO+CO}_2 + 2\text{H}^+ \quad (4.1)$$

Another set of experiments was designed to test the hypothesis that the water-gas shift reaction occurred. The Ru(III)-Nafion® film was evacuated in vacuum at 180° C. for 16 hours and then reacted with dry CO gas. This should eliminate most of the molecules needed for the water gas shift reaction. The infrared spectra of this film (FIG. 48) shows only three bands; A small band at 2155 cm$^{-1}$, a strong band at 2096 cm$^{-1}$ and a medium strength band at 2045 cm$^{-1}$. All these three bands are assigned to carbonyl species formed on Ru(III), as discussed above. The absence of the band at 2035 cm$^{-1}$ supports the assignment of this band to carbonyl on reduced Ru(II) site.

After being reacted with CO, the Ru(III)-Nafion® membranes were reacted with $H_2$ at 400 torr and 95° C. for 16 hours. The carbonyl bands remained with little change, so not much Ru(III) was reduced by $H_2$ under this mild condition. However, when they were exposed to $H_2$ at 1 atm and 180° C. for 22 hours, significant changes occur as shown in FIG. 49. The bands at 2095 and 2045 cm$^{-1}$ decreased in intensity and new bands appeared at 2073 and 2000 cm$^{-1}$. Since some Ru(III) species were reduced to lower oxidation states under this strong reduction condition, the intensity of carbonyl bands (2095 and 2045 cm$^{-1}$) on ruthenium sites with high oxidation states decreased. The band around 2045 cm$^{-1}$ became broader (from 2020 and 2050 cm$^{-1}$). That means there are more than one species formed. It may come from the vibration of carbonyls bound to ruthenium sites with mixed oxidation states (such as Ru(III, II)). The band at 2073 cm$^{-1}$ is assigned to carbonyl on isolated Ru(0) particles and the 2000 cm$^{-1}$ to Ru(0) cluster carbonyls. These assignments were be confirmed by the further study below.

Hot methanol or ethanol can reduce Ru$^{3+}$ to Ru$^0$ in solution. The reaction of RuCl$_3$ solutions with ethanol at reflux was used to prepare polymer-protected ruthenium colloids in earlier work described in Chapter 3. In one experiment, the Ru(III)-Nafion® membranes were treated with ethanol under refluxing condition (90-95° C.). During the reflux process, the color of the membrane changed from brown to grey to blue. After 4 hours, it was a blue color, but it scattered enough light for the peaks to be just off scale even for a 25 μm thick film. It is known that Ru(II) aqueous solution has a similar blue color. In the case of Ru(H$_2$O)$_6^{2+}$, the $^1A_1 \rightarrow ^1T_1$ and $^1A_1 \rightarrow ^1T_2$ transitions occurs at 18,870 cm$^{-1}$ and 25,640 cm$^{-1}$, respectively, but the blue region of 420-480 nm (23,800-20,833 cm$^{-1}$) is reasonably transmissive. The reaction in ethanol is believed to proceed as presented in equation 4.2.

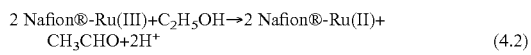
$$2\text{ Nafion}\text{®-Ru(III)} + \text{C}_2\text{H}_5\text{OH} \rightarrow 2\text{ Nafion}\text{®-Ru(II)} + \text{CH}_3\text{CHO} + 2\text{H}^+ \quad (4.2)$$

The so formed ruthenium Nafion® membrane was reacted with 400 torr CO at 95° C. for 22 hours and the infrared spectrum was measured. Three infrared bands are shown in FIG. 50. One is a weak band at 2150 cm$^{-1}$, another is a strong, sharp band at 2086 cm$^{-1}$, and there is a band of medium strength at 2030 cm$^{-1}$. These spectral features are similar to those of carbonyl band formed with the Ru(III)-Nafion® membrane, except that all the three bands appear at lower wavenumbers. These frequency shifts are quite significant. Thus, the strongest band shift from 2095 to 2086 cm$^{-1}$ and the medium strength band shifts down from 2045 to 2030 cm$^{-1}$. These bands were assigned to carbonyls formed on ruthenium (II) sites. The frequencies are intermediate between those of CO on Ru(III) sites and of CO absorbed on ruthenium(0), which generally appear in the region around 2000 cm$^{-1}$ and lower. In addition, the color of the film remained blue.

These CO-reacted Ru(II) Nafion® membranes then were reacted with $H_2$ (1 atm, 170° C., 19 hours). The bands at 2086 cm$^{-1}$ and 2030 cm$^{-1}$ decreased in intensity and a new band appeared at 2000 cm$^{-1}$. As will be discussed below, the new peak at 2000 cm$^{-1}$ is in the region for carbonyl vibrations on zero-valent ruthenium atoms, and it is assigned to carbonyls on Ru(0) sites. The decrease of intensity of 2086 cm$^{-1}$ and 2030 cm$^{-1}$ also are due to the reduction of Ru(II)→Ru(0), which leaves fewer Ru(II) sites present as Ru(II) carbonyl. Consistent with the interpretation of the relative intensities of mononuclear metal cis-dicarbonyls, these two bands at 2086 cm$^{-1}$ and 2030 cm$^{-1}$ are assigned to a species that is, in part, cis-Ru(II)(CO)$_2$.

In these experiments, Ru(III)-Nafion® membranes also were prepared by in exchange with RuCl$_3$·3H$_2$O according to the method employed in the experiments described earlier. A typical piece of the film was soaked in 0.1 M NaBH$_4$ ethanol/water (v/v, 1/1) solution for 30 minutes, and the brown colored membrane became black. It was found that the ruthenium ions inside the membrane were reduced to zero-valent ruthenium in the near surface region by NaBH$_4$. These membranes are labeled as Ru(0)-Nafion®.

The Ru(0)-Nafion® film was rinsed, dried, placed in the reaction cell and evacuated at 95° C. for 2 hours. Then, it was reacted with CO at 400 torr, 95° C. for several hours. After this reaction sequence, the CO (g) was evacuated and the FTIR spectrum was measured.

Three bands appeared after the reaction of the membrane with CO. One was a weak band at 2143 cm$^{-1}$, another strong band at 2076 cm$^{-1}$, and the third was a broad band around 2000 cm$^{-1}$. This last band has a shoulder at about 1935 cm$^{-1}$ as shown in FIG. 51. The reaction was carried out under the same temperature and pressure conditions for various times. The spectrum of the film reacted with CO for 8 hours is essentially the same as that reacted with CO for 34 hourr, so, the reaction completed in less than 8 hours.

The weak band at 2143 cm$^{-1}$ is assigned to physically adsorbed CO. It must be very weakly bound to its site since it has the same frequency as CO (g). Previously herein it was showed that the ruthenium species in the film were concentrated in the near surface region of membrane after reduction. The 2000 cm$^{-1}$ ν (CO) band that appeared after the Ru(0) was exposed to CO (g) is assigned to terminal carbonyl on ruthenium clusters in the membrane. The carbonyl bands lower than 2000 cm$^{-1}$ are assigned to bridging CO. It is assigned to the bridging carbonyl on ruthenium clusters. The 2076 cm$^{-1}$ ν (CO) band is assigned to the vibration of carbonyl absorbed on isolated Ru(0) sites. This band frequency is lower than that observed in the Ru(II) or Ru(III)-Nafion®. More significantly, it is close to the band at 2080 cm$^{-1}$ reported in the literature for CO on an isolated Ru(0) atoms perturbed by a nearby oxygen. The isolated Ru(0) atoms in the Nafion® matrix are expected to be in such an environment. The interaction between Ru(0) species and oxygen leads to lower electron density around Ru(0) sites than that around Ru(0) in ruthenium clusters. Thus, the carbonyl band appears at higher frequency.

After the Ru(0)-Nafion® had been reacted with CO (g), as described above, it was reacted with $H_2$ (g) at 180° C. and 400 torr for 11 hours. The reaction with $H_2$ did not change N, (CO) carbonyl positions in the IR spectrum as shown in FIG. 52.

This provides further evidence that all the ruthenium species in the membrane are Ru(0), and no further reduction happens. In an experiment in which a CO-exposed Ru(0)-Nafion® film was exposed to $O_2$ (180° C., 400 torr for 11 hours), the carbonyl bands shifted, as shown in FIG. 4.8. Clearly, the oxygen causes oxidation of some of the Ru(0). The band near 2076 cm$^{-1}$ only increased by a few wavenumbers, so the primary effect was on an the Ru(0) aggregates. The ν (CO) band for CO on these domains increased from 2000 cm$^{-1}$ to 2020 cm$^{-1}$. This is lower than the frequency for CO at Ru(II) sites, but higher than that for CO on Ru metal clusters. Thus, the assignment is to CO on a partially oxidized Ru surface. The intensity of the band due to physical adsorption of CO is decreased in FIG. 53 spectrum (b), and that due to bridging CO on ruthenium sites also is decreased as the Ru surface is changed by oxidation.

Since oxidation of a Ru surface causes interesting modifications of the ruthenium carbonyl species, and oxide form of the Ru(III) Nafion®, with Ru(III) oxide species in the near surface region, was synthesized. It is known that hydrated ruthenium oxide precipitates could be prepared in Nafion® membranes by treatment of the Fe or Ru-exchanged membranes with alkali ion solutions. However, the composition of such a product is not clear, and $Ru_2O_3 \cdot xH_2O$, $Ru(OH)_3$ or a mixture of $Ru_2O_3 \cdot xH_2O$ and even $RuO_2 \cdot xH_2O$ are possible.

Polymer membranes containing ruthenium oxide particles hold the potential for catalysis applications, especially, since ruthenium oxide is used as a catalyst for chlorine and oxygen evolution.

In this work, Ru(III)-Nafion® membranes were stirred in 0.1 M NaOH aqueous solution for 30 minutes to form hydrated ruthenium oxide in Nafion® 117 membranes. The membrane's color changed from brown to black during this process. The distribution of ruthenium in this membrane was characterized after drying in vacuum at room temperature by Electron Microprobe Analysis. The reaction of these ruthenium containing membranes with CO was studied by FTIR.

The concentration of ruthenium at several points across the cross section of the membrane was measured by Electron Microprobe. Typical concentration profiles for Ru(III) Nafion® 117 before and after treatment with NaOH are shown in FIG. 54. Before the treatment, the ruthenium ions are dispersed homogeneously across the membrane. After the treatment with NaOH, ruthenium is concentrated in the near surface region of the membrane and the concentration in the middle is very low.

A depiction of the precipitation and diffusion process is shown in FIG. 55. When the Ru(III)-Nafion® membrane is treated with a solution of NaOH, ruthenium hydroxides are precipitated near the surface of the membrane. Then ruthenium ions tend to diffuse out because of the concentration gradient between the inside and outside of the membrane. Sodium ions diffuse into the membrane to balance the charge. Anionic OH⁻ also can diffuse into the Nafion® membrane, but it has only a very low diffusion rate. Thus, Ru ions react with OH⁻ to form ruthenium oxide precipitates in the near surface region of the membrane.

The ruthenium oxide-containing membrane prepared in the above manner then was reacted with 400 torr CO at 95° C. in the reaction chamber. FIG. 56, spectrum (b) shows the IR spectrum of this film after 11 hours reaction. Carbonyl bands appeared in four regions of the FTIR spectrum. A weak band appeared at 2140 cm$^{-1}$, and a strong peak was observed at 2067 cm$^{-1}$. In addition, a broad band at 1990 cm$^{-1}$ and a shoulder around 1930 cm$^{-1}$ were observed. The IR spectra taken in the different stages of the reaction with CO (not shown here) indicated that the band at 1930 cm$^1$ appeared earlier than other bands.

After the RuO$_x$-Nafion® was reacted with CO, it was reacted with $H_2$ at 400 torr, 110° C. for 20 hours. The infrared spectrum did not change significantly. But, after this membrane was reacted with $O_2$ at 110° C., a big change occurred. Specifically, as shown in FIG. 56, spectrum (c), the bands at 2140 and 1930 cm$^{-1}$ disappeared, and the bands at 2067 and 1990 cm$^{-1}$ shifted to 2072 and 2010 cm$^{-1}$, respectively.

The adsorption at 2140 cm$^{-1}$ again is assigned to physically adsorbed CO. The two bands at 2067 and 1990 cm$^{-1}$ appear at the same time and maintain a constant intensity ratio. This suggests that they are due to the same species. They are assigned to Ru(II)(CO)$_2$. In the prior studies, Shim et al.[18] assigned the two bands at 2067 and 1985 cm$^{-1}$ on a ruthenium containing PSSA (polystyrene sulfonic acid) ionomer membrane to PSSA-Ru(II)(CO)$_2$. The postulate here is that hydrated Ru(III) oxides in the Nafion® membrane are reduced to Ru(II) species in the presence of CO and $H_2O$ by the "water gas shift" reaction.

The distribution of ruthenium across the hydrox-reacted Nafion® membrane is quite different than it is all other cases described in previous sections of this thesis. The hydrated ruthenium oxide micro-particles are concentrated near the surfaces. They, associated with water molecules, are easily accessible to CO, and there is no diffusion limitation to the rate of the water gas shift reaction.

The formed carbonyls could coordinate to ruthenium sites terminally (e.g., 2067 and 1990 cm$^{-1}$). But bridging carbonyl would also be formed on metal sites when metal concentration is high as reported in early work in this field. Thus, the band at 1930 cm$^{-1}$ can be reasonably assigned to the bridging carbonyl on ruthenium clusters on the surface.

The introduction of $O_2$ appears to have had two effects on the system. First, oxygen absorption on ruthenium sites would block some ruthenium sites from CO absorption. So the physical absorption of CO (2140 cm$^{-1}$) disappeared. It appears also to have reacted with the surface sites that can form bridging COs, so that carbonyl band (1930 cm$^{-1}$) disappeared. Surprisingly, the terminal carbonyl band intensity decreased as well (2067 and 1990 cm$^{-1}$).

Second, it caused the oxidation of some Ru atoms. Thus, ruthenium species were oxidized to higher oxidation states, resulting in a shift of carbonyl bands to higher frequencies (2067→2073 cm$^{-1}$ and 1990→2010 cm$^{-1}$).

Earlier, experiments were described in which a Ru(NO)Cl$_3$ aqueous solution was used as a source of Ru to be exchanged into Nafion® film. Ruthenium particles then were formed near the surface region by in-situ electrochemical reduction.

A Ru(NO) Nafion® membrane, prepared as described above was evacuated at 1×10$^{-2}$ torr at room temperature overnight, and then reacted with CO at 400 torr and 100° C. for 20 hours. The infrared spectra were taken before and after the reaction. They are shown in FIG. 57.

To consider the spectrum for the membrane before reaction, the work of Mercer, et al. is referenced. (E. E. Mercer, W. M. Campbell, Jr., and R. M. Wallace, Inorg. Chem., 1964, 3(7), 1018). They studied the forms of ruthenium nitrosyl chloride in hydrochloric acid solutions. Five monomeric complexes were isolated and were shown to have the formulas. Ru(NO)Cl(H$_2$O)$_4^{+2}$, Ru(NO)Cl$_2$(H$_2$O)$_3^+$, Ru(NO)Cl$_3$(H$_2$O)$_2$, Ru(NO)Cl$_4$(H$_2$O)$^-$, and Ru(NO)Cl$_5^{-2}$. In the present preparation, the pH of ruthenium nitrosyl solution drops to about 2 after ion-exchange process completed since Nafion® membranes are very strong solid acids. This condition can be compared to the low pH solutions in Mercer's study. At low pH, the exchangable cationic species are reported to be Ru(NO)Cl(H$_2$O)$_4^{+2}$ and Ru(NO)Cl$_2$(H$_2$O)$_3^+$. In all of the species, the Ru(NO) group in nitrosyl complexes is stable and ruthenium has coordination number six.

The infrared spectrum (FIG. 57, spectrum (b)) of ruthenium nitrosyl-containing Nafion® membrane shows a very strong band at 1935 cm$^{-1}$. The v(NO) in Ru(NO)Cl$_3$ has been reported to be 1916 cm$^{-1}$. So, this band is assigned to v(NO) in Ru(NO) group coordinated to the sulfonate sites in Nafion®. The higher frequency value suggests less electron donation from the Ru d orbital to the π* orbitals of NO.

Continuous evacuation 1×10$^{-2}$ torr and 200° C. for 20 hours did not change the intensity of Ru(NO) peak at 1935 cm$^{-1}$. This indicates that the Ru—NO bond is stable in Nafion® the membrane.

The Ru(NO) containing Nafion® membrane then was reacted with CO at 400 torr and 100° C. for 23 hours. Three new peaks in the infrared spectrum appeared at 2168, 2112 and 2056 cm$^{-1}$ the reaction with CO as shown in FIG. 57, spectrum (c). The absorbance of the NO stretching band did not change, but the peak shifted to a higher frequency (1935→1940 cm$^{-1}$).

The coexistence of CO and NO on a silica-supported Ru material has been studied. The formation of an isocyanate on zero valent ruthenium sites was found, but not on oxidized ones. In the present application, ruthenium species in Nafion® are in oxidized states, and no isocyanate formation is observed near 2200 cm$^{-1}$.

These three new peaks were assigned to carbonyl on Ru(III) with a bond (2168 cm$^{-1}$) and Ru(III)(NO)(CO)$_2$ (2112 and 2056 cm$^{-1}$) with π bond as we did in Ru(III)-Nafion® section. It is interesting to note that these peaks appear at higher frequencies than those in the Ru(III)-Nafion® case, where they appeared at 2155, 2090 and 2050 cm$^{-1}$, respectively. This is due to the nitrosyl and carbonyls being on common Ru(III) sites reduce the degree of backdonation from ruthenium to π* orbitals of both CO and NO ligands and result in a band shift to higher frequency for both CO and NO.

Pt/Ru-Nafion®

Polymer membrane fuel cells offer high-energy efficiency and are regarded as highly attractive for automobile application. H$_2$ has once been used as fuel gas for environmental compatibility in comparison to the traditional combustion engines. Recently, methanol, as a new power source, has attracted more and more interests due to its advantages compared to hydrogen in terms of weight and volume. In H$_2$/O$_2$ fuel cell system, H$_2$-rich fuel gas, which is converted from methanol through a reformer, can contain ~0.1% CO (100 ppm). Pt is the most effective catalyst for hydrogen oxidation in fuel cells, but can be fouled by even a few ppm CO in fuel gas. It is found that Ru/Pt alloys are promising catalysts for the oxidation of CO and can be used to control the Pt poisoning problem. PtRu alloy is also the preferred anode catalyst for methanol oxidation in directive methanol fuel cells (DMFCs).

The preceding studies of Ru-Nafion® membranes have provided information that not only is interesting in itself but also is helpful background for studying Pt/Ru-Nafion®. Recall that "Pt/Ru-Nafion®" is a general label for Nafion® ionomer membrane containing both Pt and Ru. They have been prepared in several forms. The initial form is the Ru(III) and Pt(II) ion exchange films. The second form is the mixed ion Nafion® membrane that has been reacted with NaBH$_4$ in an alcohol-water solution.

In this section, the reactions with CO (g) of the resultant Pt(0)/Ru(0)-Nafion® membranes, called the "catalyst-built-in" films, and analogous Ru(0)-Nafion® and Pt(0)-Nafion® films are explored. The studies reported in the previous section are, indeed, helpful in interpreting these results.

The compound Pt(NH$_3$)$_4$Cl$_2$.H$_2$O was purchased from Strem Chemical Co. and used without further purification. The Nafion® 161 membrane samples and the RuCl$_3$.3H$_2$O, NaBH$_4$, and gases (CO, H$_2$, and O$_2$) are the same as those used in preparing the Ru-Nafion® membranes.

A piece of Nafion® 161 film with 1.5 cm×1.5 cm dimension was stirred in 5×10$^{-3}$ M RuCl$_3$.3H$_2$O aqueous solution for 5 hours and rinsed with distilled water. This resulted in a brown film. Then it was stirred in a 1×10$^{-3}$ M Pt(NH$_3$)$_4$ Cl$_2$.H$_2$O aqueous solution for 5 hours and rinsed with distilled water. The film color became darker. In fact, it changed from a brown color to black.

An Electron Microprobe Analysis, carried out as described above but with fewer points since the Nafion® 161 film is only 25 μm thick, showed that ruthenium and platinum ions were distributed homogeneously across the membrane.

After the ruthenium and platinum ions had been loaded into the Nafion® 161 membrane, the membrane was stirred in a 0.1 M of an ethanol/water (1:1, v/v) solution of NaBH$_4$ for 30 minutes at room temperature. They then were rinsed by stirring in distilled water for 1 hour. The film color changed to black.

The Electron Microprobe Analysis, also carried out as described previously, shows that ruthenium and platinum were concentrated near the surface region and the atom ratio of Pt to Ru is about 1:1.

The reactions and infrared measurements were carried out in the metal chamber mentioned earlier. Infrared spectra of the reacted samples were measured in the region of 400~4000 cm$^{-1}$ on a Brucker (IFS 113V) FTIR spectrometer at room temperature. In most cases, the spectra were measured with 64 scans at 2 cm$^{-1}$ resolution.

The platinum tetramine chloride dissociates in water as follows,

$$Pt(NH_3)_4Cl_2 \rightarrow Pt(NH_3)_4^{2+} + 2Cl^- \tag{4.3}$$

Thus, the cation exchanged to the Nafion® membrane is Pt(NH$_3$)$_4^{2+}$, but it is accompanied by Cl$^-$, so some HCl is present, before rinsing, in the membrane. The Pt(II) ion diffuses into Nafion® much faster than the Ru(III) species in acidic solution do. If an mixed aqueous solution of Pt(NH$_3$)$_4$Cl$_2$ and RuCl$_3$ with same molar concentrations is used for the ion exchange, the membrane has very light brown color and its reaction with CO (g) at 400 torr and 100° C. for 5 hours shows that only a small amount of Ru(III) is present. This means that only tiny amount of ruthenium ions were loaded into the membrane. Even if the Pt concentration is reduced to about 1/10 of the Ru concentration in the solution, the membrane exchanges much more Pt than Ru.

The purpose of loading Ru and Pt into the membrane is to make the bimetallic-Pt—Ru-Nafion® membrane that eventually will have the application in a fuel cell system. The Pt/Ru alloy with 50:50 atomic ratio is known to be the best composition in fuel cell applications. A method to load about the same amount of Ru and Pt in the membrane was reported earlier herein. The Ru(III) was exchanged into the membrane first, and then Pt(II) was exchanged into it. The amount of Ru(III) and Pt(II) loaded was controlled by variation of the concentrations of the metal sources and the ion exchange duration. The optimal condition for this is to soak the membrane in RuCl$_3$ and then Pt(NH$_3$)$_4$Cl$_2$ aqueous solution for the same periods with the concentrations of Ru(III) and Pt(II) solutions in a 5:1 molarity ratio.

FIG. 58 shows the IR spectra of the Ru(III)/Pt(II)-Nafion® after 20 hours reaction with CO at 100° C., compared to those of Ru(III)-Nafion® and Pt(II)-Nafion® reacted under the same conditions. The Pt(II)-Nafion® did not react with CO under these conditions because of the inertness of the nature of this Pt(II) species in the membrane. It is known that it can react slightly with CO at temperatures higher than 200° C., where the deamination reaction occurs.

For Ru(III)-Nafion® membrane reacted with CO, we assigned the small peak at 2155 $cm^{-1}$ to the vibration of a carbonyl formed on Ru (III) with a σ bond. The bands at 2095 and 2050 $cm^{-1}$ were assigned to $Ru(III)(CO)_2$. The assignments have been discussed in earlier.

The infrared spectrum of Ru(III)/Pt(II)-Nafion® membrane with CO is shown in FIG. 58, spectrum (b). It also shows three bands in the ν (CO), but they all are at new positions. The weak band for weakly bound CO is still near the 2154 $cm^{-1}$, but it is shifted down to 2148 $cm^{-1}$. The strongest band is at 2090 $cm^{-1}$ and the medium absorbance band is at 2026 $cm^{-1}$. These represent shifts of 6 to 19 $cm^{-1}$ and show that the spectrum is not the sum of the reactions of the membranes of the two ions independently. The spectrum has features that are similar to those of Ru(III)-Nafion® but all the bands appear at lower frequency and broader. This indicates that all the carbonyls were formed on Ru sites, but that the Pt must be involved in some manner. The lower frequencies of carbonyl bands suggest the increase of electron donation from ruthenium to CO (π*). The greater electron density around ruthenium in Ru(III)/Pt(II)-Nafion® than that in Ru(III)-Nafion® apparently comes from an interaction with Pt(II), either directly, through an Pt(II)-Ru(III) interaction or indirectly through Pt(II) assisted increase in Ru(III) reduction.

The 2026 $cm^{-1}$ band is much broader than the 2045 $cm^{-1}$ band. The breadth of the 2026 $cm^1$ is due in part to band contributions from features near 2000/2100 $cm^{-1}$ and $1930^{-1}$. These were observed earlier (FIG. 51) on $NaBH_4$-reduced Ru(0) Nafion® 161 membranes. Thus, the presence of Pt(II), which not leading to Pt carbonyls, leads to enhanced reduction of Ru in someway.

According to the invention, the ruthenium ions are first exchanged into the membranes. The ruthenium ions bind to sulfonate groups in the form of ruthenium cations associated with water and chloro ligands. The platinum ions then are exchanged into membranes in the form of $Pt(NH_3)_4^{2+}$, and some $Cl^-$ ions accompany them. After exchange of Pt(II) for $H^+$, $Cl^-$ can remain as HCl (aq). During the ion-exchange process, substitution or exchange of ligands around different metal sites can occur. Chloride groups could replace water ligands at the ruthenium ion sites. However, there appears to be further interaction, because there is a color change of the metal containing ionomer membranes. That is, after the first step of ion-exchange, the membrane had the brown color from the ruthenium(III) ions with aqua and chloro ligands. After the second step, in which $Pt(NH_3)_4^{2+}$ was introduced, the membrane became darker than before. The black color could be due to ruthnium(III) associated with chloro and amine ligands, or it could be due to a ligand-ligand bimetallic species.

The results indicate that there are reduced bimetallic aggregates that can form bridging carbonyls (1930 $cm^{-1}$) and that the electron density around ruthenium sites in the carbonyl that forms from the ruthenium-containing species higher than that formed with the Ru(III)-Nafion® itself. More electron donation from ruthenium d orbital into the π* anti-bonded orbitals on CO occurs, and this results in weaker bond in C—O, and the C—O vibration bands therefore appear at lower frequencies.

Methanol, as direct fuel for direct methanol fuel cell (DMFC) or as source of $H_2$ for $H_2/O_2$ polymer electrolyte membrane fuel cell (PEFC), is attractive for mobile applications and recently for portable power source, in terms of low weight, volume and range. Poor anode performance in DMFCs and the low CO tolerance of Pt catalysts in $H_2/O_2$ fuel cell are major problems for their applications. Binary Pt—Ru catalysts have demonstrated the best performance to date for methanol oxidation at anodes of DMFC and have been considered to be promising catalysts for CO tolerance in PEFC. Earlier, the development of a novel method to prepare "Ru—Pt-built-in" Nafion® 117 membranes was reported. Ru and Pt had the atomic ratio of 1/1 and were formed in the near surface region of the membrane.

Accordingly, the reactions of Ru(0)-Nafion®, Pt(0)-Nafion® and Ru(0)/Pt(0)-Nafion® membranes, prepared by the reaction of ion-exchanged membranes with $NaBH_4$, with CO are shown. FIG. 59, spectrum (b) shows the IR spectrum of a Pt(0)/Ru(0)-Nafion® membrane after 20 hours reaction with CO at 100° C., compared to those of Ru(0)-Nafion® and Pt(0)-Nafion® membranes that were reacted under the same condition.

Consider first the reaction of Pt(0)-Nafion® with CO, the infrared spectra of CO adsorbed on evaporated Pt metal films have been reported by various researchers. Typically, one band in the region of 2030-2070 $cm^{-1}$, has been observed and assigned to the CO stretch of a linear Pt—CO in all the literatures. Some authors report and additional a weak, broad band due to bridging CO in the region of 1800-1870 $cm^{-1}$, although Pt does not form bridging carbonyl under most conditions studied.

The reported spectra of CO adsorbed supported platinum systems were very similar to those on pure metal films. For example, it has been reported that when CO was absorbed on silica-supported platinum, a strong band is observed at 2070-2080 $cm^1$. It was assigned to ν (CO) vibration of a linear Pt—CO species.

Several studies have been done on the adsorption of CO on alumina-A small band found at 2125 $cm^1$, and was assigned to CO adsorption on oxidized platinum, Pt(II). Studies have been conducted on the CO adsorption on an oxidized platinum/$Al_2O_3$ catalyst. There were two major bands, one at 2125 $cm^{-1}$ was assigned to Pt(II)-CO, the other at 2080 $cm^{-1}$ to Pt(0)-CO.

Others have studied the reactions of Pt(II)-Nafion® ionomers with CO and other gaseous molecules. Different types of carbonyl formed on the Pt in Nafion® membrane. Two bands at 2127 and 2080 $cm^1$ were very close to those previous studies and were assigned to Pt(II)-CO and Pt(0)-CO, respectively.

One study looked at the relationship between the frequency of the linear platinum carbonyl and the platinum particle size in Pt/$Al_2O_3$ system. The carbonyls, formed on platinum particles with the size smaller than 1 nm, appeared at ~2080 $cm^1$, whereas those formed on particles with the size of 10 nm appeared at 2093 $cm^1$.

In the present experiment, the Pt(0)-Nafion® exhibited a strong carbonyl band at 2095 $cm^{-1}$. This band is assigned to terminal Pt(0)-CO with 71 bond between Pt and C. The electron donation from d orbital of Pt to π* orbital of C leads to the C—O vibration frequency shift to lower value (<2143 $cm^{-1}$, the free CO frequency). An interesting consequence of the previous studies is that it is possible to hypothesize that size of platinum particles in the near surface region of Nafion® membranes is around 10 nm.

The bottom spectrum (a) in FIG. 59, shows the carbonyl bands on Ru(0)-Nafion® membrane: a weak band at 2143 cm$^{-1}$, a strong band at 2076 cm$^{-1}$ and a broad band around 2000 cm$^1$ and shoulder in the region of 1900 to 2000 cm$^1$. Assignments for these bands have been presented in earlier. The band at 2143 cm$^{-1}$ was assigned to physical adsorption of CO on a ruthenium site. The 2000 cm$^{-1}$ band and the shoulder lower in the region of 1900-2000 cm$^{-1}$ band were assigned to terminal- and bridging carbonyls on ruthenium clusters in the membrane, respectively. And, finally, the 2076 cm$^{-1}$ band was assigned to the vibration of a CO absorbed on isolated Ru(0) sites disturbed by oxygen around them.

The Ru/Pt alloy electrode has been studied widely for use as the anode in DMFC. These Ru/Pt catalysts have good CO tolerance. It is well known that the adsorption of oxygen-containing species onto a Ru electrode commences at potentials much more negative than on Pt. It has been suggested that ruthenium can enhance the oxidation of the adsorbed CO by the following bifunctional mechanism.

$$Pt + CO \rightarrow Pt\text{---}CO_{ads} \quad (4.4)$$

$$Ru + H_2O \rightarrow Ru\text{---}OH_{ads} + H^+ + e^- \quad (4.5)$$

$$Pt\text{---}CO_{ads} + Ru\text{---}OH_{ads} \rightarrow CO_2 + Ru + Pt + H^+ + e^- \quad (4.6)$$

Another possible effect of Ru in controlling of CO problem is that it could weaken the adsorption of CO on Pt sites.

In the experiments reported in the present application, the FTIR spectrum of the product of the reaction of the Ru(0)/Pt (0)-Nafion® membrane with CO shows three bands in the carbonyl. There is a weak band at 2143 cm$^{-1}$, a strong band at 2086 cm$^{-1}$, and a broad band at 2009 cm$^{-1}$ with a distinct shoulder below 2000 cm$^{-1}$ near 1930 cm$^{-1}$. It is very interesting to note how these features compare to the membranes with the separate elements.

First, the carbonyl bands on Ru/Pt-membrane are not a sum of bands on the membranes of pure Ru(0) and pure Pt(0) independently. That means that the Ru(0)/Pt(0) catalyst particles inside the membrane are not simply physical mixtures of the two elements.

Second, the spectrum has very similar features to that of Ru-Nafion® but most of the bands appear at higher frequencies. Evidently, the carbonyls were formed on Ru-containing particles. That may mean that this new catalyst-built-in Nafion® membrane, the ruthenium can protect platinum from CO poisoning.

The ν (CO) bands are at quite interesting positions. The band at 1930 cm$^{-1}$ indicates that there are Ru—Pt spacings at which bridging carbonyls can form. The presence of the weak 2143 cm$^{-1}$ band shows positions for weak σ-bond adsorption of CO as is formed in the other Ru(0) materials.

The ν (CO) band at 2086 cm$^{-1}$ is midway between the 2076 cm$^{-1}$ band in Ru(0) Nafion® and the 2096 cm$^{-1}$ band in Pt(0) Nafion®, so it is important to ask if this is a peak position that results from overlapping of bands. It does not appear to be the case for two reasons. First, the 2086 cm$^{-1}$ band is symmetric and that could only happen if the two overlapping bands were of the same intensity. Since CO is much more strongly absorbed on Ru(0) than Pt(0), that does not seem likely. Second, the 2086 cm$^{-1}$ band has the same bandwidth as the 2076 cm$^{-1}$ Ru(0) Nafion® band, but it would be expected to be much broader if it were due to that sort of overlap.

That leads to the conclusion that the Ru(0) site in Pt(0)/Ru (0)-Nafion® is more positive, with lower electron-density, than it is in the Ru(0)-Nafion® alone. This would help explain why there is a shift to higher frequency in both the 2000 (to 2009) cm$^{-1}$ and 2076 (to 2086) cm$^{-1}$ bands. This could be due to interaction with Pt(0) and Ru(0). In chemical terms, as mentioned above, this would be considered as making the Ru appear more electron deficient. In physical terms, the physical contact of the Pt(0), with work function 5.65 eV, and Ru(0), with work function 4.71 eV, makes the effective work function of Ru(0) higher and its electron density lower than they would be if Ru(0) were alone. This can be described fully with electron state band theory applied either to metal particle aggregates, in which inter-particle band-bending and electron distribution rearrangement occurs with contact, or to metal alloys themselves. In either event, the conclusion that both metals are intimately involved is confirmed.

In summary, a Ru/Pt catalyst layer was built successfully in the near surface region of a Nafion® membrane. The Ru/Pt particles in the membrane do not appear to be simply physical mixtures, but there is clear evidence for an interaction between Pt and Ru particles and they may form bimetallic structures. The IR spectra show that when these metallic domains were reacted with CO (g), the carbonyls were formed in regions containing Ru(0). However, the positions of these bands were shifted from those in Ru(0)-Nafion® itself because of the interactions between Pt and Ru.

In this new catalyst-built-in Nafion® membrane, ruthenium appears to protect platinum from CO poisoning, since there is no evidence for Pt—CO formation. The expected property of CO tolerance of this new material can be attributed to the weakening of CO adsorption on Pt sites.

The invention has been described with reference to various preferred embodiments. Modifications and alterations will occur to others upon a reading and understanding of the specification. The invention is intended to include all such modifications and alteration insofar as they come within the scope of the appended claims and the equivalents thereof.

What is claimed is:

1. A method for forming an ion conducting polymer membrane having a deformed surface area exceeding the membrane's cross-sectional area by at least 20%, said method comprising the steps of:
   providing an ion conducting polymer membrane (10);
   at least partially dehydrating said membrane (10); and
   applying a voltage across said membrane (10) sufficient to generate surface deformation on said membrane.

2. A method according to claim 1, wherein said step of at least partially dehydrating said membrane (10) is performed such that said membrane (10) has a water content of from about 2% to about 15% by weight after said step is completed.

3. A method according to claim 1, wherein said step of applying a voltage across said membrane (10) is performed by applying a voltage of from about 20 to about 800 volts for a period of about 5 to about 120 minutes.

4. A method according to claim 1, wherein said step of applying a voltage across said membrane (10) is performed by placing said membrane between an anode (12) and a cathode (14) connected by a voltage source.

5. A method according to claim 1, wherein said step of at least partially dehydrating said membrane (10) is performed such that the ratio of H$_2$O molecules to H$^+$ in said membrane (10) is from about 1.5 to about 9 after said step is completed.

6. A method according to claim 1, wherein said step of at least partially dehydrating said membrane (10) is performed by subjecting said membrane (10) to a vacuum for an effective amount of time.

7. A method according to claim 6, wherein said step of at least partially dehydrating said membrane (10) is performed by placing said membrane (10) in a chamber and evacuating said chamber at about $1\times10^{-3}$ torr pressure at about 25° C. for about 24 hours.

8. A method according to claim 1, wherein said step of applying a voltage across said membrane is performed by placing said membrane between an anode (12) and a cathode (14) connected to a voltage source.

9. A method according to claim 8, wherein said surface deformation is formed on said membrane at a surface of said membrane adjacent said anode (12).

* * * * *